(12) United States Patent
Fukuyama

(10) Patent No.: US 10,330,905 B2
(45) Date of Patent: Jun. 25, 2019

(54) PAIR OF PHASE MODULATION ELEMENTS FOR IMAGING OPTICAL SYSTEM, IMAGING OPTICAL SYSTEM, ILLUMINATING DEVICE, AND MICROSCOPE APPARATUS

(71) Applicant: OLYMPUS CORPORATION, Tokyo (JP)

(72) Inventor: Hiroya Fukuyama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/477,644

(22) Filed: Apr. 3, 2017

(65) Prior Publication Data

US 2017/0205613 A1   Jul. 20, 2017

Related U.S. Application Data

(63) Continuation of application No. PCT/JP2015/078598, filed on Oct. 8, 2015.

(30) Foreign Application Priority Data

Oct. 8, 2014 (JP) .................................. 2014-207375

(51) Int. Cl.
G02B 21/02 (2006.01)
G02B 21/00 (2006.01)
(Continued)

(52) U.S. Cl.
CPC ....... *G02B 21/006* (2013.01); *G02B 13/0005* (2013.01); *G02B 13/009* (2013.01);
(Continued)

(58) Field of Classification Search
CPC .................................................. G02B 21/244
(Continued)

(56) References Cited

U.S. PATENT DOCUMENTS 5,442,413 A     8/1995  Tehima et al.
5,986,744 A  *  11/1999  Kudo .................. G03F 7/70058
                                            355/55
(Continued)

FOREIGN PATENT DOCUMENTS

EP     2983027 A1    2/2016
JP     H06-265814 A  9/1994
(Continued)

OTHER PUBLICATIONS

International Search Report dated Dec. 28, 2015 issued in PCT/JP2015/078598.

*Primary Examiner* — James C. Jones
(74) *Attorney, Agent, or Firm* — Scully, Scott, Murphy & Presser, P.C.

(57) ABSTRACT

Provided is a microscope apparatus including: a light source; an illumination optical system that radiates illumination light from the light source onto an observation object; an imaging optical system that focuses light from the observation object; and an image acquisition device that acquires an image of the light focused by the imaging optical system. The imaging optical system is provided with: imaging lenses that form a final image and at least one intermediate image; a first phase modulation element that is disposed closer to an object than any of the at least one intermediate image and that gives a spatial disturbance to the wavefront of light from the object; a second phase modulation element that is disposed at a position for allowing the at least one intermediate image to be sandwiched with the first phase modulation element and that cancels out the spatial disturbance given to the wavefront.

25 Claims, 39 Drawing Sheets

(51) Int. Cl.
 *G02B 21/06* (2006.01)
 *G02B 27/00* (2006.01)
 *G02B 13/00* (2006.01)
 *G02B 21/24* (2006.01)
 *G02B 23/12* (2006.01)
 *G02B 23/24* (2006.01)
 *H04N 5/225* (2006.01)

(52) U.S. Cl.
 CPC ..... *G02B 13/0015* (2013.01); *G02B 21/0032* (2013.01); *G02B 21/0048* (2013.01); *G02B 21/0076* (2013.01); *G02B 21/0092* (2013.01); *G02B 21/06* (2013.01); *G02B 21/244* (2013.01); *G02B 23/12* (2013.01); *G02B 23/2407* (2013.01); *G02B 27/0025* (2013.01); *H04N 5/2254* (2013.01)

(58) Field of Classification Search
 USPC .......................................................... 359/656
 See application file for complete search history.

(56) References Cited

U.S. PATENT DOCUMENTS

| | | |
|---|---|---|
| 6,842,280 B2 | 1/2005 | Araki et al. |
| 8,390,932 B2 | 3/2013 | Jia et al. |
| 8,950,874 B2 | 2/2015 | Tatsuno |
| 2004/0150879 A1 | 8/2004 | Araki et al. |
| 2010/0053735 A1 | 3/2010 | Wilson et al. |
| 2012/0062986 A1 | 3/2012 | Wilson et al. |
| 2012/0063008 A1 | 3/2012 | Jia et al. |
| 2013/0070217 A1 | 3/2013 | Tatsuno |
| 2013/0215502 A1 | 8/2013 | Wilson et al. |
| 2015/0138625 A1 | 5/2015 | Tatsuno |
| 2016/0025970 A1 | 1/2016 | Fukuyama |

FOREIGN PATENT DOCUMENTS

| | | |
|---|---|---|
| JP | H11-109243 A | 4/1999 |
| JP | 3320862 B2 | 9/2002 |
| JP | 4011704 B2 | 11/2007 |
| JP | 2010-513968 A | 4/2010 |
| JP | 2010-266813 A | 11/2010 |
| JP | 2013-083817 A | 5/2013 |
| WO | WO 99/53488 A1 | 10/1999 |
| WO | WO 2008/078083 A1 | 7/2008 |
| WO | WO 2014/163114 A1 | 10/2014 |

\* cited by examiner

FIG. 38
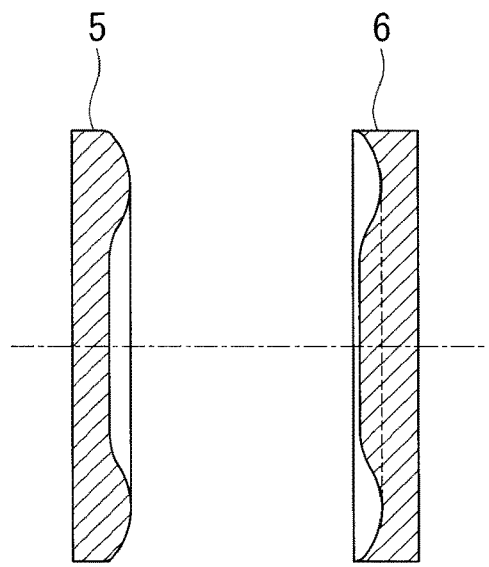
FIG. 39
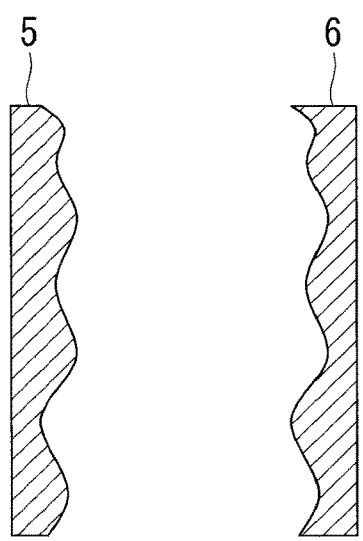

PAIR OF PHASE MODULATION ELEMENTS FOR IMAGING OPTICAL SYSTEM, IMAGING OPTICAL SYSTEM, ILLUMINATING DEVICE, AND MICROSCOPE APPARATUS

CROSS-REFERENCE TO RELATED APPLICATIONS

This is a continuation of International Application PCT/JP2015/078598 which is hereby incorporated by reference herein in its entirety.

This application is based on Japanese Patent Application No. 2014-207375, the contents of which are incorporated herein by reference.

TECHNICAL FIELD

The present invention relates to: a pair of phase modulation elements for improving image quality, for example, in an imaging optical system in which image formation is performed by using laser light; an imaging optical system; an illuminating device; and a microscope apparatus.

BACKGROUND ART

There is a conventionally known method in which the optical-path length is adjusted at the position of an intermediate image, thereby moving the focal position in an object in the direction along the optical axis (on the Z axis) (for example, see PTL 1 and PTL 2).

CITATION LIST

Patent Literature

{PTL 1} Publication of Japanese Patent No. 4011704
{PTL 2} Japanese Translation of PCT International Application, Publication No. 2010-513968

SUMMARY OF INVENTION

According to one aspect, the present invention provides a pair of phase modulation elements that are disposed close to an object and close to a final image so as to sandwich any of at least one intermediate image formed by a plurality of imaging lenses forming a final image and the at least one intermediate image, in each of which a plurality of small lens units having different powers are arrayed in a direction intersecting the optical axis, one of which gives a spatial disturbance to the wavefront of light from the object, and the other of which cancels out the spatial disturbance given to the wavefront of the light from the object by the one phase modulation element.

According to another aspect, the present invention provides an imaging optical system including: a plurality of imaging lenses that form a final image and at least one intermediate image; a first phase modulation element that is disposed closer to an object than any of the at least one intermediate image formed by the imaging lenses is and that gives a spatial disturbance to the wavefront of light from the object; and a second phase modulation element that is disposed at a position for allowing the at least one intermediate image to be sandwiched with the first phase modulation element and that cancels out the spatial disturbance given to the wavefront of the light from the object by the first phase modulation element, wherein the imaging optical system has a configuration for adjusting or increasing an operation of giving the spatial disturbance and an operation of cancelling out of the disturbance in the phase modulation elements.

BRIEF DESCRIPTION OF DRAWINGS

FIG. 38 is a longitudinal sectional view showing spherical aberration elements as other examples of the phase modulation elements used in the imaging optical systems and the observation devices according to the present invention.

FIG. 39 is a longitudinal sectional view showing irregular-shaped elements as other examples of the phase modulation elements used in the imaging optical systems and the observation devices according to the present invention.

DESCRIPTION OF EMBODIMENTS

One embodiment of an imaging optical system 1 to be used in a microscope apparatus of the present invention will be described below with reference to the drawings.

Figure 1:
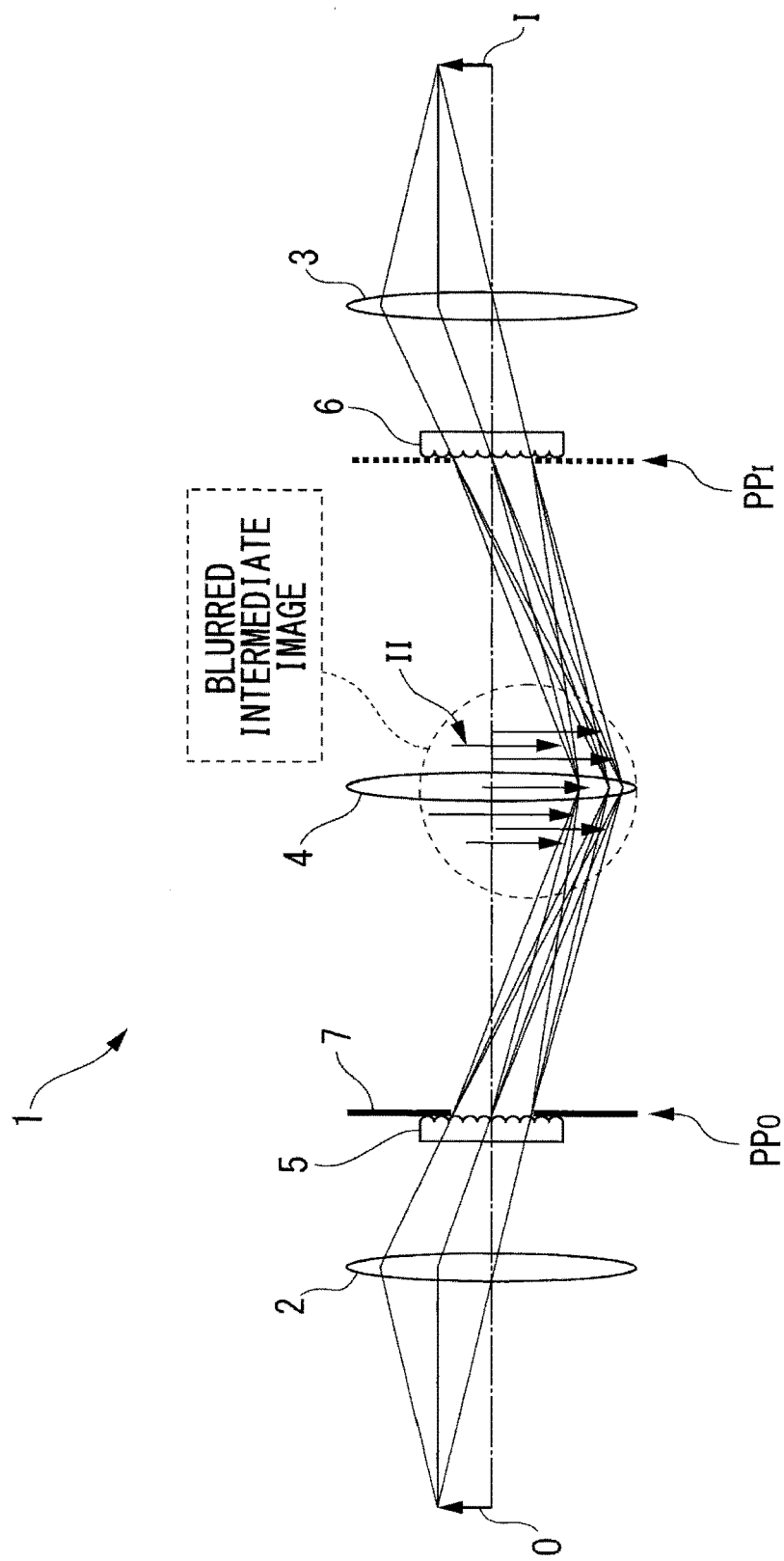
FIG. 1 is a schematic view showing one embodiment of an imaging optical system to be used in a microscope apparatus of the present invention.

As shown in FIG. 1, the imaging optical system 1 of this embodiment is provided with: two imaging lenses 2 and 3 constituting a pair and that are provided with a space therebetween; a field lens 4 that is disposed in an intermediate image plane between the imaging lenses 2 and 3; a wavefront disturbing element (first phase modulation element) 5 that is disposed in the vicinity of a pupil position $PP_O$ of the imaging lens 2, which is close to an object O; and a wavefront restoring element (second phase modulation element) 6 that is disposed in the vicinity of a pupil position $PP_I$ of the imaging lens 3, which is close to an image I. In the figure, reference sign 7 denotes an aperture stop.

The wavefront disturbing element 5 gives a disturbance to the wavefront of light produced in the object O and focused by the imaging lens 2, which is close to the object O, when the light is transmitted through the wavefront disturbing element 5. The wavefront disturbing element 5 gives a disturbance to the wavefront, thereby blurring an intermediate image formed in the field lens 4.

On the other hand, the wavefront restoring element 6 applies, to the light focused by the field lens 4 when transmitted through the wavefront restoring element 6, a phase modulation that cancels out the wavefront disturbance given by the wavefront disturbing element 5. The wavefront restoring element 6 has reverse phase characteristics from the wavefront disturbing element 5 and cancels out the wavefront disturbance, thereby allowing a clear final image I to be formed.

Furthermore, the imaging optical system 1 of this embodiment has a configuration in which the wavefront disturbing element 5 and the wavefront restoring element 6 adjust or increase the operation of giving a spatial disturbance and the operation of cancelling out of the disturbance. Specifically, the imaging optical system 1 uses microlens arrays shown in FIG. 2, as the wavefront disturbing element 5 and the wavefront restoring element 6.

Figure 2:
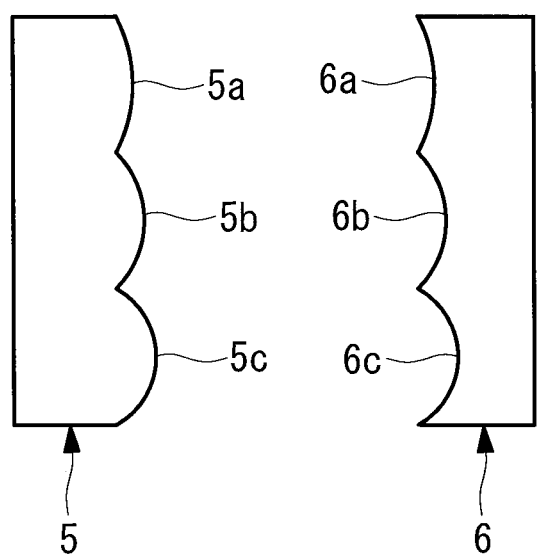
FIG. 2 is a view showing an example wavefront disturbing element and wavefront restoring element shown in FIG. 1.

In the example of FIG. 2, the wavefront disturbing element 5 is composed of microlenses (small lens units) 5a, 5b, and 5c that are arrayed in a direction intersecting the optical axis and that each have positive power, and the wavefront restoring element 6 is composed of microlenses (small lens units) 6a, 6b, and 6c that are arrayed in the direction intersecting the optical axis and that each have negative power.

The microlenses 5a, 5b, and 5c of the wavefront disturbing element 5 have different powers from each other, and the microlenses 5a, 5b, and 5c are arrayed in order of increasing power. The microlenses 6a, 6b, and 6c of the wavefront restoring element 6 have different powers from each other, and the microlenses 6a, 6b, and 6c are arrayed in order of increasing absolute value of power.

The wavefront disturbing element 5 and the wavefront restoring element 6 may be arranged such that concave-convex surfaces of the elements are directed toward each other, as shown in FIG. 2. On the contrary, they may be disposed such that the concave-convex surfaces of the elements are arranged in opposite directions, i.e., such that flat surfaces of the elements are directed toward each other. Furthermore, the wavefront disturbing element 5 and the wavefront restoring element 6 may be arranged such that the concave-convex surfaces of the elements are directed toward the object O. On the contrary, they may be arranged such that the concave-convex surfaces of the elements are directed toward the image I. However, among the above-described four types of arrangement methods, it is preferred to use the former two methods, i.e., the arrangement in which the concave-convex surfaces of the elements are directed toward each other and the arrangement in which the flat surfaces of the elements are directed toward each other, than the latter two methods, in terms of the accuracy of wavefront restoration. The same applies to the embodiments below.

A more general concept of the imaging optical system 1 of this embodiment will be described in detail.

Figure 3:
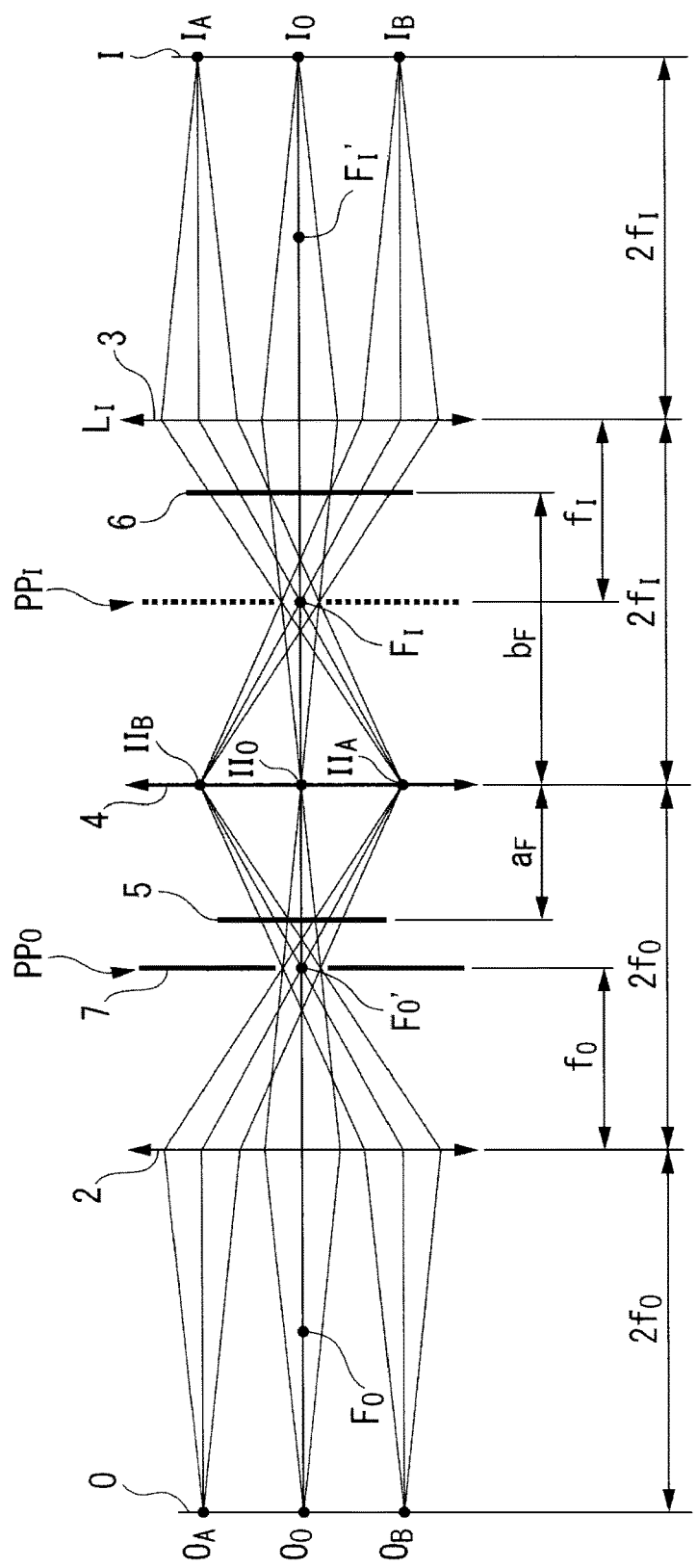
FIG. 3 is a schematic view for explaining the operation of the imaging optical system shown in FIG. 1.

In the example shown in FIG. 3, the imaging optical system 1 has a telecentric arrangement on the object O side and the image I side. Furthermore, the wavefront disturbing element 5 is disposed at a position away from the field lens 4 toward the object O by a distance $a_F$, and the wavefront restoring element 6 is disposed at a position away from the field lens 4 toward the image I by a distance $b_F$.

In FIG. 3, reference sign $f_O$ is the focal length of the imaging lens 2, reference sign $f_I$ is the focal length of the imaging lens 3, reference signs $F_O$ and $F_O'$ are focal positions of the imaging lens 2, reference signs $F_I$ and $F_I'$ are focal positions of the imaging lens 3, and reference signs $II_O$, $II_A$, and $II_B$ are intermediate images.

Here, the wavefront disturbing element 5 does not necessarily need to be disposed in the vicinity of the pupil position $PP_O$ of the imaging lens 2, and the wavefront restoring element 6 does not necessarily need to be disposed in the vicinity of the pupil position $PP_I$ of the imaging lens 3.

However, the wavefront disturbing element 5 and the wavefront restoring element 6 need to be disposed so as to have a conjugate positional relation with each other, regarding image formation at the field lens 4, as shown in Expression (1).

$$1/f_F = 1/a_F + 1/b_F \quad (1)$$

where $f_F$ is the focal length of the field lens 4.

Figure 4:
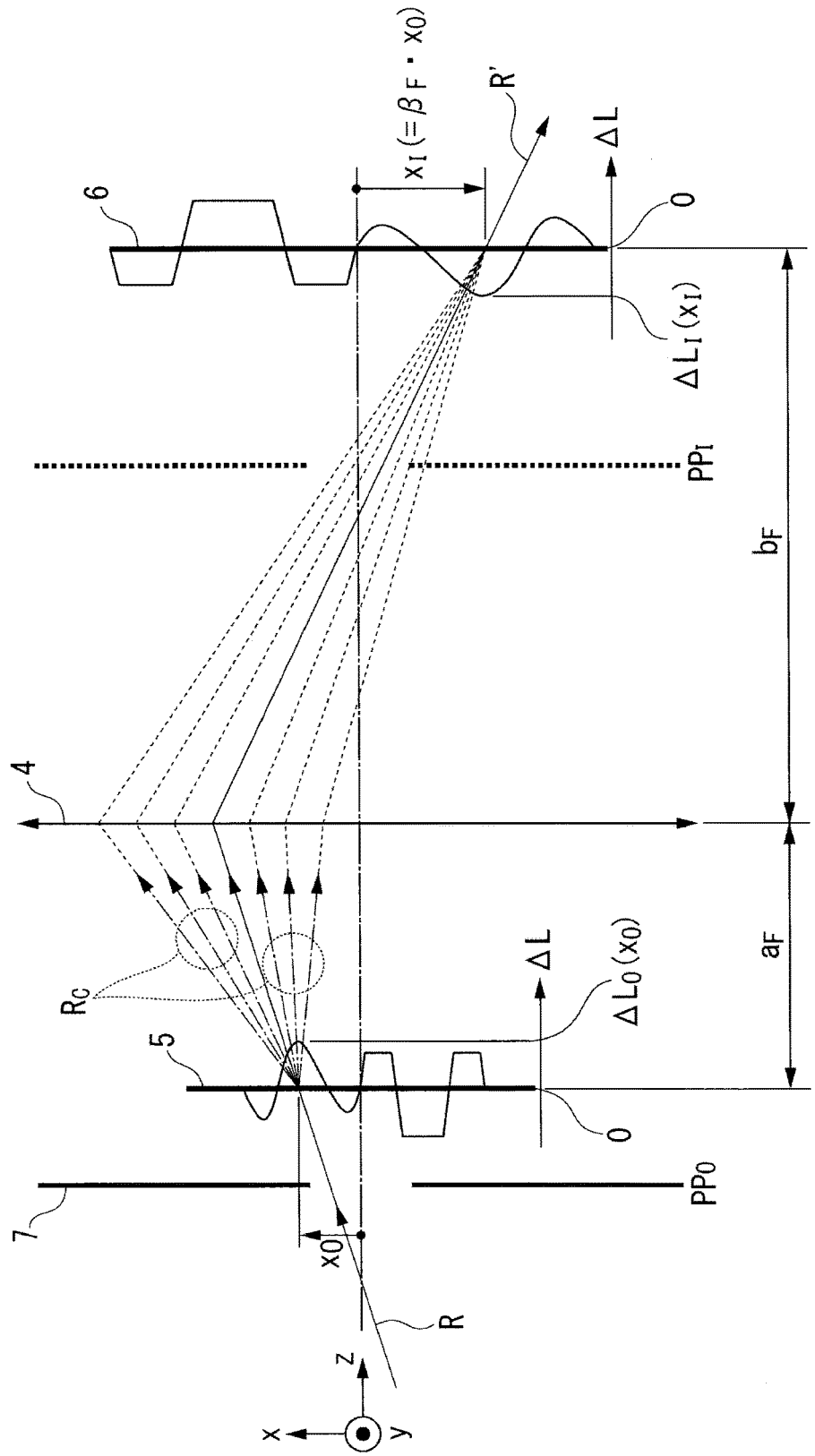
FIG. 4 is an enlarged view showing the range from an object-side pupil position to the wavefront restoring element, shown in FIG. 3.

FIG. 4 is a view showing, in detail, the range from the pupil position $PP_O$ on the object O side to the wavefront restoring element 6, shown in FIG. 3.

Here, $\Delta L$ is a phase lead that is given to light when transmitted through an optical element and that is based on a light ray transmitted through a particular position (i.e., ray height).

Furthermore, $\Delta L_O(x_O)$ is a function for giving a phase lead when light is transmitted through the wavefront disturbing element 5 at a desired ray height $x_O$, with reference to the case in which light is transmitted through the wavefront disturbing element 5 at the optical axis (x=0).

Furthermore, $\Delta L_I(x_I)$ is a function for giving a phase lead when light is transmitted through the wavefront restoring element 6 at a desired ray height $x_I$, with reference to the case in which light is transmitted through the wavefront restoring element 6 at the optical axis (x=0).

$\Delta L_O(x_O)$ and $\Delta L_I(x_I)$ satisfy Expression (2).

$$\Delta L_O(x_O) + \Delta L_I(x_I) = \Delta L_O(x_O) + \Delta L_I(\beta_F \cdot x_O) = 0 \quad (2)$$

where $\beta_F$ is a lateral magnification in the conjugate relation between the wavefront disturbing element 5 and the wavefront restoring element 6 with respect to the field lens 4 and is expressed by Expression (3).

$$\beta_F = -b_F/a_F \quad (3)$$

When a single light ray R enters the imaging optical system 1 and passes through the position $x_O$ on the wavefront disturbing element 5, the single light ray R is subjected to a phase modulation of $\Delta L_O(x_O)$, thus becoming disturbed light rays $R_C$ due to refraction, diffraction, scattering, etc. The disturbed light rays $R_C$ are projected, together with components of the light ray R that are not subjected to the phase modulation, onto a position $x_I = \beta_F \cdot x_O$ on the wavefront restoring element 6 by the field lens 4. When passing through this position, the projected light rays are subjected to a phase modulation of $\Delta L_I(\beta_F \cdot x_O) = -\Delta L_O(x_O)$, thus cancelling out the phase modulation given by the wavefront disturbing element 5. Accordingly, the light rays become a single light ray R' having no wavefront disturbance.

When the wavefront disturbing element 5 and the wavefront restoring element 6 have a conjugate positional relation and have the characteristics in Expression (2), a light ray that has passed through one position on the wavefront disturbing element 5 and that has been subjected to a phase modulation always passes through a particular position on the wavefront restoring element 6 that corresponds to the one position in a one-to-one manner and that applies a phase modulation that cancels out the phase modulation given by the wavefront disturbing element 5. The optical system shown in FIGS. 3 and 4 acts with respect to the light ray R as described above, irrespective of the incident position $x_O$ and the incident angle on the wavefront disturbing element 5. Specifically, for any light ray R, it is possible to blur an intermediate image II and to clearly form a final image I.

Figure 5:
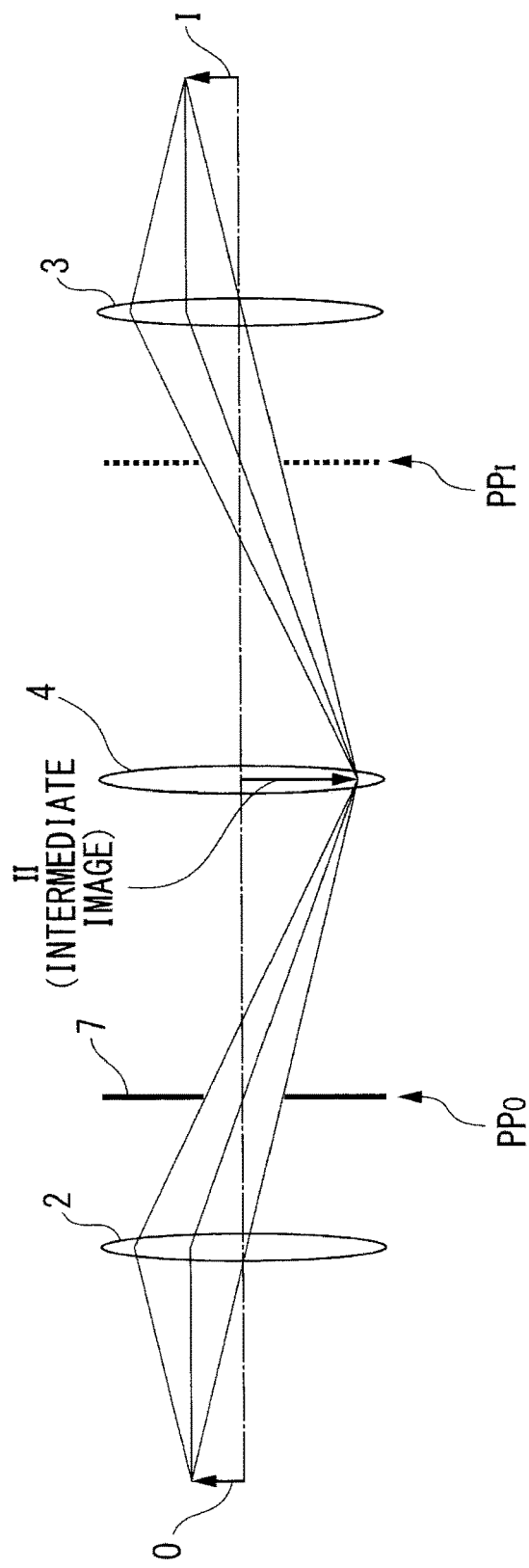
FIG. 5 is a schematic view showing an imaging optical system to be used in a conventional microscope apparatus.

FIG. 5 shows a conventional imaging optical system. In this imaging optical system, light focused by the imaging lens 2, which is close to the object O, is formed into a clear intermediate image II in the field lens 4 disposed in an intermediate image plane and is then focused by the imaging lens 3, which is close to the image I, thus being formed into a clear final image I.

The conventional imaging optical system causes a problem in that, when there is a scratch, dust, or the like on the surface of the field lens 4 or when there is a defect, such as a cavity, in the field lens 4, an image of such a foreign object is overlaid on an intermediate image clearly formed in the field lens 4 and is also formed in the final image I.

On the other hand, according to the imaging optical system 1 of this embodiment, even if there exits an intermediate image disposed at the position coincident with the position of the field lens 4, only light passing through one small lens unit of a plurality of small lens units that constitute the wavefront disturbing element 5 is formed into this image in the field lens 4, and light passing through another small lens unit that also constitutes the wavefront disturbing element 5 is located at a position shifted, in the optical axis direction, from the field lens 4. Specifically, in the field lens 4, an intermediate image II that has some clear components but is blurred as a whole is formed; therefore, when the blurred intermediate image II is made clear by being subjected to phase modulation by the wavefront restoring element 6, an image of a foreign object overlaid on the intermediate image II is blurred, except for the above-described clear components, by being subjected to the same phase modulation. Therefore, it is possible to avoid a situation in which an image of a foreign object on the intermediate imaging plane is overlaid on the clear final image I. Furthermore, by adding various arrangements, to be described later, to the power distribution and the arraying of the plurality of small lenses that constitute the wavefront disturbing element 5, it is also possible to almost completely eliminate a situation in which a foreign object on the intermediate imaging plane is overlaid on the clear final image I.

Figure 6:
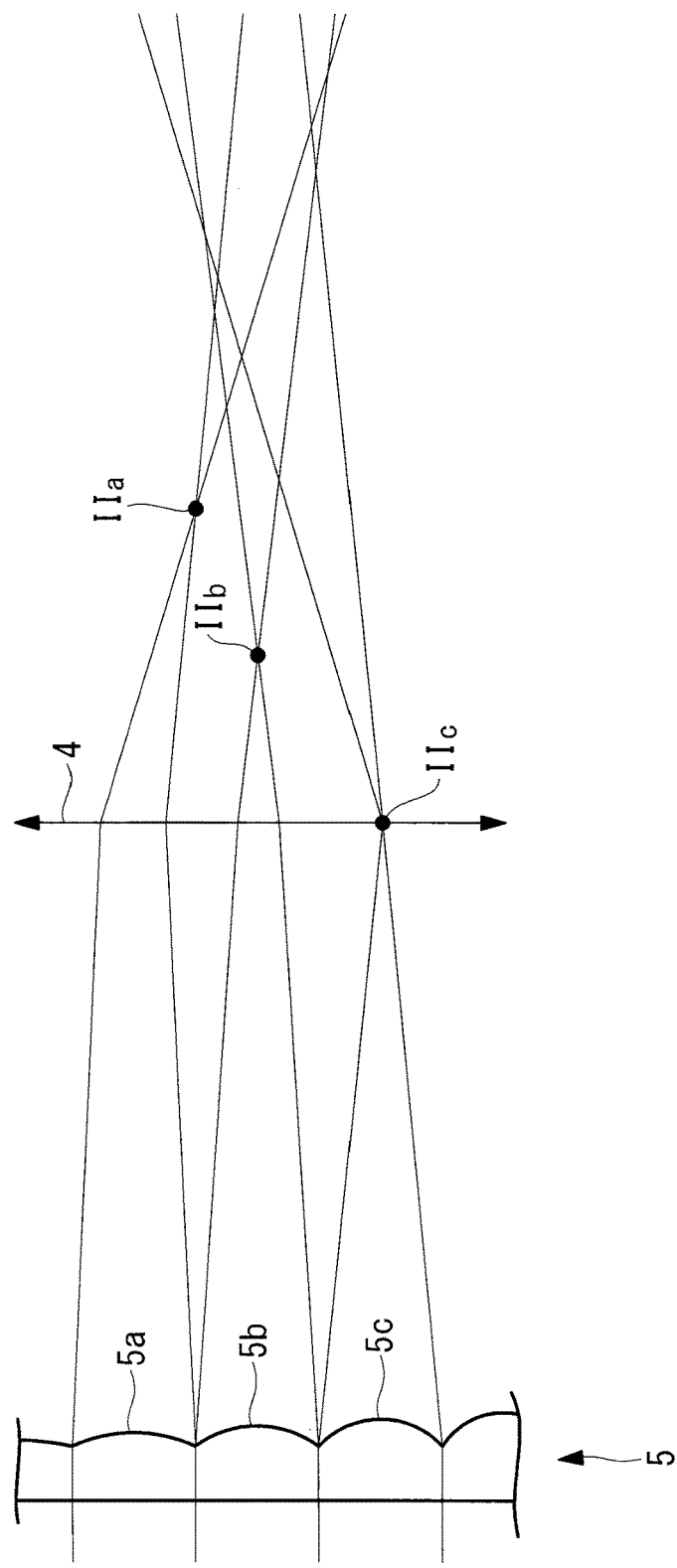
FIG. 6 is a view showing an example case in which intermediate images are formed at different positions from each other in the optical axis direction, for respective microlenses of the wavefront disturbing element shown in FIG. 2.

Here, the wavefront disturbing element 5 is formed by arraying the plurality of microlenses 5a, 5b, and 5c, which have different powers, in a direction intersecting the optical axis, and thus, light from the object is focused, for the respective microlenses 5a, 5b, and 5c, and formed into three intermediate images $II_a$, $II_b$, and $II_c$, as shown in FIG. 6. Here, each of the intermediate images $II_a$, $II_b$, and $II_c$ is not blurred and is focused at one point. However, because light that would originally be focused at one point as a single intermediate image is divided into three and focused, the intensities of the images are reduced to ⅓ compared with the original single intermediate image. Furthermore, according to the arraying of the microlenses 5a, 5b, and 5c in the direction intersecting the optical axis, the intermediate images $II_a$, $II_b$, and $II_c$ are distributed at different positions in the same direction. At the same time, the intermediate images $II_a$, $II_b$, and $II_c$ are distributed at different positions in the optical axis direction according to the magnitudes of the powers of the microlenses 5a, 5b, and 5c. The reductions in the intensities of the intermediate images and the positional distribution lead to intermediate-image blurring effects, in this embodiment. Furthermore, the operation of the microlenses 5a, 5b, and 5c leads to spatial disturbances being given to the wavefront of light.

The spatial disturbances given to the wavefront of light from the object O by the microlenses 5a, 5b, and 5c of the wavefront disturbing element 5 are cancelled out when the light passes through the microlenses 6a, 6b, and 6c of the wavefront restoring element 6.

Figure 7:
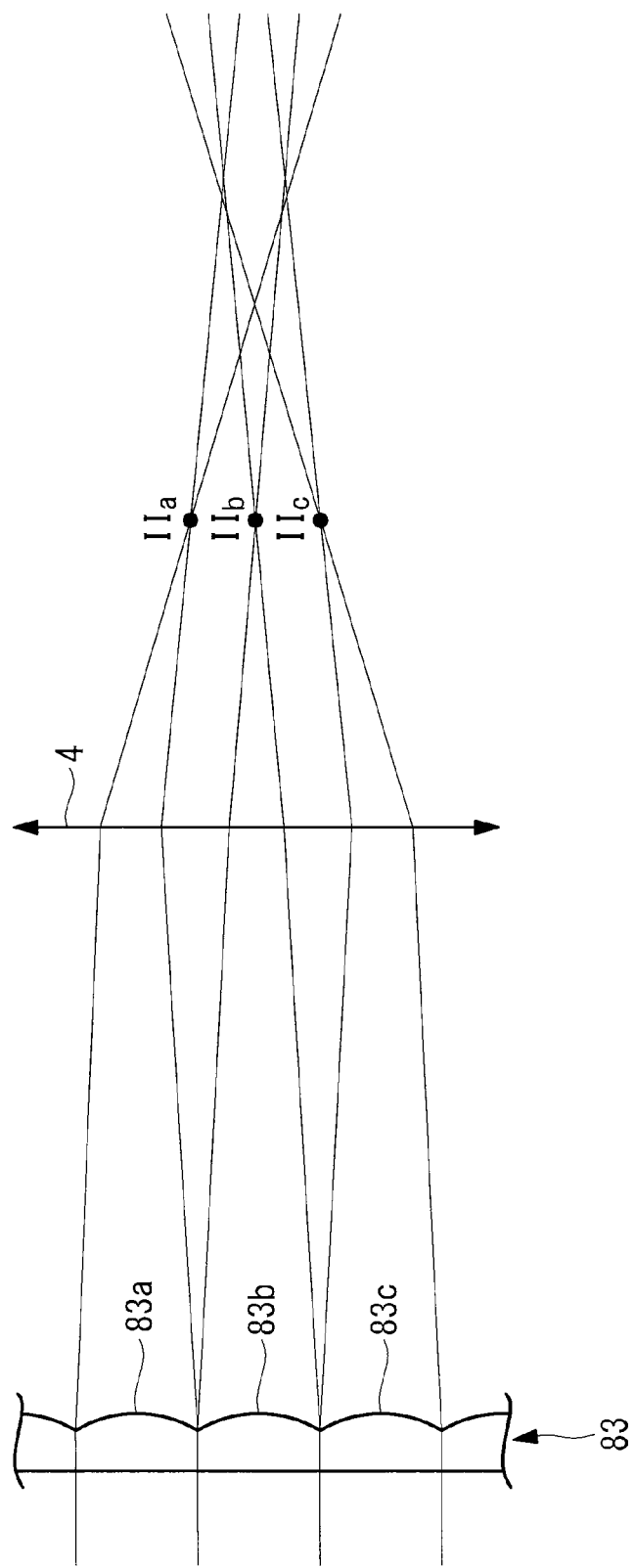
FIG. 7 is a view showing, as a comparative example of the present invention, an example case in which a plurality of intermediate images are formed at the same position in the optical axis direction, shifted from a field lens, by using a wavefront disturbing element in which microlenses have equal powers.
Figure 8:
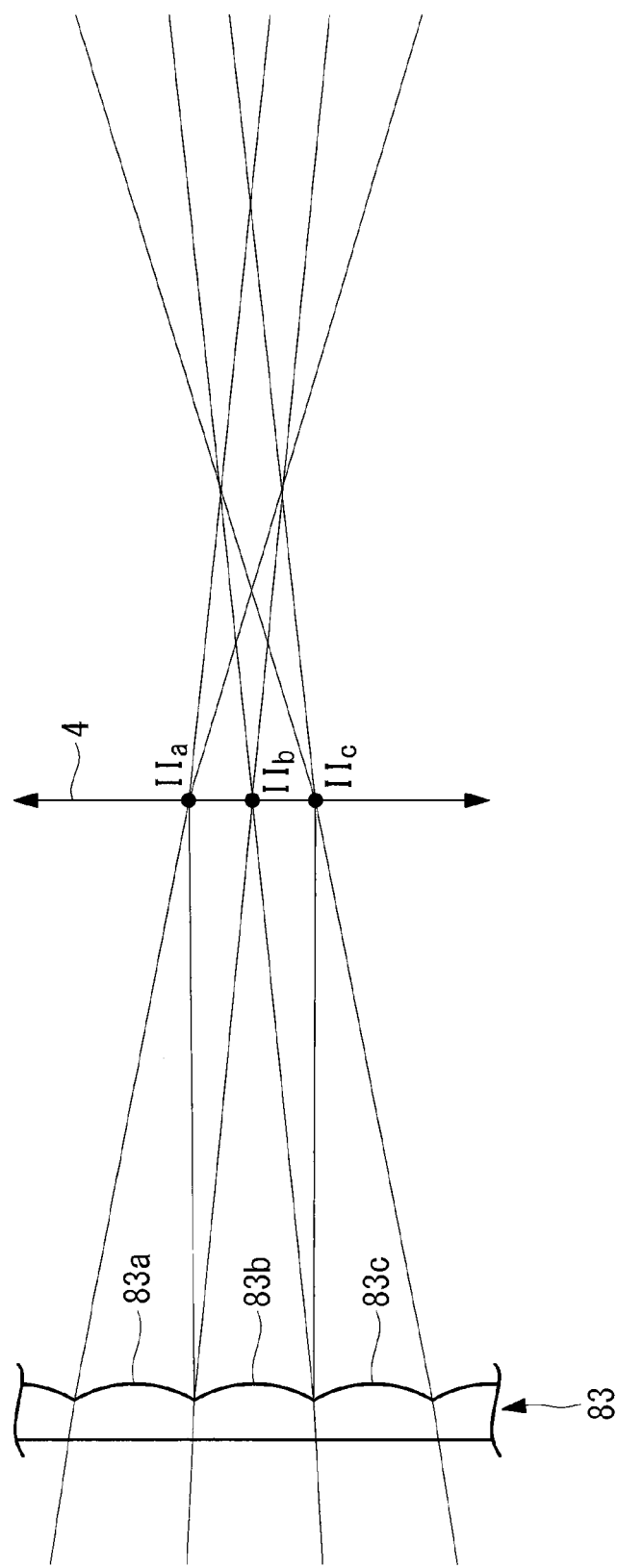
FIG. 8 is a view showing, as a comparative example of the present invention, an example case in which a plurality of intermediate images are formed on the same field lens by using a wavefront disturbing element in which microlenses have equal powers.
Figure 9:
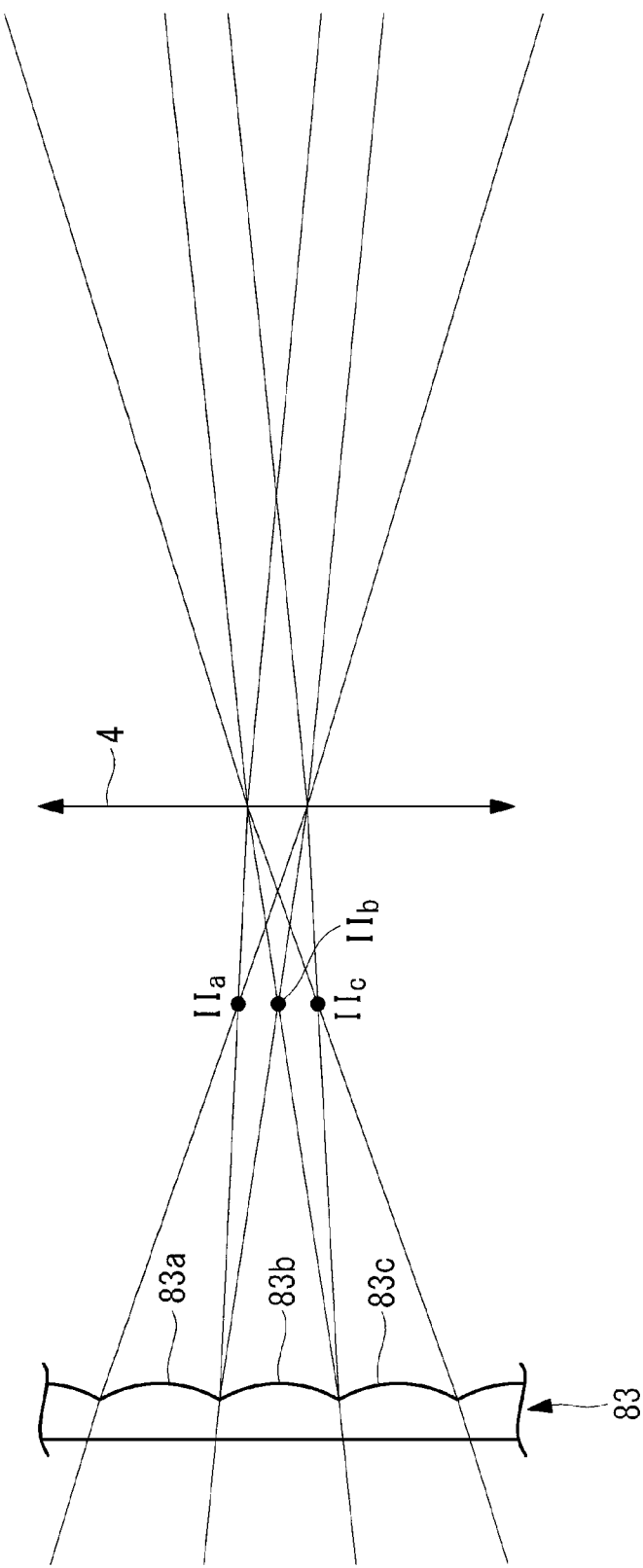
FIG. 9 is a view showing an example case in which a plurality of intermediate images are formed at the same position in the optical axis direction, shifted from the field lens, by using a wavefront disturbing element in which microlenses have equal powers, as in FIG. 7.

Here, as a comparative example, for instance, when a wavefront disturbing element 83 in which all microlenses 83a, 83b, and 83c have equal powers is used, as shown in FIGS. 7, 8, and 9, a plurality of intermediate images $II_a$, $II_b$, and $II_c$ are formed, due to the microlenses 83a, 83b, and 83c, at the same positions in the optical axis direction. As shown in FIG. 8, when the intermediate images $II_a$, $II_b$, and $II_c$ overlap with the same field lens 4, a scratch or dust on the lens is included in an image, in some cases. In the cases shown in FIGS. 7 and 9, in association with scanning (z scanning) of the focal position in the optical axis direction, the intermediate images $II_a$, $II_b$, and $II_c$ may also overlap with the single field lens 4, as shown in FIG. 8.

On the contrary, according to the imaging optical system 1 of this embodiment, as shown in FIG. 6, the powers of the microlenses 5a, 5b, and 5c of the wavefront disturbing element 5 are made different from each other, thereby distributing the positions of the intermediate images $II_a$, $II_b$, and $II_c$ in the optical axis direction and making it possible to prevent the intermediate images $II_a$, $II_b$, and $II_c$ from overlapping with the same field lens 4 or the like. Accordingly, it is possible to avoid a situation in which a scratch or dust on the lens is included in an acquired image.

Note that although a description has been given above of the case in which the two imaging lenses 2 and 3 are disposed so as to be telecentric, the present invention is not limited thereto, and the same effect is afforded with a non-telecentric system.

Furthermore, the function of the phase lead is a one-dimensional function; however, instead of this, a two-dimensional function can afford the same effect.

Furthermore, spaces between the imaging lens 2, the wavefront disturbing element 5, and the field lens 4 and spaces between the field lens 4, the wavefront restoring element 6, and the imaging lens 3 are not necessarily required, and those elements can be optically bonded.

Furthermore, the lenses constituting the imaging optical system 1, i.e., the imaging lenses 2 and 3 and the field lens 4, distinctly share the functions of image formation and pupil relaying; however, an actual imaging optical system uses a configuration in which one lens has both the functions of image formation and pupil relaying at the same time. In such a case, when the above-described condition is satisfied, the wavefront disturbing element 5 can give a disturbance to the wavefront to blur the intermediate image II, and the wavefront restoring element 6 can cancel out the wavefront disturbance to make the final image I clear.

Furthermore, in this embodiment, the wavefront disturbing element 5 is composed of the positive-power microlenses 5a, 5b, and 5c, and the wavefront restoring element 6 is composed of the negative-power microlenses 6a, 6b, and 6c. As a first modification, instead of this, for example, as shown in FIG. 10, the wavefront disturbing element 5 and the wavefront restoring element 6 may be configured such that microlenses having positive power and microlenses having negative power are mixed in the respective phase modulation elements.

Figure 10:
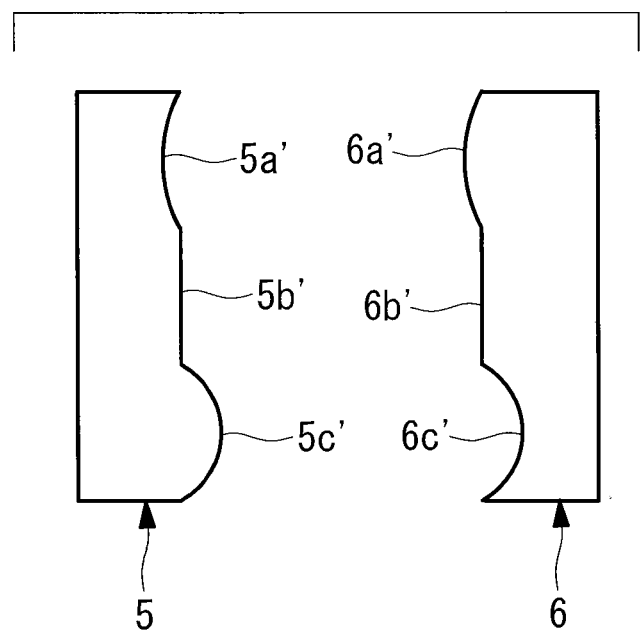
FIG. 10 is a view showing an example wavefront disturbing element and wavefront restoring element according to a first modification of the imaging optical system of the one embodiment of the present invention.

In the example of FIG. 10, the wavefront disturbing element 5 is composed of a negative-power microlens 5a', a zero-power microlens 5b', and a positive-power microlens 5c', and the wavefront restoring element 6 is composed of a positive-power microlens 6a', a zero-power microlens 6b', and a negative-power microlens 6c'.

According to this modification, light passing through the negative-power microlens 5a' and light passing through the positive-power microlens 5c' are respectively formed into intermediate images at opposite positions in the axial direction, and light passing through the zero-power microlens 5b' is formed into an intermediate image at an intermediate position therebetween. Therefore, the imaging range of the plurality of intermediate images formed, for the microlenses 5a', 5b', 5c' of the wavefront disturbing element 5, is widely distributed in the optical axis direction, thus making it possible to improve the intermediate-image blurring effect.

Furthermore, in this embodiment, the microlenses 5a, 5b, and 5c of the wavefront disturbing element 5 and the microlenses 6a, 6b, and 6c of the wavefront restoring element 6 are arrayed according to the magnitudes of their powers. As a second modification, instead of this, as shown in FIG. 11, a plurality of microlenses 5a, 5b, 5c, 5d, 5e, and 5f may be arrayed in irregular order of the magnitudes of their powers, i.e., arranged randomly.

Figure 12:
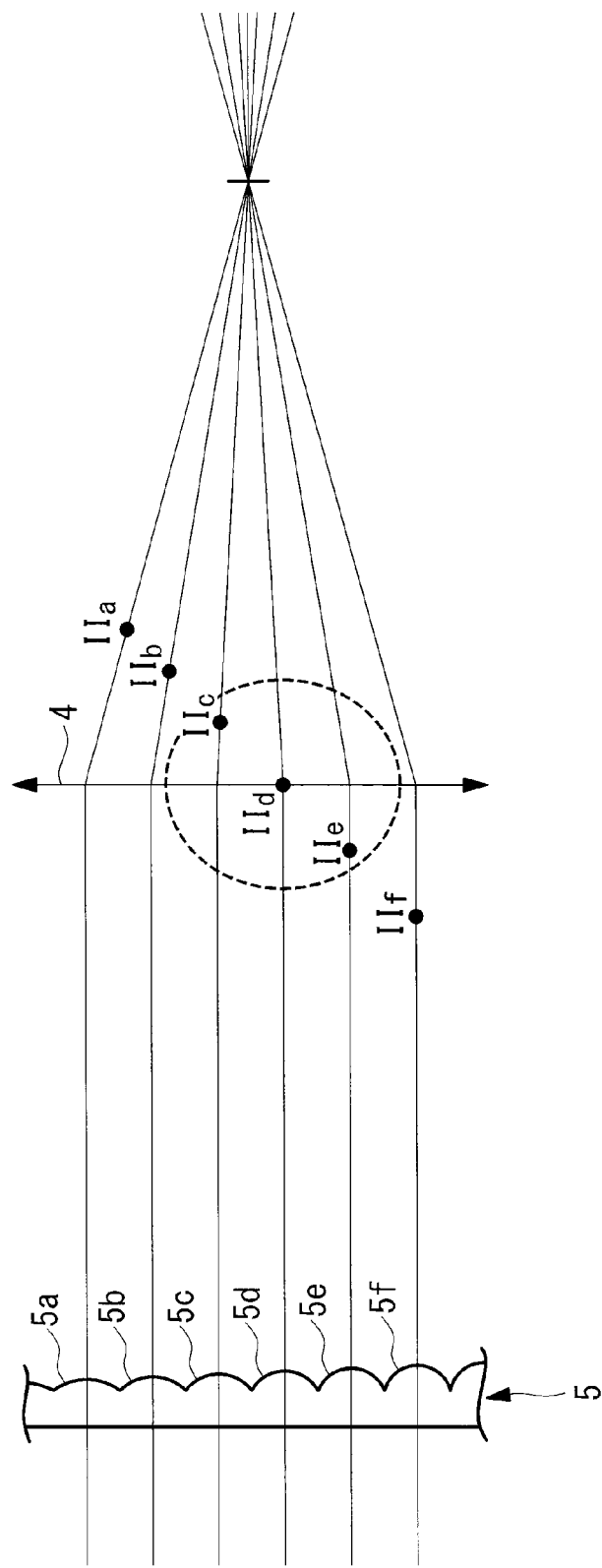
FIG. 12 is a view showing an example case in which intermediate images are linearly distributed, as a comparative example of FIG. 11.

As a comparative example of this modification, when a plurality of microlenses are arrayed according to the magnitudes of their powers, for example, as shown in FIG. 12, intermediate images $II_a$, $II_b$, $II_c$, $II_d$, $II_e$, and $II_f$ that are adjacent to each other in the array direction of the microlenses 5a, 5b, 5c, 5d, 5e, and 5f of the wavefront disturbing element 5 are tend to gather in a relatively narrow area in the optical axis direction. Thus, there is a possibility that, with respect to the field lens 4 with which any intermediate image (in the example shown in FIG. 12, the intermediate image $II_d$) overlaps, intermediate images adjacent to that intermediate image (in the same example, intermediate images $II_c$ and $II_e$) give the influence of a scratch or dust.

Figure 11:
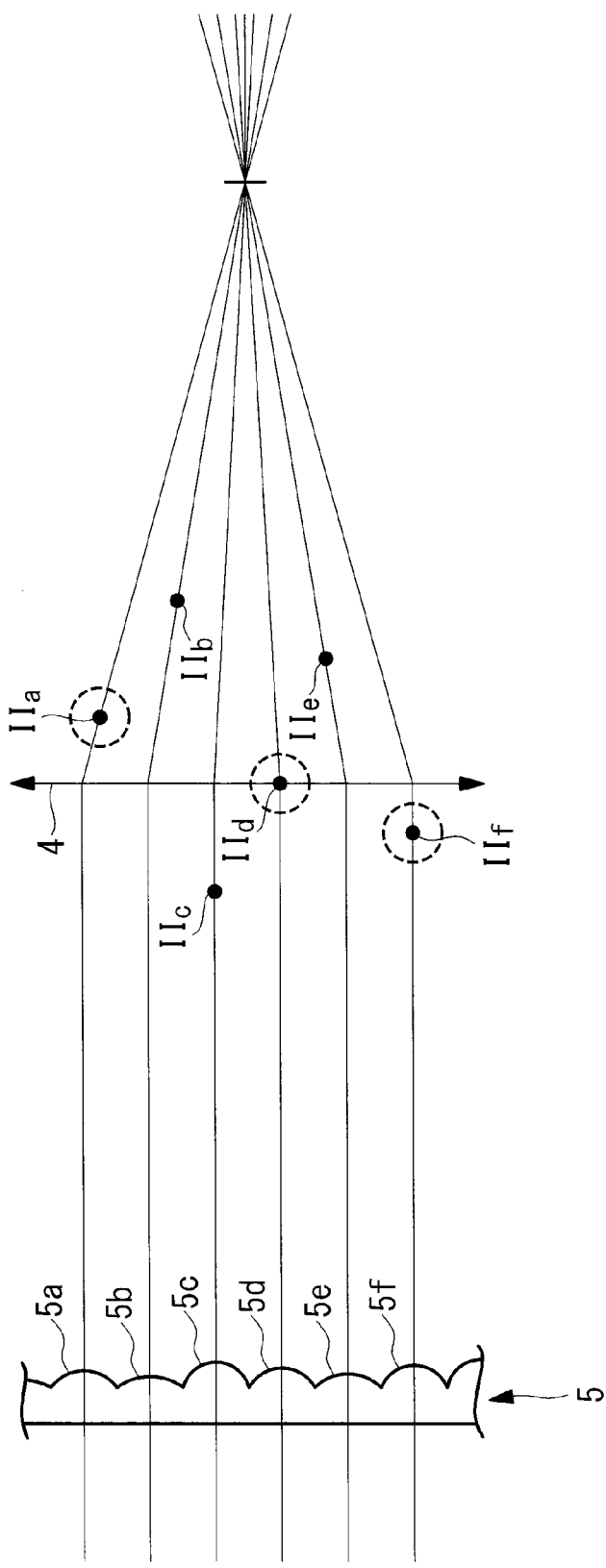
FIG. 11 is a view showing an example case in which intermediate images are distributed at different irregular positions from each other in the optical axis direction, for microlenses of the wavefront disturbing element according to a second modification of the imaging optical system of the one embodiment of the present invention.

On the contrary, according to this modification, as shown in FIG. 11, a plurality of intermediate images $II_a$, $II_b$, $II_c$, $II_d$, $II_e$, and $II_f$ that are formed for the microlenses 5a, 5b, 5c, 5d, 5e, and 5f are irregularly distributed at different positions in the axial direction, corresponding to the irregularly-arrayed magnitudes of the powers of the microlenses 5a, 5b, 5c, 5d, 5e, and 5f. Therefore, it is possible to avoid a situation in which the intermediate images that are adjacent to each other in the array direction of the microlenses 5a, 5b, 5c, 5d, 5e, and 5f of the wavefront disturbing element 5 gather in a relatively narrow area in the optical axis direction. Accordingly, it is possible to make it difficult for a scratch or dust on the lens to be included in an acquired image.

Furthermore, in this embodiment, the microlens arrays have been described as examples of the wavefront disturbing element 5 and the wavefront restoring element 6. In a third modification, as shown in FIG. 13, as the wavefront disturbing element 5 and the wavefront restoring element 6, it is possible to adopt lenticular elements that are formed by arraying a plurality of cylindrical lenses (small lens units) 8a, 8b, and 8c and a plurality of cylindrical lenses (small lens units) 9a, 9b, and 9c, in a direction intersecting the optical axis.

Figure 13:
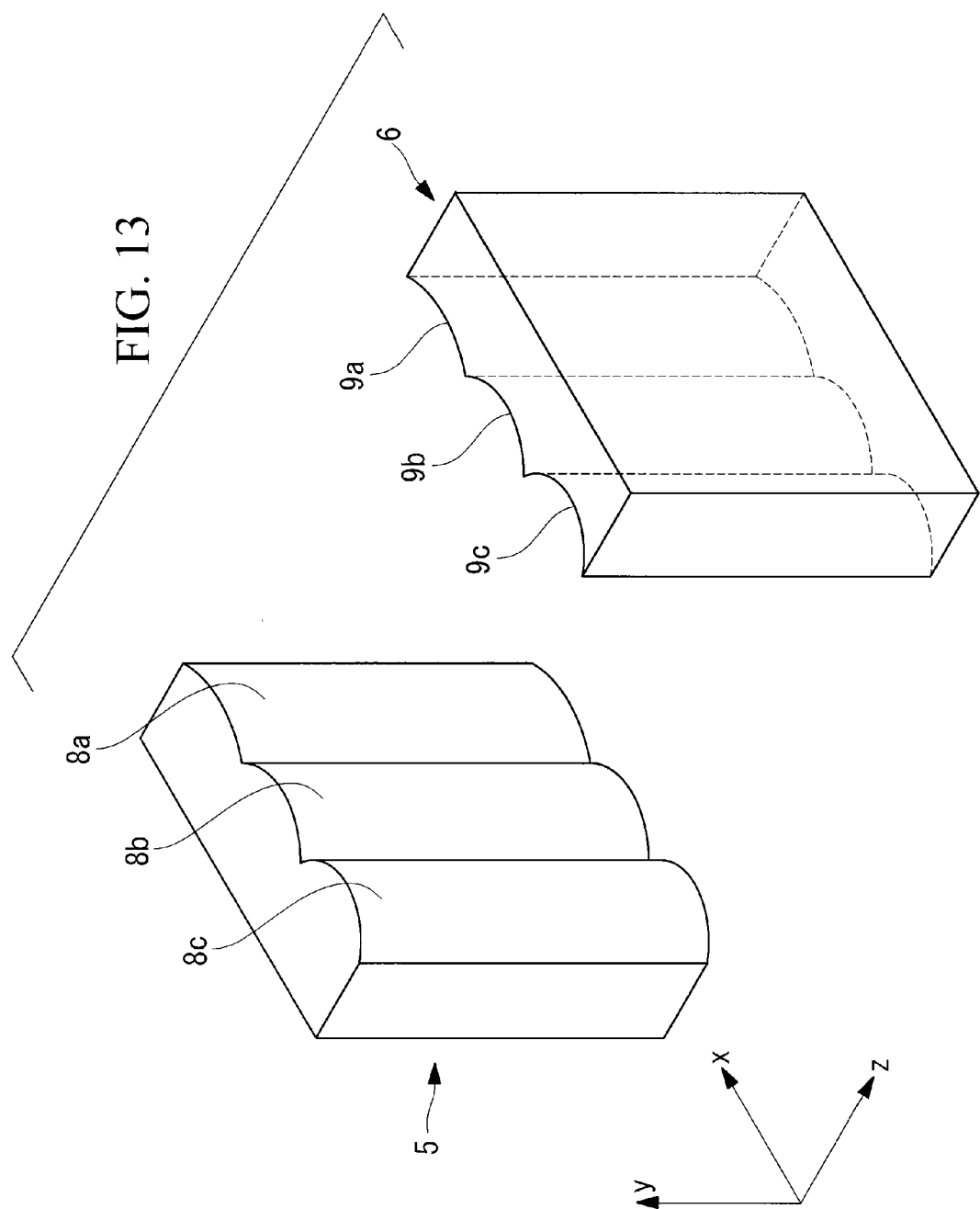
FIG. 13 is a view showing an example wavefront disturbing element and wavefront restoring element according to a third modification of the imaging optical system of the one embodiment of the present invention.

In the example shown in FIG. 13, in the wavefront disturbing element 5, the cylindrical lenses 8a, 8b, and 8c have different powers from each other, and the cylindrical lenses 8a, 8b, and 8c are arrayed in order of increasing power. Furthermore, in the wavefront restoring element 6, the cylindrical lenses 9a, 9b, and 9c have different powers from each other, and the cylindrical lenses 9a, 9b, and 9c are arrayed in order of increasing absolute value of power.

In this modification, the wavefront disturbing element 5 and the wavefront restoring element 6 may be configured such that cylindrical lenses having positive power and cylindrical lenses having negative power are mixed in the respective phase modulation elements. Furthermore, the plurality of cylindrical lenses 8a, 8b, and 8c and the plurality of cylindrical lenses 9a, 9b, and 9c may be arrayed in irregular order of the magnitudes of their powers, in the wavefront disturbing element 5 and the wavefront restoring element 6, respectively.

Figure 14:
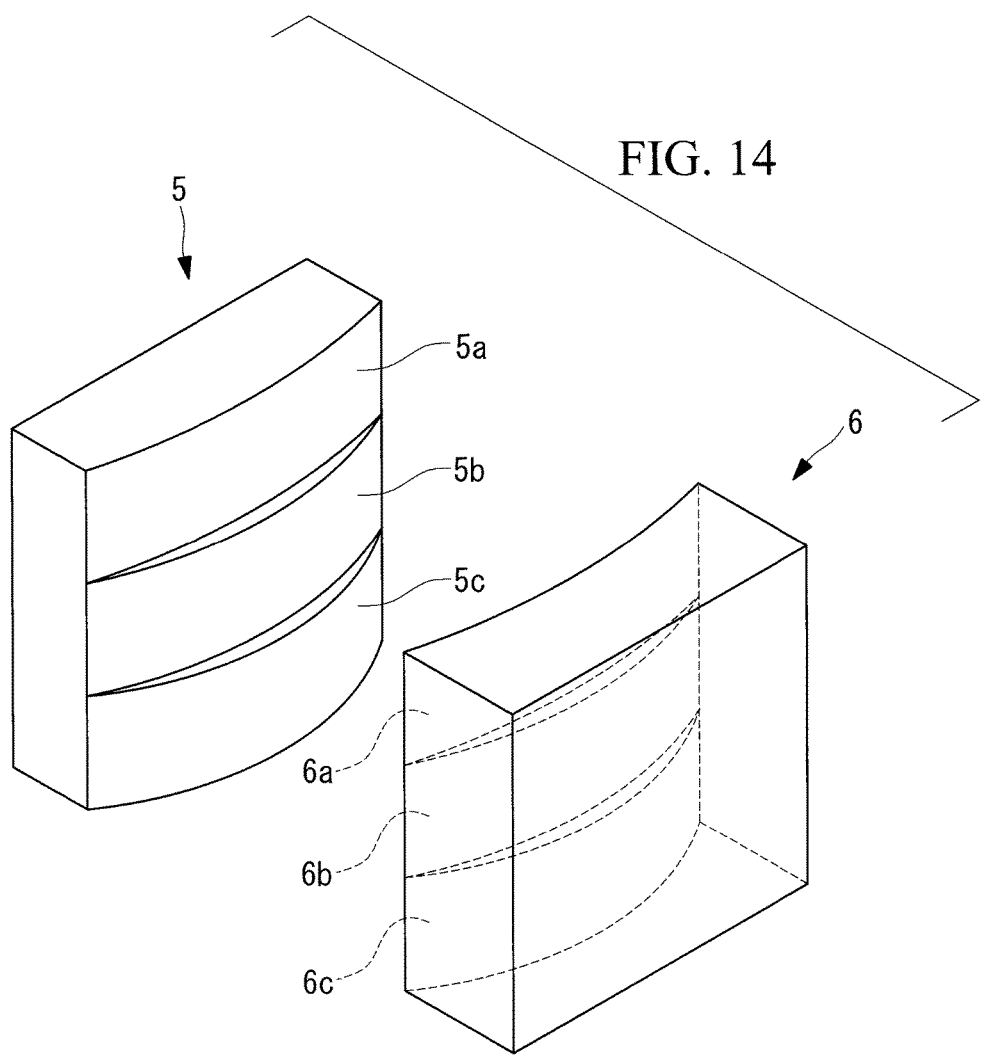
FIG. 14 is a view showing another example wavefront disturbing element and wavefront restoring element according to the third modification of the imaging optical system of the one embodiment of the present invention.

In FIG. 13, a description has been given of the wavefront disturbing element 5 and the wavefront restoring element 6 in which the cylindrical lenses 8a, 8b, and 8c and the cylindrical lenses 9a, 9b, and 9c are arrayed in the direction in which they have curvature. Instead of this, as shown in FIG. 14, it is also possible to adopt the wavefront disturbing element 5 and the wavefront restoring element 6 in which the cylindrical lenses 8a, 8b, and 8c and the cylindrical lenses 9a, 9b, and 9c are arrayed in a direction intersecting the direction in which they have curvature.

Figure 15:
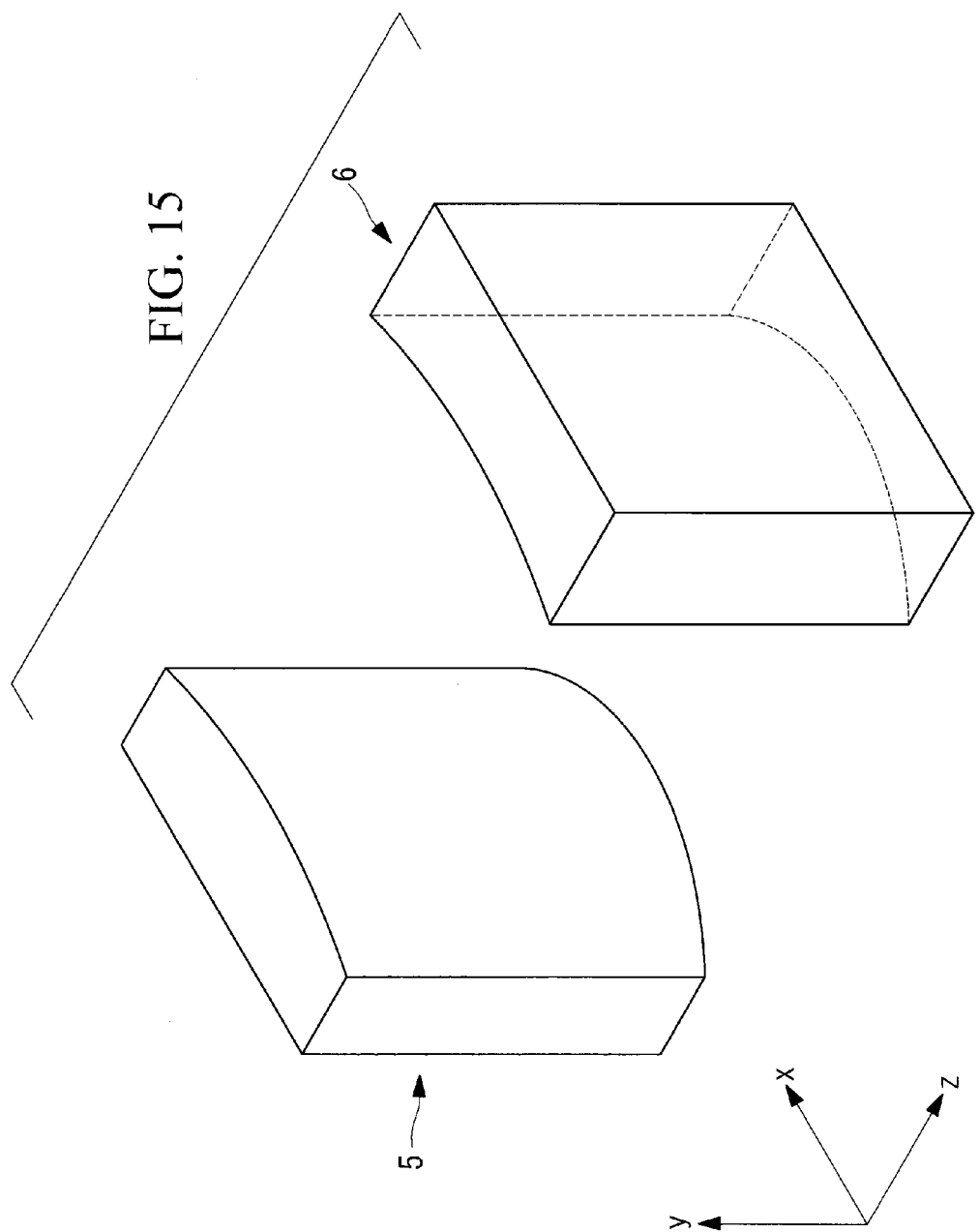
FIG. 15 is a view showing an example wavefront disturbing element and wavefront restoring element according to a fourth modification of the imaging optical system of the one embodiment of the present invention.

Furthermore, in a fourth modification, as shown in FIG. 15, as each of the wavefront disturbing element 5 and the wavefront restoring element 6, it is possible to adopt a single progressive-power cylindrical lens in which different powers are continuously arrayed in a direction intersecting the optical axis. In this case, the single progressive-power cylindrical lens is segmented into countless small lens units according to the magnitudes of their powers. In the example shown in FIG. 15, each of the wavefront disturbing element 5 and the wavefront restoring element 6 has powers in the x direction and has a shape in which the absolute values of the powers decrease in the +y direction and increase in the −y direction.

Figure 16:
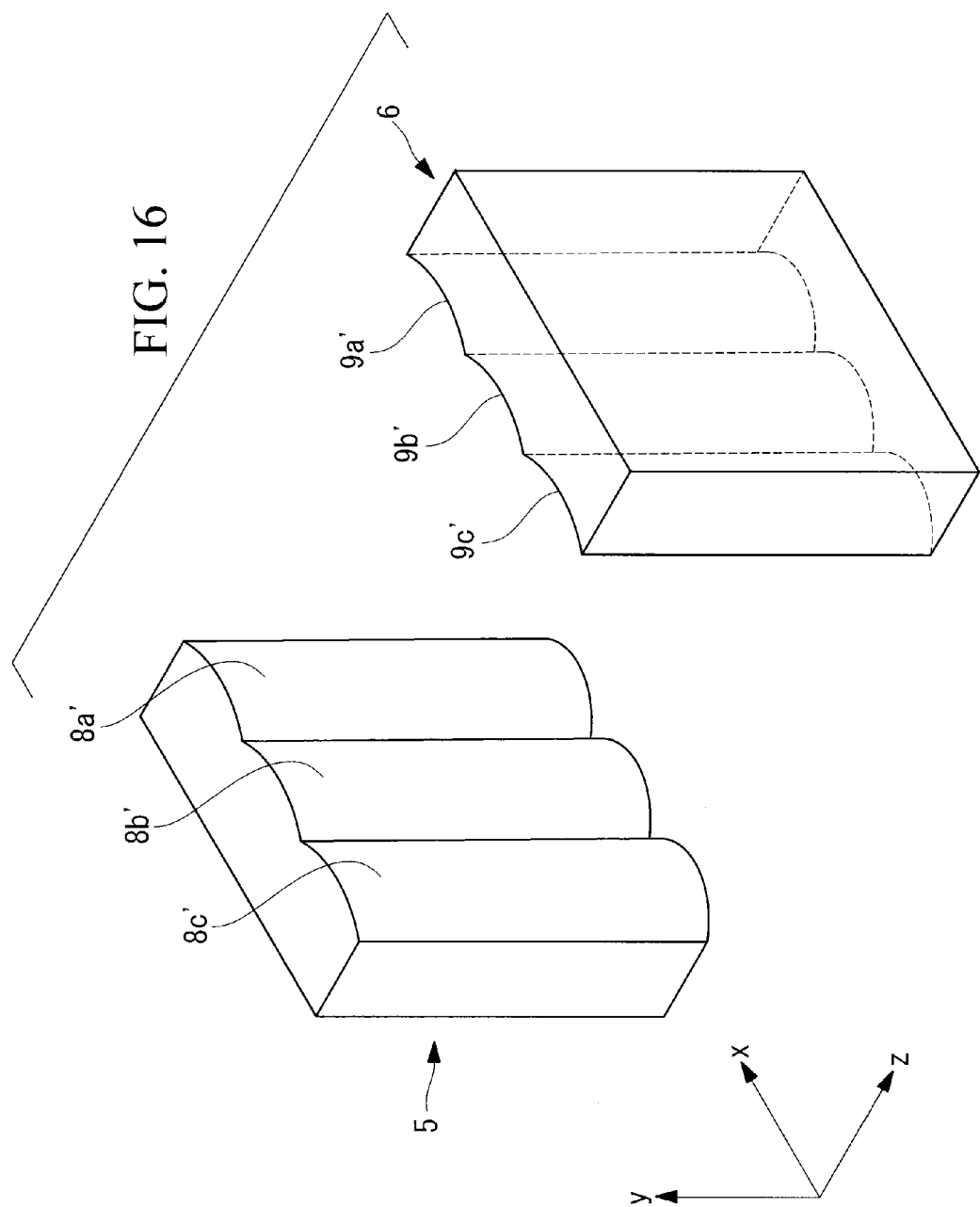
FIG. 16 is a view showing an example wavefront disturbing element and wavefront restoring element according to a fifth modification of the imaging optical system of the one embodiment of the present invention.

Furthermore, in a fifth modification, as shown in FIG. 16, as the wavefront disturbing element 5 and the wavefront restoring element 6, it is also possible to adopt lenticular elements in which a plurality of progressive-power cylindrical lenses (small lens units) 8a', 8b', and 8c' and a plurality of progressive-power cylindrical lenses 9a', 9b', and 9c' that have an infinite number of powers in a direction intersecting the optical axis are arrayed in the direction intersecting the optical axis.

In the example shown in FIG. 16, the wavefront disturbing element 5 and the wavefront restoring element 6 each have a shape in which the progressive-power cylindrical lenses 8a', 8b', and 8c' or the progressive-power cylindrical lenses 9a', 9b', and 9c' have powers in the x direction, and the absolute values of the powers decrease in the +y direction and increase in the −y direction.

The progressive-power cylindrical lenses shown in FIGS. 15 and 16 are the same as ordinary cylindrical lenses in that astigmatism is caused, blurring an intermediate image, but are different from ordinary cylindrical lenses in that, with respect to one light flux, there exist not one, but countless magnitudes of the astigmatism caused, i.e., astigmatic differences.

In the case of the progressive-power cylindrical lenses shown in FIGS. 15 and 16, because the power in the y direction is zero, the focal point of a light flux in a yz cross section is determined to be one; however, because the power in the x direction is not zero and continuously changes in the y direction, the focal point of a light flux in an xz cross section changes depending on the height (the position in the y direction) of each of the progressive-power cylindrical lenses at which the light flux passes through. Specifically, in the progressive-power cylindrical lenses shown in FIGS. 15 and 16, there exist countless magnitudes of astigmatic differences with respect to a light flux that has a limited thickness in the y direction. Such characteristics help in avoiding a situation in which a scratch or dust on the lens etc. is included in an acquired image.

Figure 17:
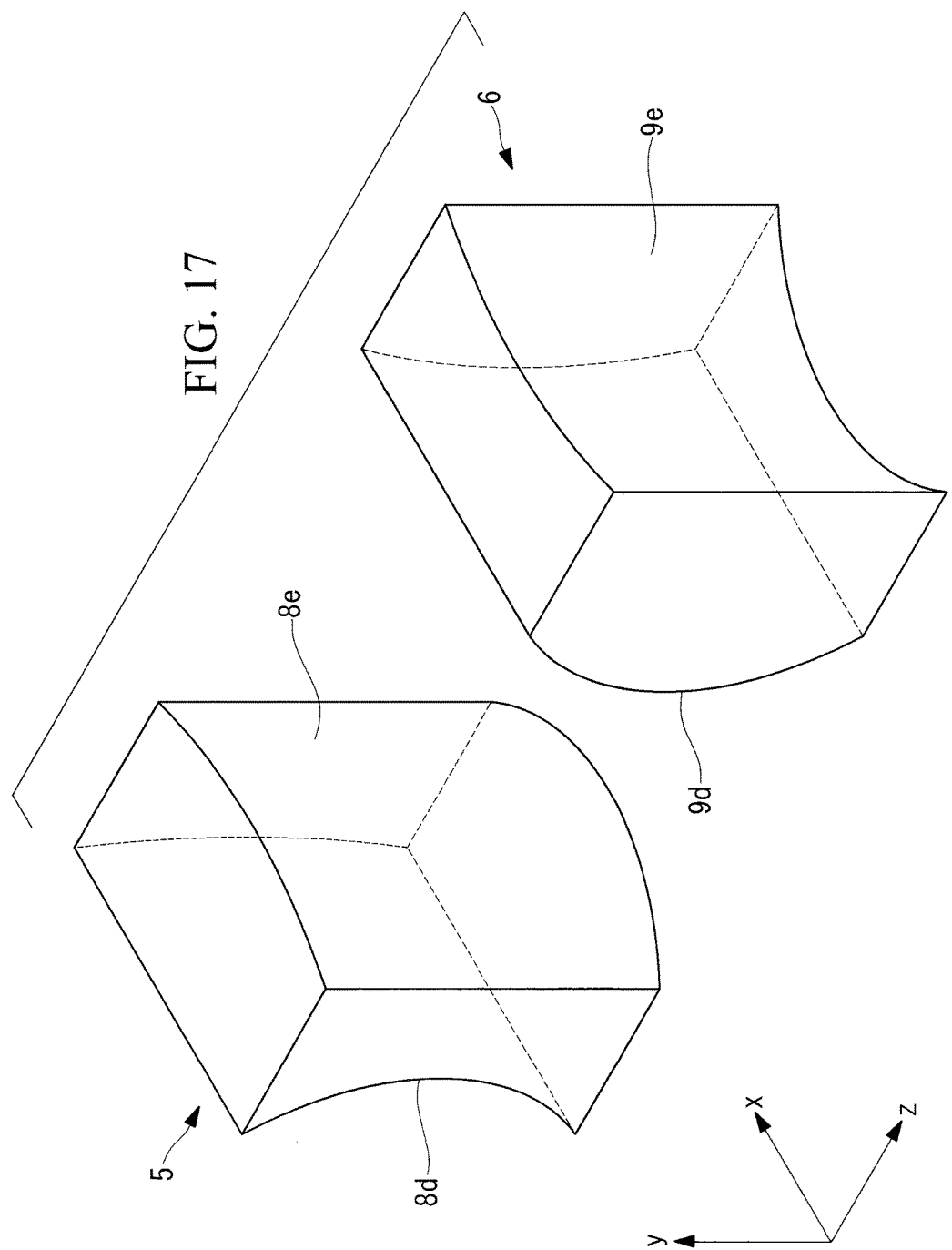
FIG. 17 is a view showing an example wavefront disturbing element and wavefront restoring element according to a sixth modification of the imaging optical system of the one embodiment of the present invention.

As a sixth modification, as shown in FIG. 17, as the wavefront disturbing element 5 and the wavefront restoring element 6, it is possible to adopt progressive-power cylindrical lenses that each have powers on both sides, for example. In the example shown in FIG. 17, the progressive-power cylindrical lens that forms the wavefront disturbing element 5 has a concave surface 8d and a convex surface 8e that are disposed opposite to each other and that have powers in directions perpendicular to each other. Furthermore, the concave surface 8d has powers in the y direction and has a shape in which the absolute values of the powers decrease in the +x direction and increase in the −x direction. The convex surface 8e has powers in the x direction and has a shape in which the powers decrease in the +y direction and increase in the −y direction. The progressive-power cylindrical lens that forms the wavefront restoring element 6 has a convex surface 9d and a concave surface 9e that have inverse phases from the surfaces 8d and 8e. By adopting these wavefront disturbing element 5 and wavefront restoring element 6, intermediate images are formed in a complicated manner, thus making it possible to improve the blurring effect.

Next, an observation device 10 according to a first embodiment of the present invention will be described below with reference to the drawings.

Figure 18:
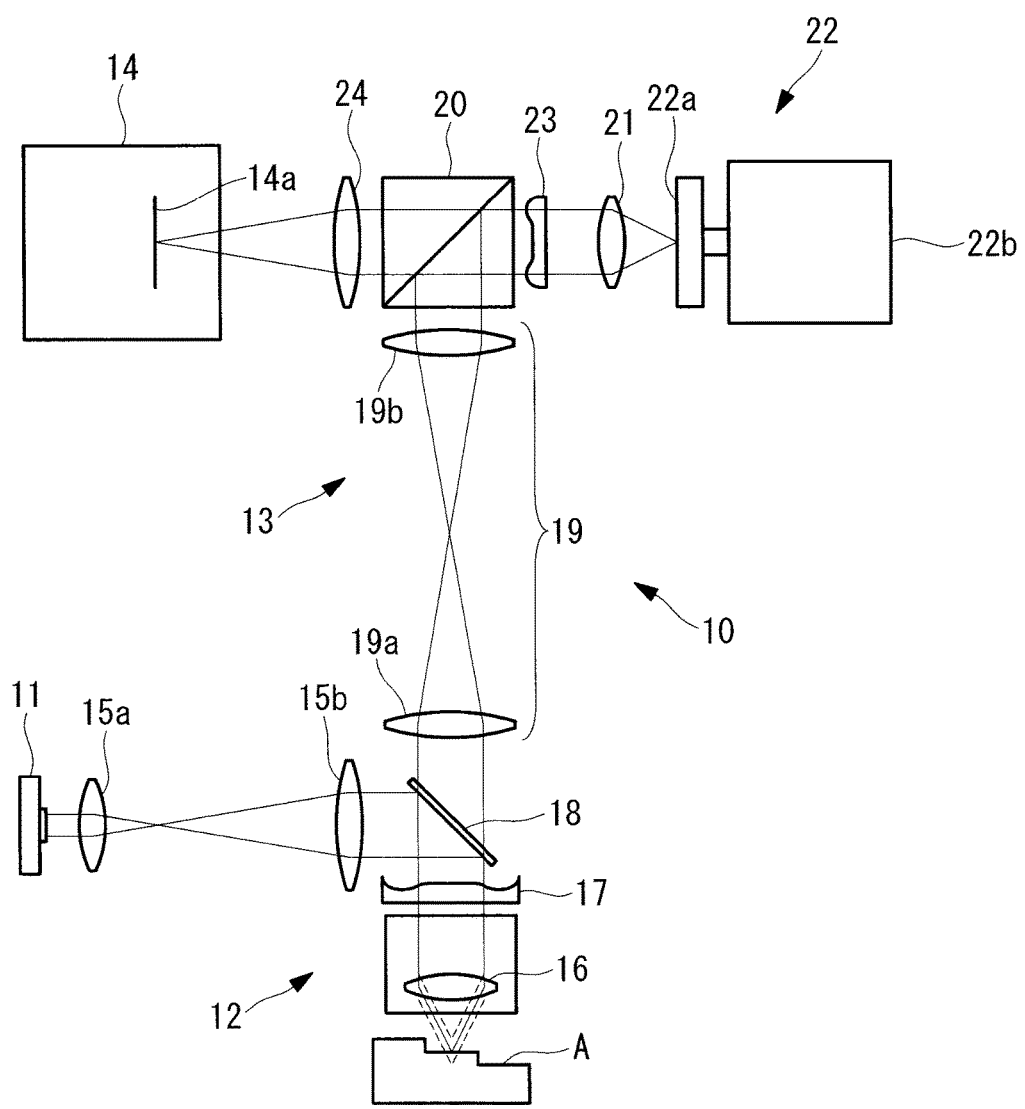
FIG. 18 is a schematic view showing an observation device according to a first embodiment of the present invention.

As shown in FIG. 18, the observation device 10 of this embodiment is provided with: a light source 11 that produces non-coherent illumination light; an illumination optical system 12 that radiates the illumination light from the light source 11 onto an observation object A; an imaging optical system 13 that focuses light from the observation object A; and an image acquisition device (photodetector) 14 that acquires an image by imaging the light focused by the imaging optical system 13.

The illumination optical system 12 is provided with: focusing lenses 15a and 15b that focus illumination light from the light source 11; and an objective lens 16 that radiates the illumination light focused by the focusing lenses 15a and 15b onto the observation object A.

Furthermore, the illumination optical system 12 uses so-called Kohler illumination, and the focusing lenses 15a and 15b are provided such that a light-emitting face of the light source 11 and a pupil plane of the objective lens 16 become conjugate with each other.

The imaging optical system 13 is provided with: the objective lens (imaging lens) 16 that focuses observation light (for example, reflected light) produced in the observation object A disposed on the object side; a wavefront disturbing element (first phase modulation element) 17 that gives a disturbance to the wavefront of the observation light focused by the objective lens 16; a first beam splitter 18 that splits off the light whose wavefront has been disturbed, from an illumination light path extending from the light source 11; a first intermediate imaging-lens pair 19 that is provided with a space therebetween in the optical axis direction; a second beam splitter 20 that deflects light that has passed through lenses 19a and 19b of the first intermediate imaging-lens pair 19 by 90 degrees; a second intermediate imaging lens 21 that focuses the light deflected by the second beam splitter 20 to form an intermediate image; an optical-path-length varying means 22 that is disposed in an intermediate image plane of the second intermediate imaging lens 21; a wavefront restoring element (second phase modulation element) 23 that is disposed between the second beam splitter 20 and the second intermediate imaging lens 21; and an imaging lens 24 that focuses light that is transmitted through the wavefront restoring element 23 and the second beam splitter 20, to form a final image.

The image acquisition device 14 is, for example, a two-dimensional image sensor such as a CCD or a CMOS, is provided with an imaging surface 14a that is disposed at an imaging position where the final image is formed by the imaging lens 24, and images light incident thereon, thereby making it possible to acquire a two-dimensional image of the observation object A.

The wavefront disturbing element 17 is disposed in the vicinity of the pupil position of the objective lens 16. The wavefront disturbing element 17 is formed of an optically transparent material through which light can be transmitted and applies, to the wavefront of light when transmitted therethrough, a phase modulation conforming to a concavo-convex shape of the surface thereof. In this embodiment, when observation light from the observation object A is transmitted therethrough once, a required wavefront disturbance is given thereto.

Furthermore, the wavefront restoring element 23 is disposed in the vicinity of the pupil position of the second intermediate imaging lens 21. The wavefront restoring element 23 is also formed of an optically transparent material through which light can be transmitted and applies, to the wavefront of light when transmitted therethrough, a phase modulation conforming to a concavo-convex shape of the surface thereof. In this embodiment, when the observation light that has been deflected by the beam splitter 20 and observation light that has been reflected, so as to turn around, at the optical-path-length varying means 22 are transmitted through the wavefront restoring element 23 two times in a round trip, the wavefront restoring element 23 applies, to the wavefront of the light, a phase modulation that cancels out the wavefront disturbance given by the wavefront disturbing element 17.

As the wavefront disturbing element 17 and the wavefront restoring element 23, microlens arrays in which a plurality of microlenses (small lens units) that have different powers in directions intersecting the optical axis are used, for example, as in the wavefront disturbing element 5 and the wavefront restoring element 6 of one embodiment in the imaging optical system 1 of the present invention. In the example shown in FIG. 18, the wavefront disturbing element 17 is composed of a plurality of microlenses having negative powers, and the wavefront restoring element 23 is composed of a plurality of microlenses having positive powers.

The optical-path-length varying means 22, which serves as an optical-axis (Z-axis) scanning system, is provided with: a plane mirror 22a that is provided so as to be perpendicular to the optical axis and an actuator 22b that displaces the plane mirror 22a in the optical axis direction. When the plane mirror 22a is displaced in the optical axis direction through the actuation of the actuator 22b of the optical-path-length varying means 22, the optical path length between the second intermediate imaging lens 21 and the plane mirror 22a is changed, thereby changing a position, in the observation object A, that is conjugate with the imaging surface 14a, i.e., the focal position in front of the objective lens 16, in the optical axis direction.

In order to observe the observation object A by using the thus-configured observation device 10 of this embodiment, illumination light from the light source 11 is radiated onto the observation object A by the illumination optical system 12. Observation light produced in the observation object A is focused by the objective lens 16, is transmitted through the wavefront disturbing element 17 once, passes through the first beam splitter 18 and the first intermediate imaging-lens pair 19, is deflected at the second beam splitter 20 by 90 degrees, is transmitted through the wavefront restoring element 23, is reflected, so as to turn around, at the plane mirror 22a of the optical-path-length varying means 22, is transmitted through the wavefront restoring element 23 again, and is transmitted through the second beam splitter 20, and a final image formed by the imaging lens 24 is acquired by the image acquisition device 14.

When the plane mirror 22a is moved in the optical axis direction by actuating the actuator 22b of the optical-path-length varying means 22, the optical path length between the second intermediate imaging lens 21 and the plane mirror 22a can be changed, thereby making it possible to move the focal position in front of the objective lens 16 in the optical axis direction to perform scanning. Then, the observation light is imaged at different focal positions, thereby making it possible to acquire a plurality of images focused at different positions in the observation object A in the depth direction. Furthermore, these images are composited through averaging and are then subjected to high-frequency enhancement processing, thereby making it possible to acquire an image with a large depth of field.

In this case, although an intermediate image is formed, by the second intermediate imaging lens 21, in the vicinity of the plane mirror 22a of the optical-path-length varying means 22, this intermediate image is blurred due to a wavefront disturbance that remains after a wavefront disturbance given to the wavefront of light when transmitted through the wavefront disturbing element 17 is partially cancelled out when transmitted through the wavefront restoring element 23 once. Then, the light, after being formed into the blurred intermediate image, is focused by the second intermediate imaging lens 21 and is then made to pass through the wavefront restoring element 23 again, thereby completely cancelling out the wavefront disturbance.

Here, since the wavefront disturbing element 17 is composed of a plurality of microlenses having different powers from each other, the second intermediate imaging lens 21 forms intermediate images for the respective microlenses, and the respective intermediate images are distributed at different positions in the optical axis direction according to the magnitudes of the powers of the microlenses. Therefore, the respective intermediate images are prevented from overlapping with the plane mirror 22a of the optical-path-length varying means 22 or the like, thus making it possible to avoid a situation in which a scratch or dust on the plane mirror 22a or the like is included in an acquired image.

As a result, according to the observation device 10 of this embodiment, there is an advantage in that, even when a foreign object, such as a scratch or dust, exists on the surface of the plane mirror 22a, it is possible to prevent an image of the foreign object from being formed while being overlaid on a final image and to acquire a clear image of the observation object A.

Furthermore, in the same way, when the focal position in the observation object A is moved in the optical axis direction, an intermediate image formed by the first intermediate imaging-lens pair 19 is largely fluctuated in the optical axis direction; however, as a result of the fluctuation, even when the intermediate image overlaps with the position of the first intermediate imaging-lens pair 19, or, even when any other optical element exists within the fluctuation range, because the intermediate image is blurred, it is possible to prevent an image of the foreign object from being formed while being overlaid on the final image. In this embodiment, in the case where the above-described scanning system is provided, even when light is moved along the Z-axis on any optical element disposed in the imaging optical system, a noise image is not formed.

Next, an observation device 30 according to a second embodiment of the present invention will be described below with reference to the drawings.

In this embodiment, identical reference signs are assigned to portions having configurations common to those of the observation device 10 of the above-described first embodiment, and a description thereof will be omitted.

Figure 19:
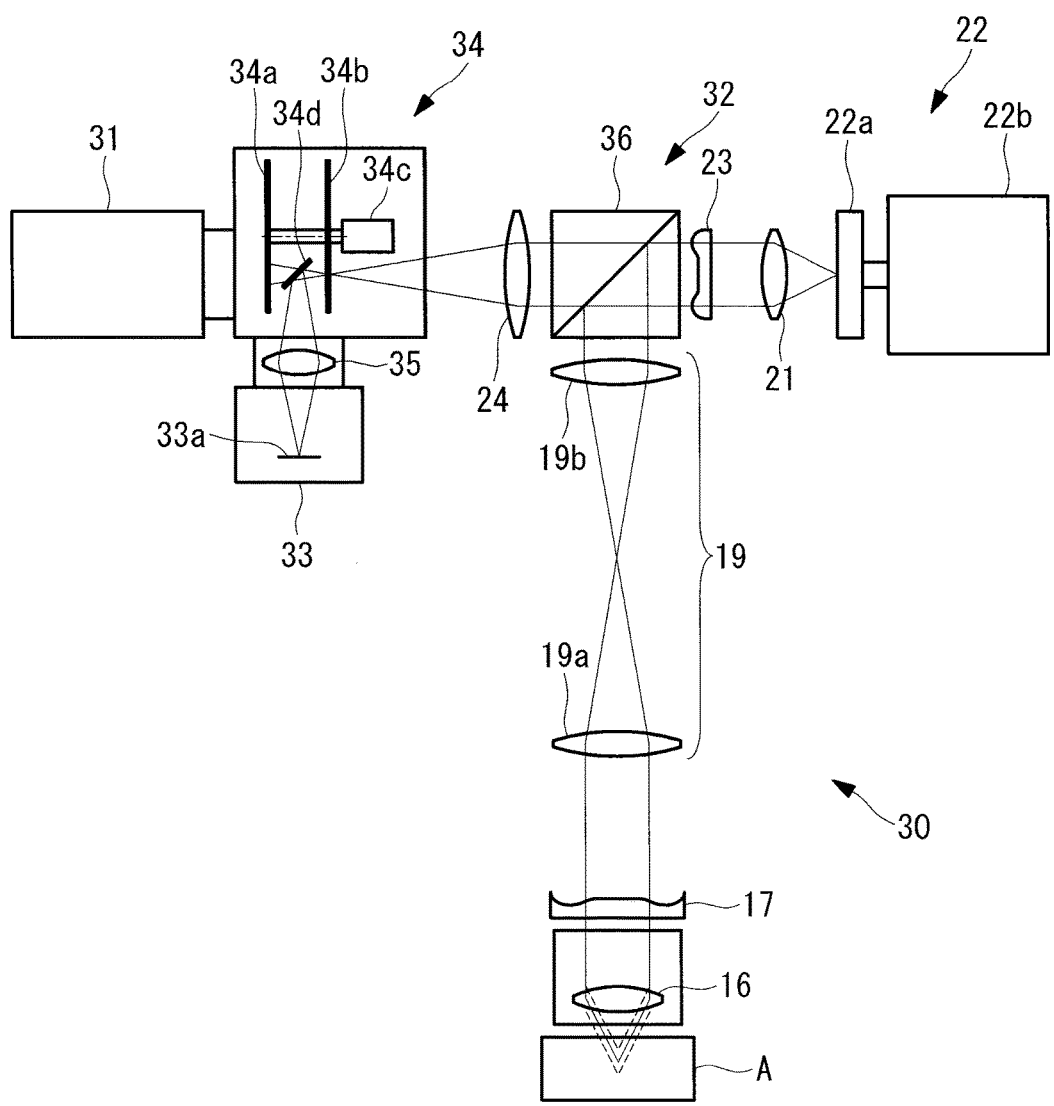
FIG. 19 is a schematic view showing an observation device according to a second embodiment of the present invention.

As shown in FIG. 19, the observation device 30 of this embodiment is provided with: a laser light source 31; an imaging optical system 32 that focuses laser light from the laser light source 31 on the observation object A and that focuses light from the observation object A; an image acquisition device (photodetector) 33 that images light focused by the imaging optical system 32; and a Nipkow-disk confocal optical system 34 that is disposed among the light source 31, the image acquisition device 33, and the imaging optical system 32. The laser light source 31, the imaging optical system 32, and the Nipkow-disk confocal optical system 34 constitute an illuminating device.

The Nipkow-disk confocal optical system 34 is provided with: two disks 34a and 34b that are disposed in parallel with a space therebetween; and an actuator 34c that simultaneously rotates the disks 34a and 34b. A large number of microlenses (not shown) are arrayed on the disk 34a, which is close to the laser light source 31, and a large number of pinholes (not shown) are provided in the disk 34b, which is close to the object, at positions corresponding to the microlenses. Furthermore, a dichroic mirror 34d that splits off light passing through the pinholes is fixed in the space between the two disks 34a and 34b, light split off at the dichroic mirror 34d is focused by a focusing lens 35 and is formed into a final image on an imaging surface 33a of the image acquisition device 33, and an image thereof is acquired.

The imaging optical system 32 adopts a single beam splitter 36 by unifying the first beam splitter 18 and the second beam splitter 20 of the first embodiment, thus completely unifying a light path for radiating light passing through the pinholes in the Nipkow-disk confocal optical system 34 onto the observation object A and a light path for causing light produced in the observation object A to enter the pinholes in the Nipkow-disk confocal optical system 34.

The operation of the thus-configured observation device 30 of this embodiment will be described below.

According to the observation device 30 of this embodiment, light entering the imaging optical system 32 from the pinholes in the Nipkow-disk confocal optical system 34 is transmitted through the beam splitter 36 and the phase modulation element (second phase modulation element) 23, is focused by the second intermediate imaging lens 21, and is reflected, so as to turn around, at the plane mirror 22a of the optical-path-length varying means 22. Then, the light passes through the second intermediate imaging lens 21, is transmitted through the phase modulation element 23 again, is deflected at the beam splitter 36 by 90 degrees, is transmitted through the first intermediate imaging-lens pair 19 and the phase modulation element (first phase modulation element) 17, and is focused by the objective lens 16 on the observation object A.

In this embodiment, the phase modulation element 23, through which laser light is first transmitted two times, functions as a wavefront disturbing element for giving a disturbance to the wavefront of the laser light, and the phase modulation element 17, through which the laser light is then transmitted once, functions as a wavefront restoring element for applying a phase modulation that cancels out the wavefront disturbance given by the phase modulation element 23.

Therefore, although an image of the light source formed into a number of point light sources by the Nipkow-disk confocal optical system 34 is formed as an intermediate image on the plane mirror 22a by the second intermediate imaging lens 21, because the intermediate image formed by the second intermediate imaging lens 21 is blurred when passing through the phase modulation element 23 once, it is possible to prevent a disadvantage that an image of a foreign object existing in the intermediate image plane is overlaid on the final image.

Furthermore, because the disturbance given to the wavefront of light when the light is transmitted through the phase modulation element 23 two times is cancelled out when transmitted through the phase modulation element 17 once, a clear image of a number of point light sources can be formed in the observation object A. Then, the disks 34a and 34b are rotated by actuating the actuator 34c of the Nipkow-disk confocal optical system 34, thereby making it possible to move the image of a number of point light sources formed in the observation object A, in XY directions intersecting the optical axis and to perform fast scanning.

On the other hand, light, for example, fluorescence, produced at the imaging position in the observation object A where the image of point light sources is formed is focused by the objective lens 16, is transmitted through the phase modulation element 17 and the first intermediate imaging-lens pair 19, is deflected at the beam splitter 36 by 90 degrees, is transmitted through the phase modulation element 23, is focused by the second intermediate imaging lens 21, and is reflected, so as to turn around, at the plane mirror 22a. Then, the light is focused by the second intermediate imaging lens 21 again, is transmitted through the phase modulation element 23 and the beam splitter 36, is focused by the imaging lens 24, and is formed into an image at positions of the pinholes in the Nipkow-disk confocal optical system 34.

The light passing through the pinholes is split off by the dichroic mirror from the light path extending from the laser light source, is focused by the focusing lens, and is formed as a final image on the imaging surface of the image acquisition device.

In this case, the phase modulation element 17, through which the fluorescence produced in the observation object in the form of a number of points is transmitted, functions as a wavefront disturbing element, as in the first embodiment, and the phase modulation element 23 functions as a wavefront restoring element.

Therefore, although a disturbance given to the wavefront of fluorescence when the fluorescence is transmitted through the phase modulation element 17 is partially cancelled out when transmitted through the phase modulation element 23 once, an intermediate image to be formed on the plane mirror 22a is blurred. Then, the fluorescence in which the wavefront disturbance is completely cancelled out when transmitted through the phase modulation element 23 again is imaged in the pinholes in the Nipkow-disk confocal optical system 34, passes through the pinholes, is split off at the dichroic mirror 34d, and is focused by the focusing lens 35, thus being formed into a clear final image on the imaging surface 33a of the image acquisition device 33.

In this embodiment, with the plurality of microlenses of the phase modulation element 17, which have different powers from each other, the second intermediate imaging lens 21 forms intermediate images for the respective microlenses, and the respective intermediate images are distributed at different positions in the optical axis direction according to the magnitudes of the powers of the microlenses; therefore, the respective intermediate images are prevented from overlapping with the same plane mirror 22a or the like, thus making it possible to avoid a situation in which a scratch or dust on the plane mirror 22a or the like is included in an acquired image.

Thus, according to the observation device of this embodiment, as an illuminating device that radiates laser light onto the observation object A and also as an observation device that images fluorescence produced in the observation object A, there is an advantage that it is possible to acquire a clear final image while blurring an intermediate image and preventing an image of a foreign object in the intermediate image plane from being overlaid on the final image. In this embodiment, in the case where the above-described scanning system is provided, even when light is moved along the Z-axis on any optical element disposed in the imaging optical system, a noise image is not formed.

Next, an observation device 40 according to a third embodiment of the present invention will be described below with reference to the drawings.

In this embodiment, identical reference signs are assigned to portions having configurations common to those of the observation device 30 of the above-described second embodiment, and a description thereof will be omitted.

Figure 20:
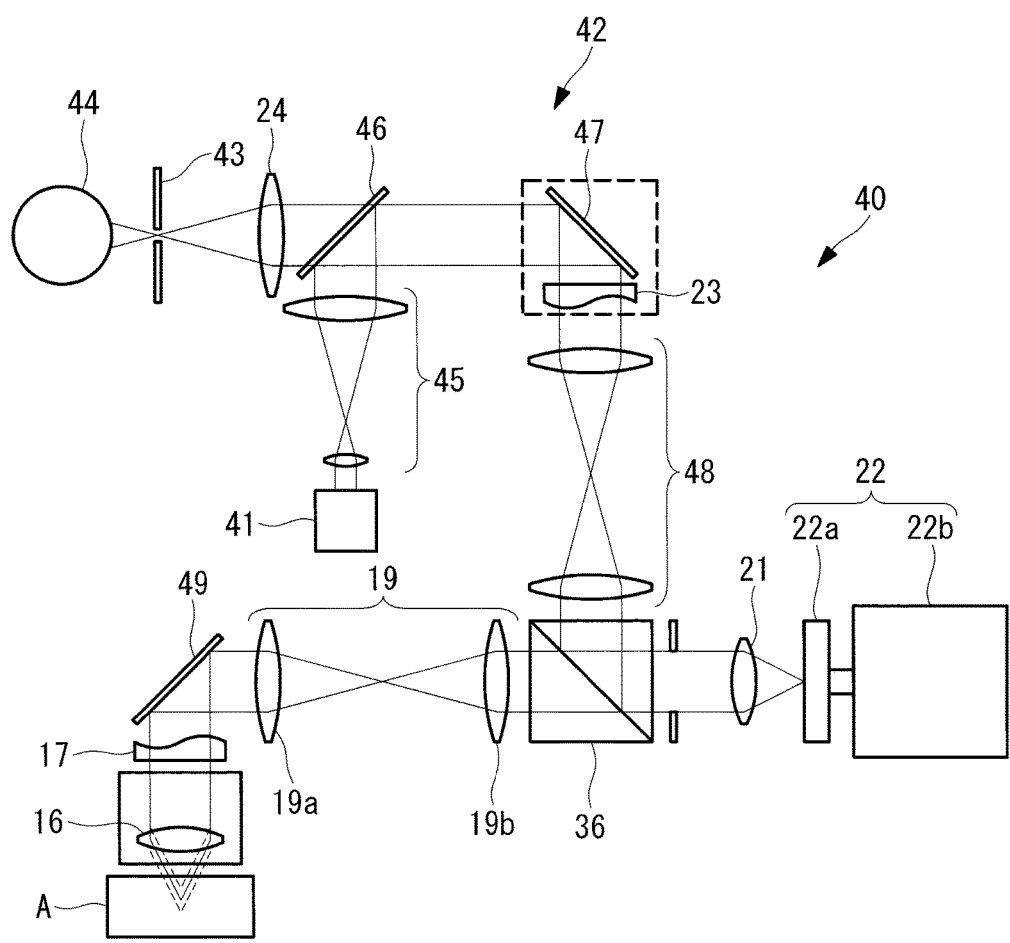
FIG. 20 is a schematic view showing an observation device according to a third embodiment of the present invention.

As shown in FIG. 20, the observation device 40 of this embodiment is a laser-scanning confocal observation device.

The observation device 40 is provided with: a laser light source 41; an imaging optical system 42 that focuses laser light from the laser light source 41 on the observation object A and that focuses light from the observation object A; a confocal pinhole 43 through which fluorescence focused by the imaging optical system 42 is made to pass; and a photodetector 44 that detects the fluorescence that has passed through the confocal pinhole 43.

The imaging optical system 42 is provided with: a beam expander 45 that expands the beam diameter of laser light; a dichroic mirror 46 that deflects the laser light and that transmits fluorescence; a galvanometer mirror 47 that is disposed in the vicinity of a position conjugate with the pupil of the objective lens 16; and a third intermediate imaging-lens pair 48, as different components from the observation device 30 of the second embodiment. Furthermore, the phase modulation element 23, which gives a disturbance to the wavefront of laser light, is disposed in the vicinity of the galvanometer mirror 47. In the figure, reference sign 49 denotes a mirror. In the example shown in FIG. 20, the wavefront disturbing element 17 and the wavefront restoring element 23 are both configured such that microlenses having positive power and microlenses having negative power are mixed.

The operation of the thus-configured observation device 40 of this embodiment will be described below.

According to the observation device 40 of this embodiment, the beam diameter of laser light produced in the laser light source 41 is expanded by the beam expander 45, and the laser light is deflected by the dichroic mirror 46, is two-dimensionally scanned by the galvanometer mirror 47, passes through the phase modulation element 23 and the third intermediate imaging-lens pair 48, and enters the beam splitter 36.

Although the laser light that has entered the beam splitter 36 enters the plane mirror 22a of the optical-path-length varying means 22 and is formed into an intermediate image, prior to this image formation, a disturbance is given to the wavefront of the laser light by the phase modulation element 23, thus blurring the intermediate image; therefore, it is possible to prevent overlaying of an image of a foreign object existing in the intermediate image plane. Furthermore, the wavefront disturbance is cancelled out by the phase modulation element 17, which is disposed at the pupil position of the objective lens 16, thus making it possible to form a clear final image on the observation object A. Furthermore, the imaging depth of the final image can be desirably adjusted by the optical-path-length varying means 22.

On the other hand, fluorescence produced at the imaging position, in the observation object A, where the final image of the laser light is formed is focused by the objective lens 16, is transmitted through the phase modulation element 17, travels in the light path in the opposite direction from the laser light, is deflected by the beam splitter 36, passes through the third intermediate imaging-lens pair 48, the phase modulation element 23, the galvanometer mirror 47, and the dichroic mirror 46, and is focused by the imaging lens 24 on the confocal pinhole 43, and only fluorescence that has passed through the confocal pinhole 43 is detected by the photodetector 44.

In this case, because the fluorescence focused by the objective lens 16 is subjected to a disturbance given to the wavefront thereof by the phase modulation element 17 and is then formed into an intermediate image, the intermediate image is blurred, thus making it possible to prevent overlaying of an image of a foreign object existing in the intermediate image plane. Then, the wavefront disturbance is cancelled out when the fluorescence is transmitted through the phase modulation element 23, thus making it possible to form a clear image in the confocal pinhole 43 and to efficiently detect the fluorescence produced at the imaging position, in the observation object A, where the final image of the laser light is formed.

In this embodiment, with the plurality of microlenses of the phase modulation element 17, which have different powers from each other, the second intermediate imaging lens 21 forms intermediate images for the respective microlenses, and the respective intermediate images are distributed at different positions in the optical axis direction according to the magnitudes of the powers of the microlenses; therefore, the respective intermediate images are prevented from overlapping with the same lens or the like, thus making it possible to avoid a situation in which a scratch or dust on the lens is included in an acquired image.

As a result, there is an advantage that a high-resolution bright confocal image can be acquired. In this embodiment, in the case where the above-described scanning system is provided, even when light is moved along the Z-axis on any optical element disposed in the imaging optical system, a noise image is not formed.

Figure 21:
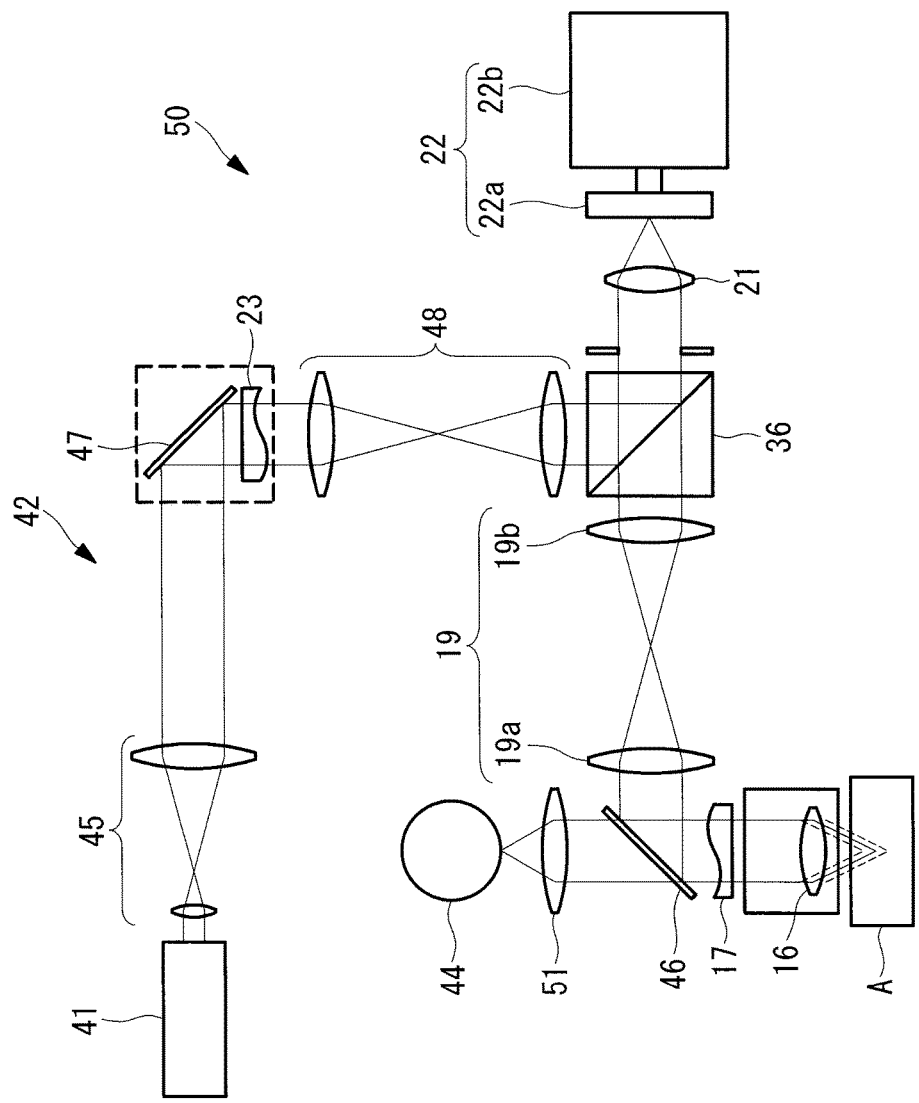
FIG. 21 is a schematic view showing a modification of the observation device shown in FIG. 20.

Note that, in this embodiment, the laser-scanning confocal observation device has been described as an example; however, instead of this, as shown in FIG. 21, the present invention can be applied to a laser-scanning multiphoton excitation observation device.

In this case, it is necessary to adopt an extremely-short pulse laser light source as the laser light source 41, to eliminate the dichroic mirror 46, and to adopt the dichroic mirror 46 instead of the mirror 49.

In an observation device 50 shown in FIG. 21, in the function of an illuminating device that radiates extremely-short pulse laser light onto the observation object A, it is possible to blur an intermediate image and to make a final image clear. Fluorescence produced in the observation object A is focused by the objective lens 16, is transmitted through the phase modulation element 17 and the dichroic mirror 46, is focused by a focusing lens 51, and is detected by the photodetector 44 as is, without being formed into an intermediate image.

Figure 22:
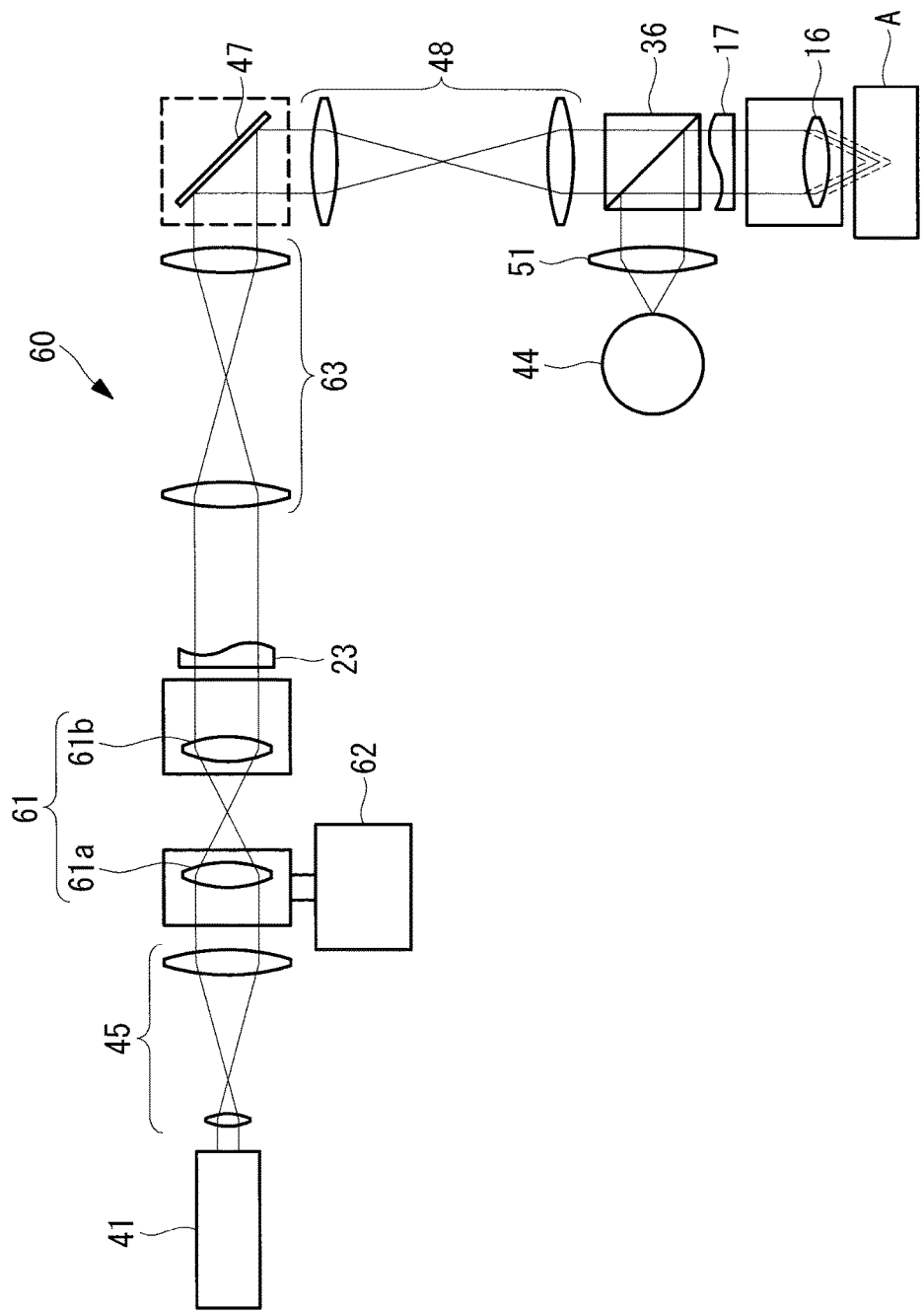
FIG. 22 is a schematic view showing a first modification of the observation device shown in FIG. 21.

Furthermore, in the above-described embodiments, the focal position in front of the objective lens is changed in the optical axis direction by the optical-path-length varying means 22, which changes the optical-path length by moving the plane mirror, at which the light path turns around. Instead of this, as shown in FIG. 22, it is also possible to configure an observation device 60 that adopts a configuration in which a lens 61a that is one of lenses 61a and 61b constituting an intermediate imaging optical system 61 is moved in the optical axis direction by an actuator (scanning unit) 62, thus changing the optical-path length. In the figure, reference sign 63 denotes another intermediate imaging optical system.

In this modification, even when the actuator 62 performs scanning (Z-scanning) of the focal position of laser light in the optical axis direction, the respective intermediate images formed for the plurality of microlenses of the phase modulation element 23, which have different powers from each other, are distributed at different positions in the optical axis direction according to the magnitudes of the powers of the respective microlenses; therefore, the respective intermediate images are prevented from overlapping with the lens 63a or the like of the other intermediate imaging optical system 63, thus making it possible to avoid a situation in which a scratch or dust on the lens is included in an acquired image.

Accordingly, although there was a risk that a scratch or dust on an optical element is included in a particular region in the Z-scanning range, the risk is averaged in a certain range determined by the difference in power of the respective microlenses of the phase modulation element 23, thus making it possible to reduce the possibility of failure in an experiment or observation due to the inclusion of a scratch or dust.

Figure 23:
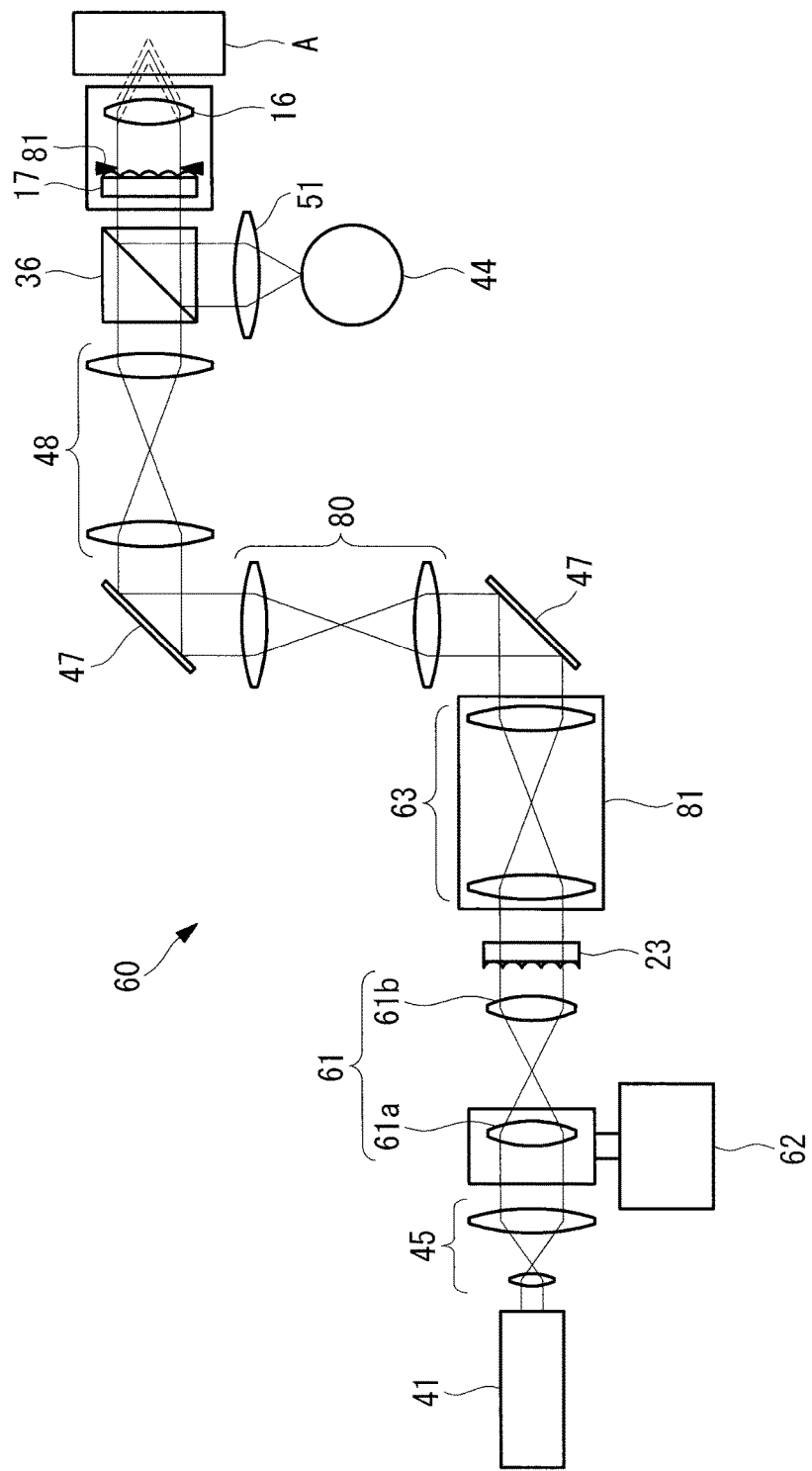
FIG. 23 is a schematic view showing another modification of the observation device shown in FIG. 22.

Furthermore, as shown in FIG. 23, it is also possible to dispose another intermediate imaging optical system 80 between two galvanometer mirrors 47 that constitute a two-dimensional optical scanner and to accurately dispose the two galvanometer mirrors 47 so as to have optically conjugate positional relations with the phase modulation elements 17 and 23 and an aperture stop 81 that is disposed at the pupil of the objective lens 16.

Figure 24:
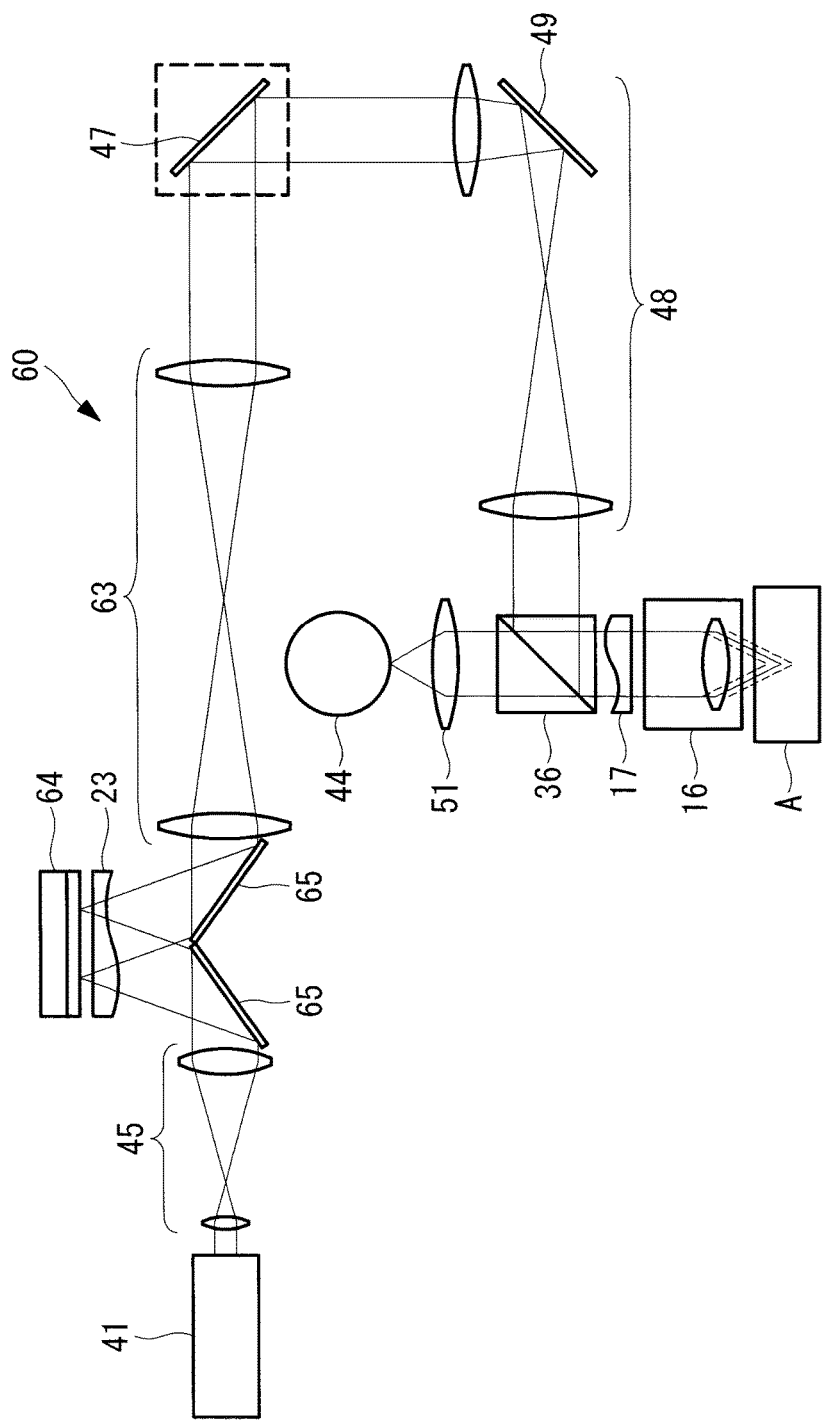
FIG. 24 is a schematic view showing a second modification of the observation device shown in FIG. 21.

Furthermore, as the optical-path-length varying means, as shown in FIG. 24, it is also possible to adopt a spatial light modulating element (SLM) 64, such as a reflective LCOS. By doing so, it is possible to rapidly change the phase modulation to be applied to the wavefront through control of the liquid crystal of the LCOS and to rapidly change the focal position in front of the objective lens 16 in the optical axis direction. In the figure, reference sign 65 denotes mirrors.

Figure 25:
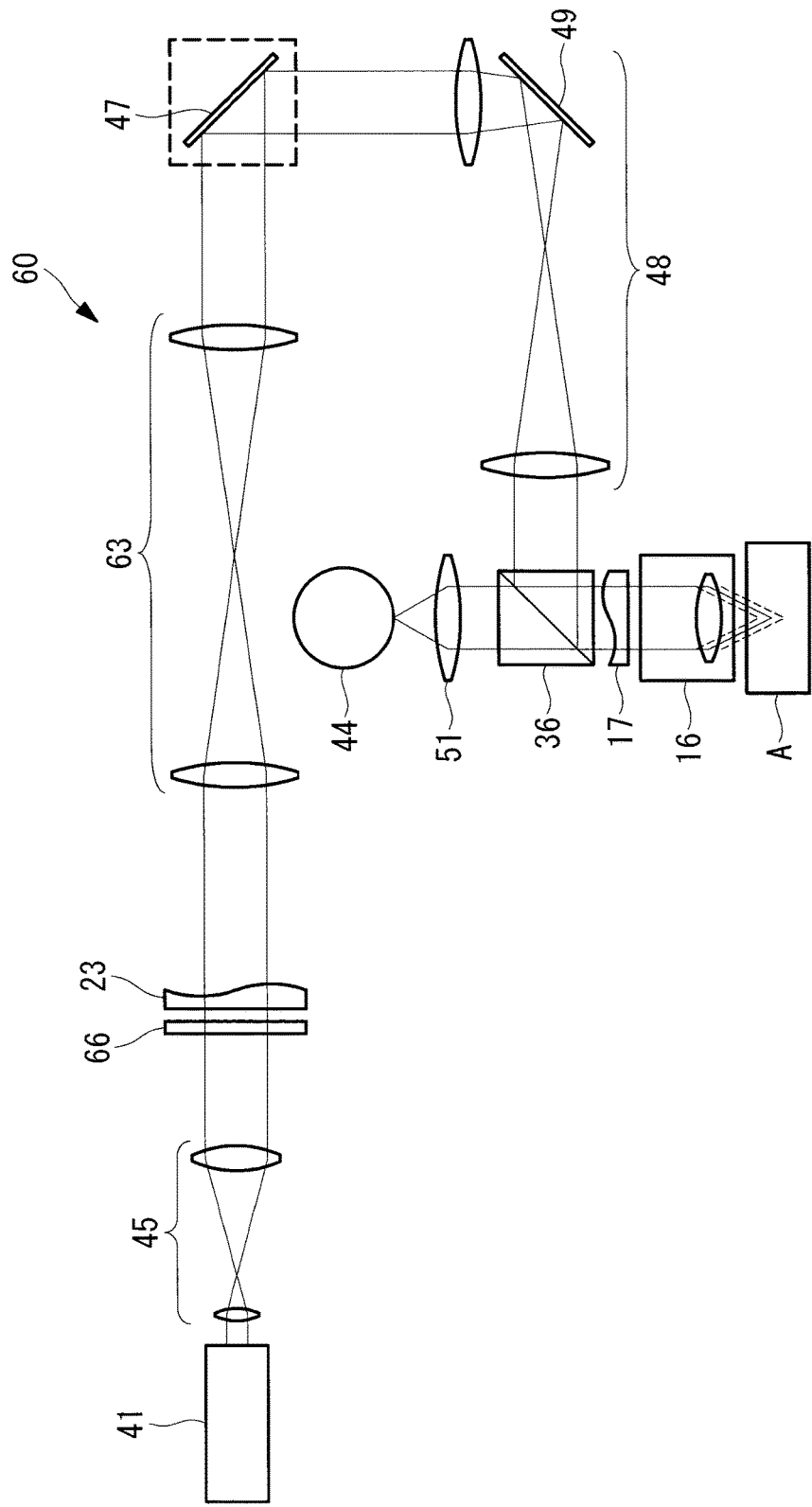
FIG. 25 is a schematic view showing a third modification of the observation device shown in FIG. 21.

Furthermore, instead of the spatial light modulating element 64, such as a reflective LCOS, as shown in FIG. 25, it is also possible to adopt a spatial light modulating element 66, such as a transmissive LCOS. Compared with the reflective LCOS, the mirrors 65 are eliminated, thus making it possible to simplify the configuration.

As the means for moving the focal position in the observation object A in the optical axis direction, other than the means (the optical-path-length varying means 22, the intermediate imaging optical system 61 and the actuator 62, the reflective spatial light modulating element 64, and the transmissive spatial light modulating element 66) described in the above-described embodiments, various types of variable-power optical elements known as active optical elements can be used, and examples of elements having a mechanically movable part include a deformable mirror (DFM) and a deformable lens using a liquid or gel. Examples of similar elements having no mechanically movable part include a liquid crystal lens and a potassium tantalum niobate (KTN: $KTa_{1-x}Nb_xO_3$) crystal lens that control the refractive index of a medium by using the electric field and a lens to which a cylindrical lens effect in an acousto-optical deflector (AOD) is applied.

As described above, the microscopes of the embodiments of the present invention each have any means for moving the focal position in the observation object A in the optical axis direction. Furthermore, compared with a means (that moves one of an objective lens and an observation object in the optical axis direction) used in a conventional microscope for the same purpose, these focal-position optical-axis-wise moving means are capable of significantly increasing the movement speed for the reason that the object to be driven has a small mass or that a physical phenomenon having a fast response speed is used.

This leads to an advantage that it is possible to detect a higher-speed phenomenon in an observation object (for example, living tissue specimen).

Furthermore, when the spatial light modulating element 64 or 66, such as a transmissive or reflective LCOS, is adopted, the function of the phase modulation element 23 can be performed by the spatial light modulating element 64 or 66. By doing so, there is an advantage that it is possible to omit the phase modulation element 23 serving as a wavefront disturbing element, thus further simplifying the configuration.

Furthermore, in the above-described example, the phase modulation element 23 can be omitted in the combination of the spatial light modulating element and the laser-scanning multiphoton excitation observation device; however, similarly to this, the phase modulation element 23 can also be omitted in the combination of the spatial light modulating element and the laser-scanning confocal observation device. Specifically, in FIGS. 24 and 25, the mirror 49 is adopted instead of the dichroic prism 36, the dichroic mirror 46 is adopted between the beam expander 45 and the spatial light modulating element 64 or 66, thus forming a split light path, and the imaging lens 24, the confocal pinhole 43, and the photodetector 44 are adopted, thereby making it possible to make the spatial light modulating element 64 or 66 perform the function of the phase modulation element 23. The spatial light modulating element 64 or 66 of this case acts as a wavefront disturbing element, with respect to laser light from the laser light source 41, to give a disturbance to the wavefront thereof and, meanwhile, acts as a wavefront restoring element, with respect to fluorescence from the observation object A, to cancel out a wavefront disturbance given by the phase modulation element 17.

Figure 26:
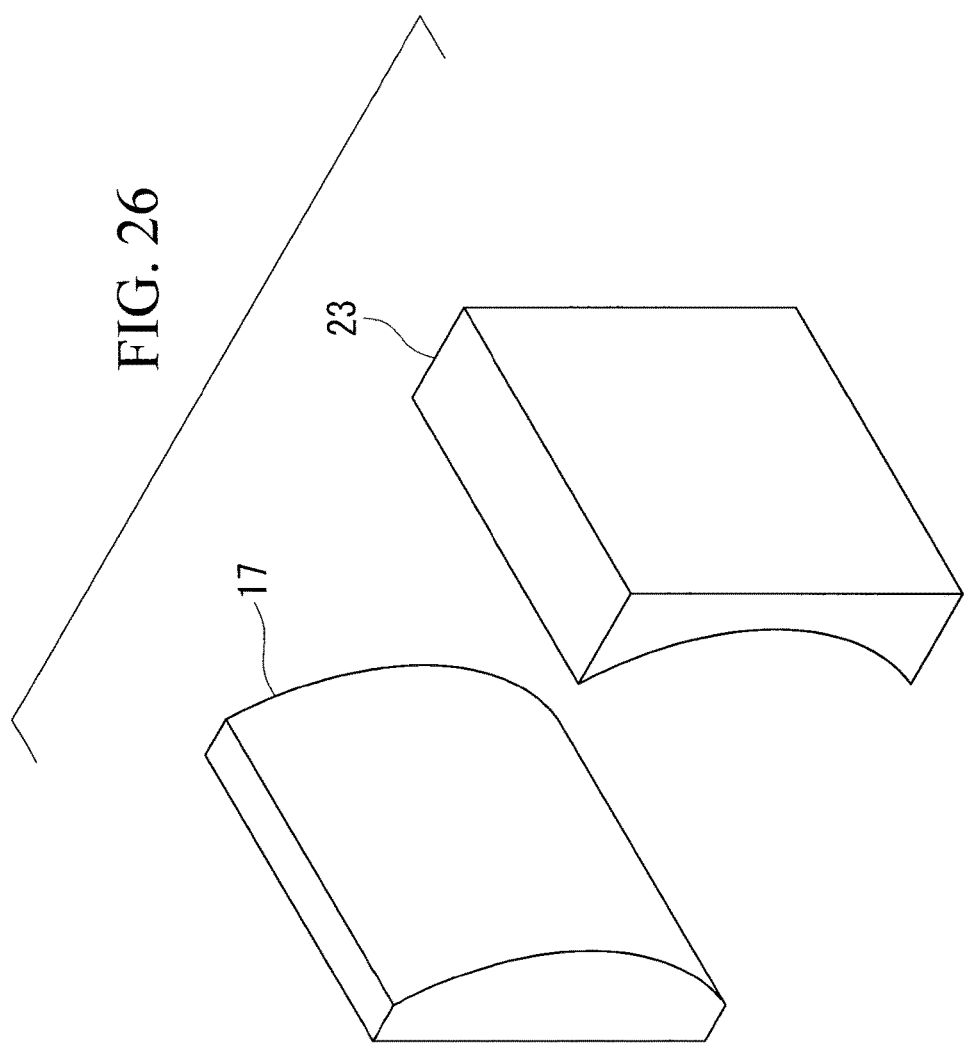
FIG. 26 is a perspective view showing cylindrical lenses serving as example phase modulation elements used in the imaging optical systems and the observation devices according to the present invention.

As the phase modulation element, for example, as shown in FIG. 26, it is also possible to adopt a single progressive-power cylindrical lens 17, 23 in which an infinite number of powers are arrayed in a direction intersecting the optical axis.

In this case, the cylindrical lens 17 linearly extends a point image in an intermediate image due to astigmatism, thus making it possible to blur the intermediate image through this action, and the cylindrical lens 23, which has a shape complementary thereto, can make a final image clear.

In the example of FIG. 26, any of the convex lens and the concave lens can be used as a wavefront disturbing element or can be used as a wavefront restoring element.

Figure 27:
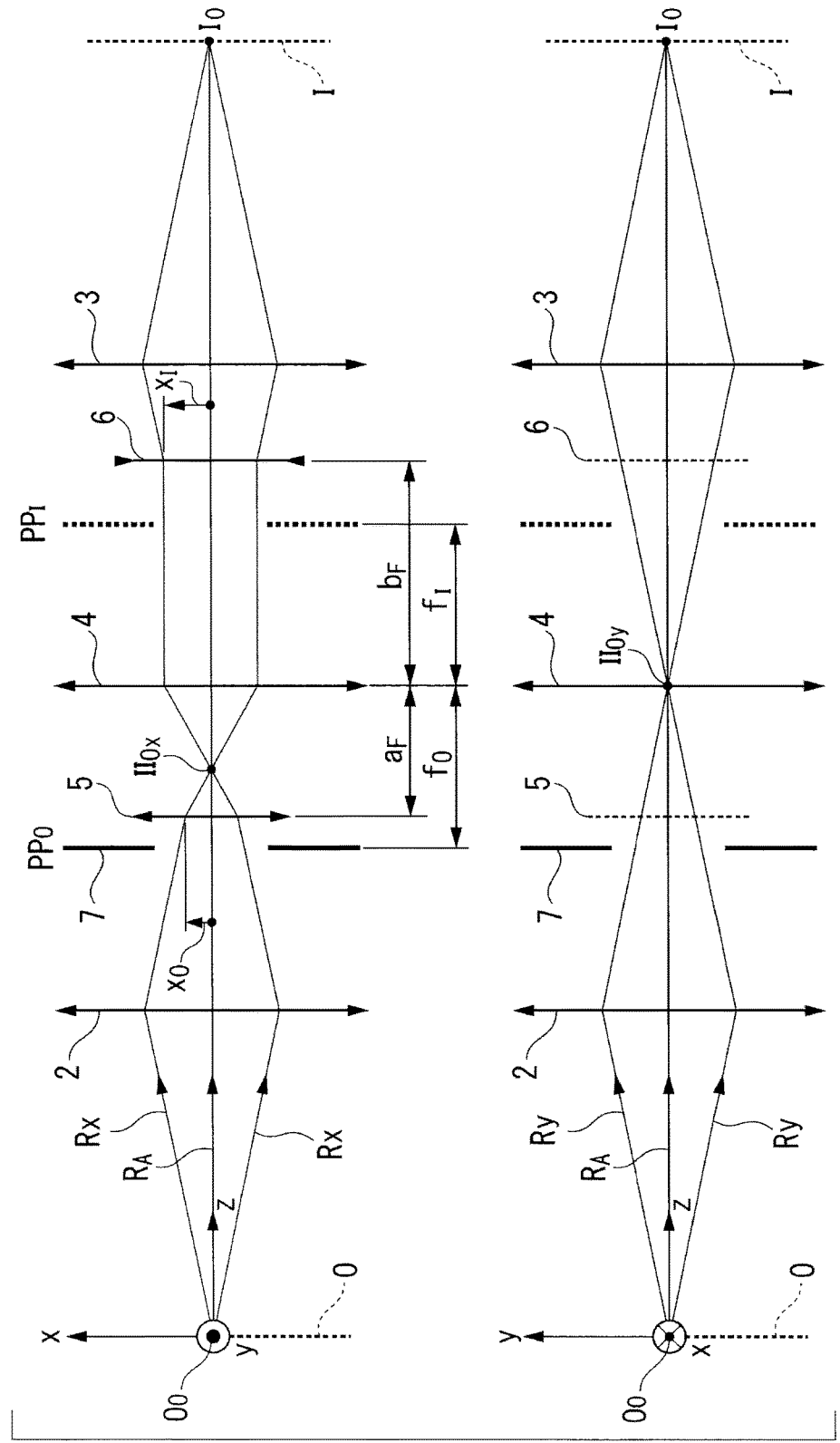
FIG. 27 is a schematic view for explaining the operation when the cylindrical lenses shown in FIG. 26 are used.

The operation of a case in which cylindrical lenses 5 and 6 are used as phase modulation elements will be described below in detail. FIG. 27 shows an example case in which the cylindrical lenses 5 and 6 are used as the phase modulation elements shown in FIGS. 3 and 4.

Here, in particular, the following conditions are set.

(a) A cylindrical lens that has power $\psi O_x$ in the x-direction is used as the phase modulation element (wavefront disturbing element) 5, which is close to the object O.

(b) A cylindrical lens that has power $\psi I_x$ in the x-direction is used as the phase modulation element (wavefront restoring element) 6, which is close to the image I.

(c) The position (ray height) of an on-axis light ray $R_X$ at the cylindrical lens 5 in an xz plane is $x_O$.

(d) The position (ray height) of an on-axis light ray $R_X$ at the cylindrical lens 6 in the xz plane is $x_I$.

In FIG. 27, reference signs $II_O{}^x$ and $II_O{}^y$ denote intermediate images.

Before describing the operation of this example case, the relationship between the phase modulation amount and the optical power, based on Gaussian optics, will be described with reference to FIG. 28.

Figure 28:
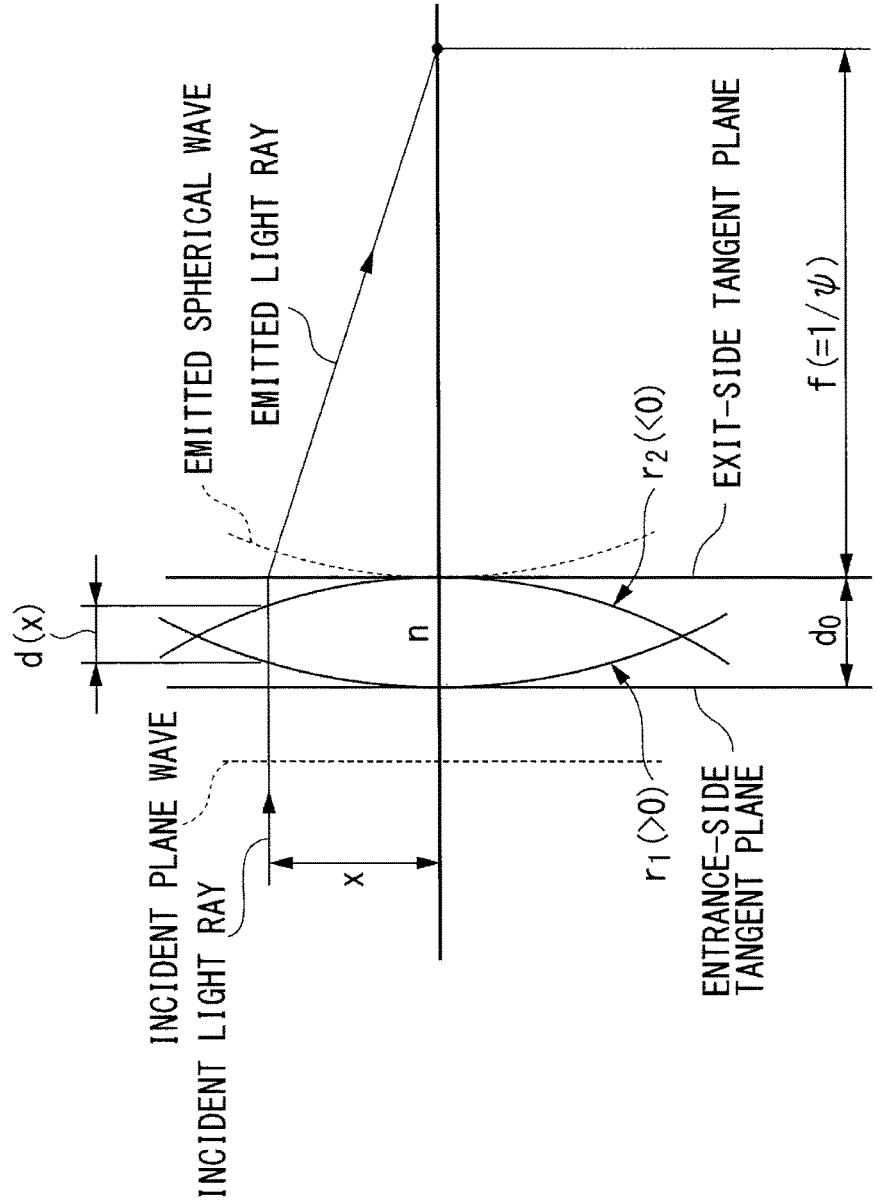
FIG. 28 is a view for explaining the relationship between the phase modulation amount and the optical power based on Gaussian optics, used to explain FIG. 27.

In FIG. 28, when the thickness of the lens at a height (the distance from the optical axis) x is d(x), and the thickness of the lens at a height 0 (on the optical axis) is $d_0$, the optical-path length L(x) from an entrance-side tangent plane to an exit-side tangent plane along a light ray at the height x is expressed by Expression (4).

$$L(x)=(d_0-d(x))+n\cdot d(x) \qquad (4)$$

When the thin lens approximation is used, the difference between the optical-path length L(x) at the height x and the optical-path length L(0) at the height 0 (on the optical axis) is expressed by Expression (5).

$$L(x)-L(0)=(-x^2/2)(n-1)(1/r_1-1/r_2) \qquad (5)$$

The above-described optical-path-length difference L(x)–L(0) is equal in absolute value to the phase lead of emitted light at the height x with respect to emitted light at the height 0, and they have opposite signs. Therefore, the above-described phase lead is expressed by Expression (6), in which the sign in Expression (5) is reversed.

$$L(0)-L(x)=(x^2/2)(n-1)(1/r_1-1/r_2) \qquad (6)$$

On the other hand, the optical power $\psi$ of this thin lens is expressed by Expression (7).

$$\psi=1/f=(n-1)(1/r_1-1/r_2) \qquad (7)$$

Therefore, from Expressions (6) and (7), the relationship between the phase lead L(0)–L(x) and the optical power $\psi$ is obtained by Expression (8).

$$L(0)-L(x)=\psi\cdot x^2/2 \qquad (8)$$

Here, FIG. 27 will be described again.

The phase lead $\Delta L_{Oc}$ given to the on-axis light ray $R_X$ in the xz plane at the cylindrical lens 5 with respect to an on-axis chief ray, i.e., a light ray $R_A$ along the optical axis, is expressed by Expression (9) on the basis of Expression (8).

$$\Delta L_{Oc}(x_O)=L_{Oc}(0)-L_{Oc}(x_O)=\psi_{Ox}\cdot x_O{}^2/2 \qquad (9)$$

Here, $L_{Oc}(x_O)$ is a function of the optical-path length from the entrance-side tangent plane to the exit-side tangent plane along the light ray at the height $x_O$ in the cylindrical lens 5.

In the same way, the phase lead $\Delta L_{Ic}$ given to the on-axis light ray $R_X$ in the xz plane at the cylindrical lens 6 with respect to the on-axis chief ray, i.e., the light ray $R_A$ along the optical axis, is expressed by Expression (10).

$$\Delta L_{Ic}(x_I)=L_{Ic}(0)-L_{Ic}(x_I)=\psi_{Ix}\cdot x_I{}^2/2 \qquad (10)$$

Here, $L_{Ic}(x_I)$ is a function of the optical-path length from the entrance-side tangent plane to the exit-side tangent plane along the light ray at the height $x_1$ in the cylindrical lens 6.

When Expressions (9) and (10) and the relationship $(x_I/x_O)2=\beta_F{}^2$ are applied to Expression (2), in this example, a condition for allowing the cylindrical lens 5 to perform the function of wavefront disturbing and the cylindrical lens 6 to perform the function of wavefront restoration is obtained as shown in Expression (11).

$$\psi_{Ox}/\psi_{Ix} = -\beta_F^2 \quad (11)$$

Specifically, the values $\psi_{Ox}$ and $\psi_{Ix}$ have opposite signs, and the ratio of the absolute values thereof needs to be proportional to the square of the lateral magnification of the field lens 4.

Note that although a description has been given here on the basis of the on-axis light ray, so long as the above-described condition is satisfied, the cylindrical lenses 5 and 6 perform the function of wavefront disturbing and the function of wavefront restoration with respect to an off-axis light ray, as well.

Figure 29:
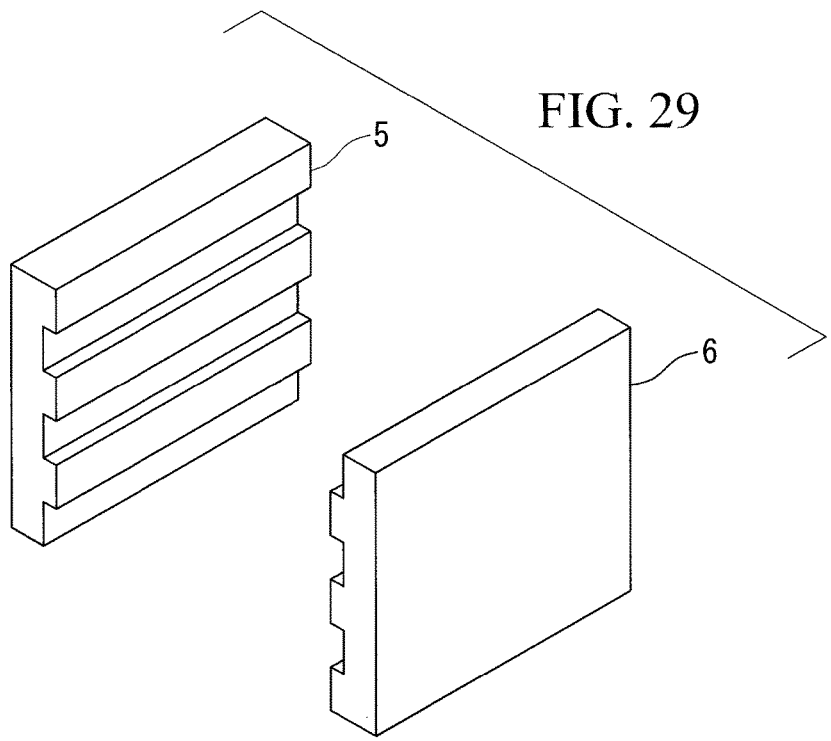
FIG. 29 is a perspective view showing binary diffraction gratings as other examples of the phase modulation elements used in the imaging optical systems and the observation devices according to the present invention.
Figure 30:
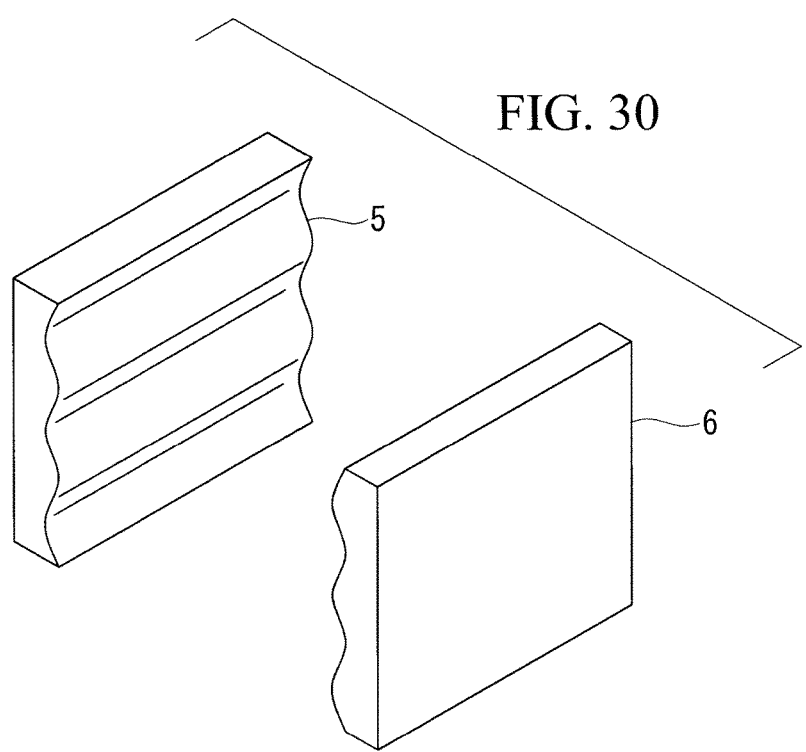
FIG. 30 is a perspective view showing one-dimensional sinusoidal diffraction gratings as other examples of the phase modulation elements used in the imaging optical systems and the observation devices according to the present invention.
Figure 31:
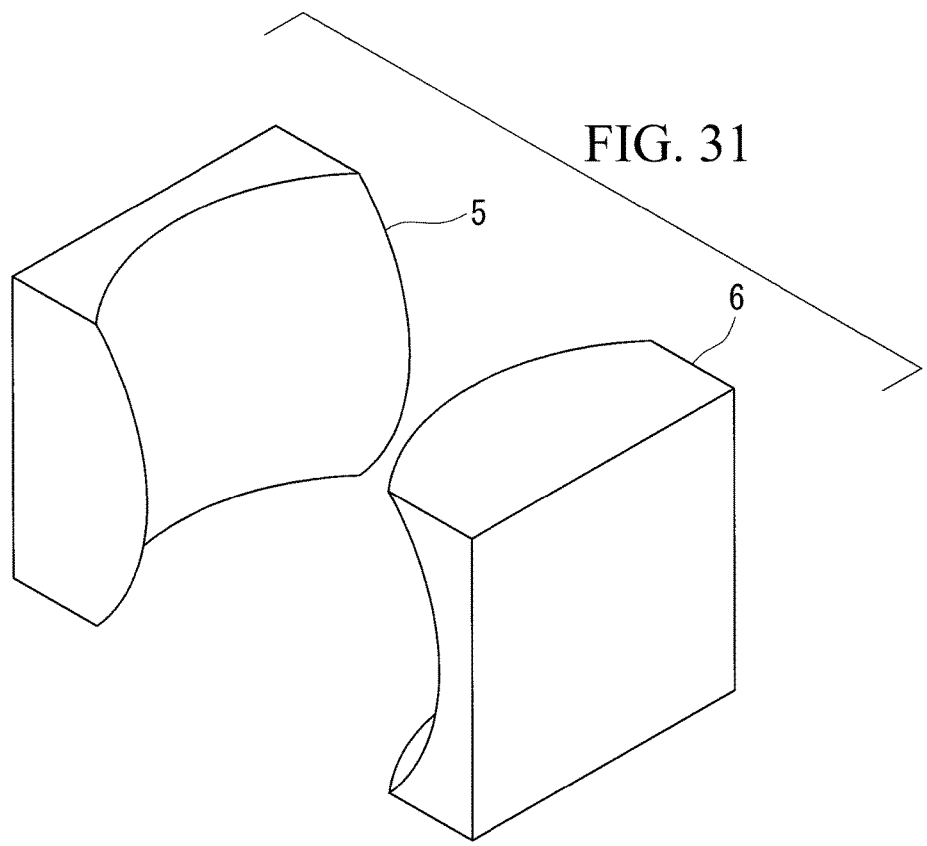
FIG. 31 is a perspective view showing free-form surface lenses as other examples of the phase modulation elements used in the imaging optical systems and the observation devices according to the present invention.
Figure 32:
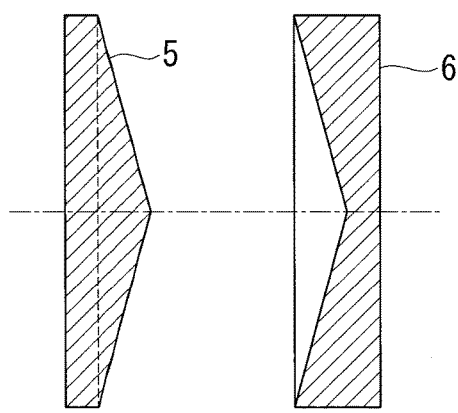
FIG. 32 is a longitudinal sectional view showing cone lenses as other examples of the phase modulation elements used in the imaging optical systems and the observation devices according to the present invention.
Figure 33:
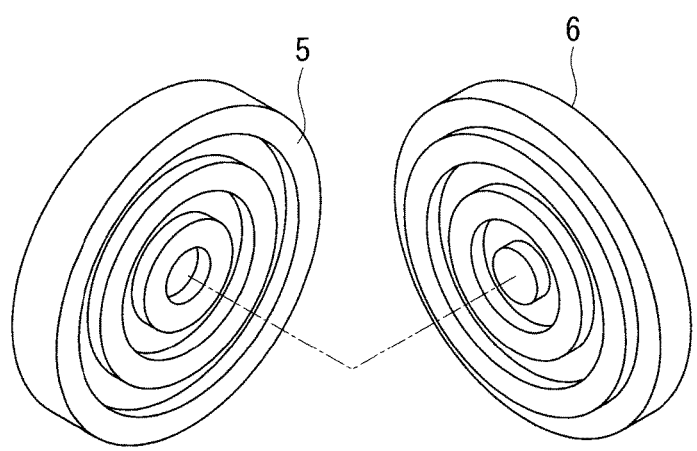
FIG. 33 is a perspective view showing concentric binary diffraction gratings as other examples of the phase modulation elements used in the imaging optical systems and the observation devices according to the present invention.

Furthermore, as the phase modulation elements 5, 6, 17, and 23 (shown as the phase modulation elements 5 and 6 in the figure), instead of the cylindrical lenses, it is also possible to adopt one-dimensional binary diffraction gratings as shown in FIG. 29, one-dimensional sinusoidal diffraction gratings as shown in FIG. 30, free-form surface lenses as shown in FIG. 31, cone lenses as shown in FIG. 32, or concentric binary diffraction gratings as shown in FIG. 33. The concentric diffraction gratings are not limited to those of a binary type, and any types of gratings, such as a blazed type and a sinusoidal type, can be adopted. Any type of the phase modulation elements 5 and 6 shown in FIGS. 29 to 33 needs to have a plurality of small lens units with different powers that are arranged in a direction intersecting the optical axis.

For example, in the case of the one-dimensional binary diffraction gratings shown in FIG. 29, it is possible to mix a plurality of grating pitches in one phase modulation element by making a portion of the grating formed of one grating pitch serve as one small lens. Furthermore, in the case of the one-dimensional sinusoidal diffraction gratings shown in FIG. 30, it is possible to mix cylindrical lenses having a plurality of powers in one phase modulation element by making one convex portion or one concave portion serve as one small lens. Furthermore, in the case of the free-form surface lenses shown in FIG. 31, it is possible to mix small lenses having a plurality of powers in one phase modulation element by making one region having a substantially constant curvature serve as one small lens.

Here, a case in which diffraction gratings 5 and 6 are used as the wavefront modulation elements will be described below in detail.

In an intermediate image II in this case, a single point image is separated into a plurality of point images due to diffraction.

Through this action, the intermediate image II is blurred, thus making it possible to prevent an image of a foreign object in the intermediate image plane from being overlaid on and included in the final image.

Figure 34:
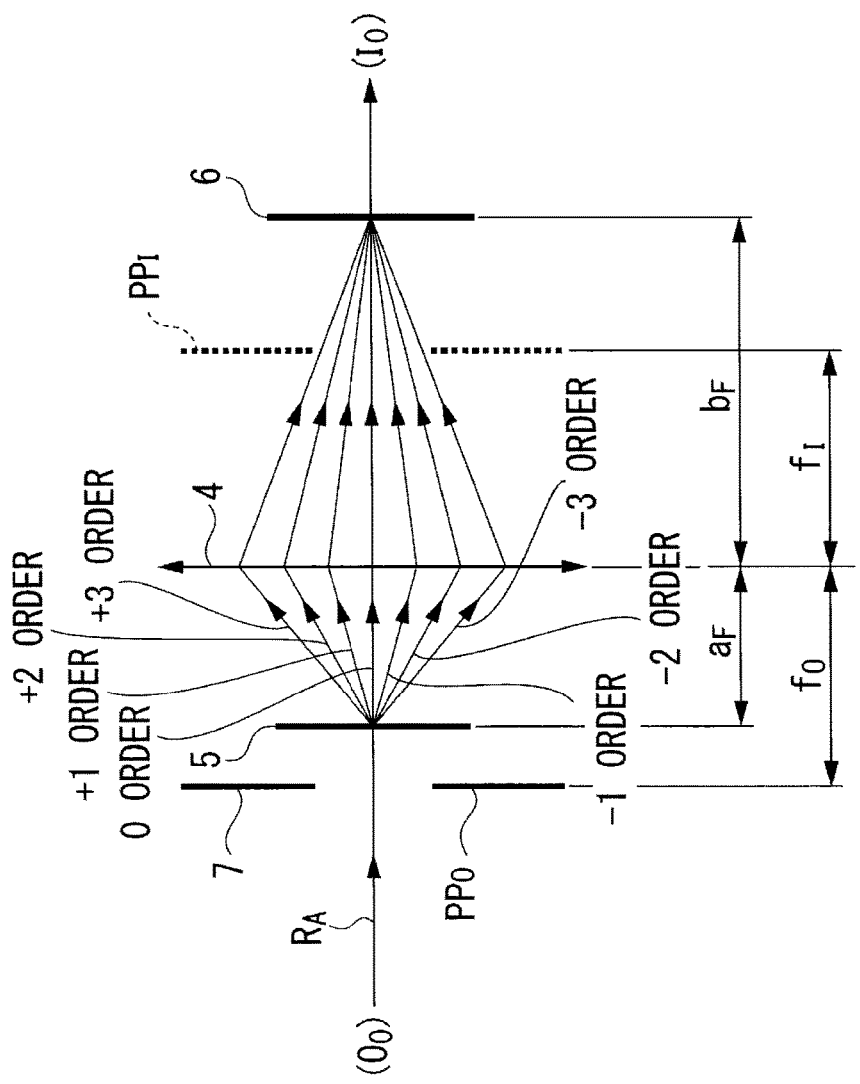
FIG. 34 is a schematic view for explaining the operation of a light ray along the optical axis when diffraction gratings are used as the phase modulation elements.
Figure 35:
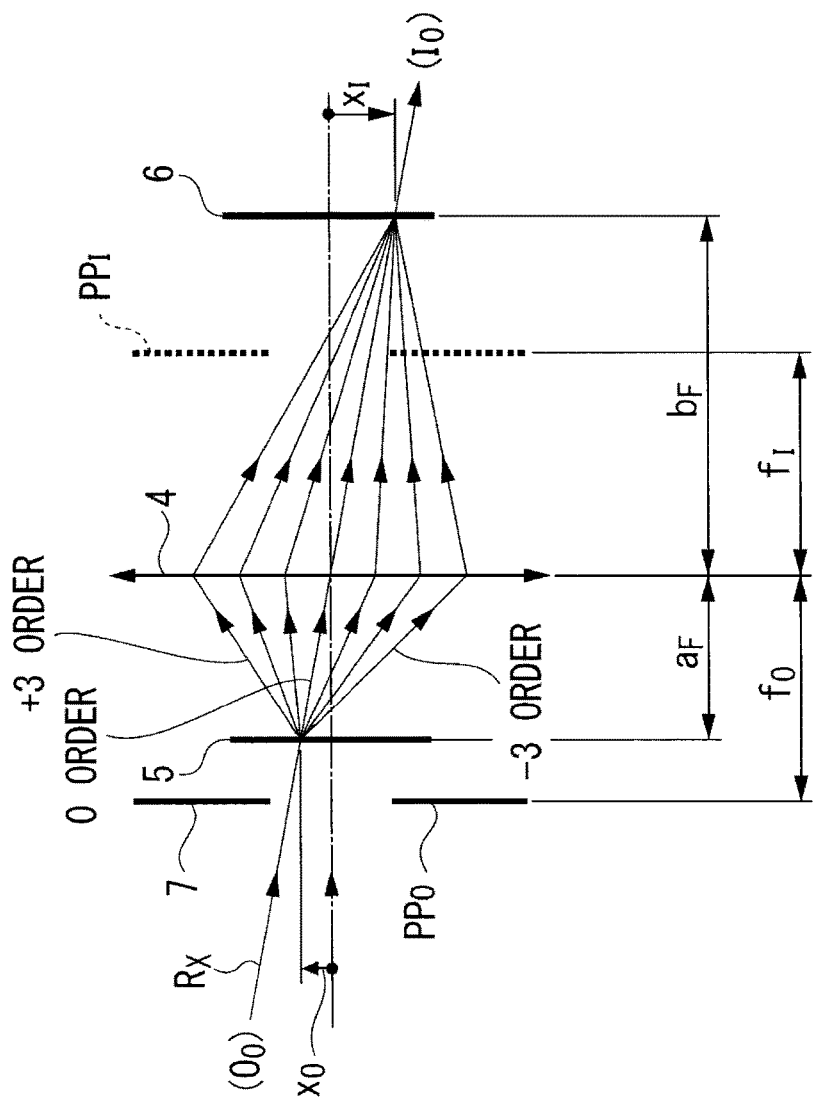
FIG. 35 is a schematic view for explaining the operation of an on-axis light ray when the diffraction gratings are used as the phase modulation elements.

When the diffraction gratings 5 and 6 are used as the phase modulation elements, example preferable paths of an on-axis chief ray, i.e., the light ray $R_A$ along the optical axis, are shown in FIG. 34, and example preferable paths of the on-axis light ray $R_X$ are shown in FIG. 35. In the figures, each of the light rays $R_A$ and $R_X$ is separated into a plurality of diffracted light rays when passing through the diffraction grating 5, but the diffracted light rays converge into a single light ray when passing through the diffraction grating 6.

In this case, the above-described effect can be achieved by satisfying Expressions (1) to (3).

Here, according to FIGS. 34 and 35, Expression (2) can be expressed in another way as "the sum of phase modulations to which a single on-axis light ray $R_X$ is subjected at the diffraction gratings 5 and 6 is always equal to the sum of phase modulations to which the on-axis chief ray $R_A$ is subjected at the diffraction gratings 5 and 6".

Furthermore, when the diffraction gratings 5 and 6 have periodic structures, if the shapes thereof (i.e., phase modulation characteristics) satisfy Expression (2) in a one-period region, it is possible to consider that they satisfy Expression (2) in the other regions.

Figure 36:
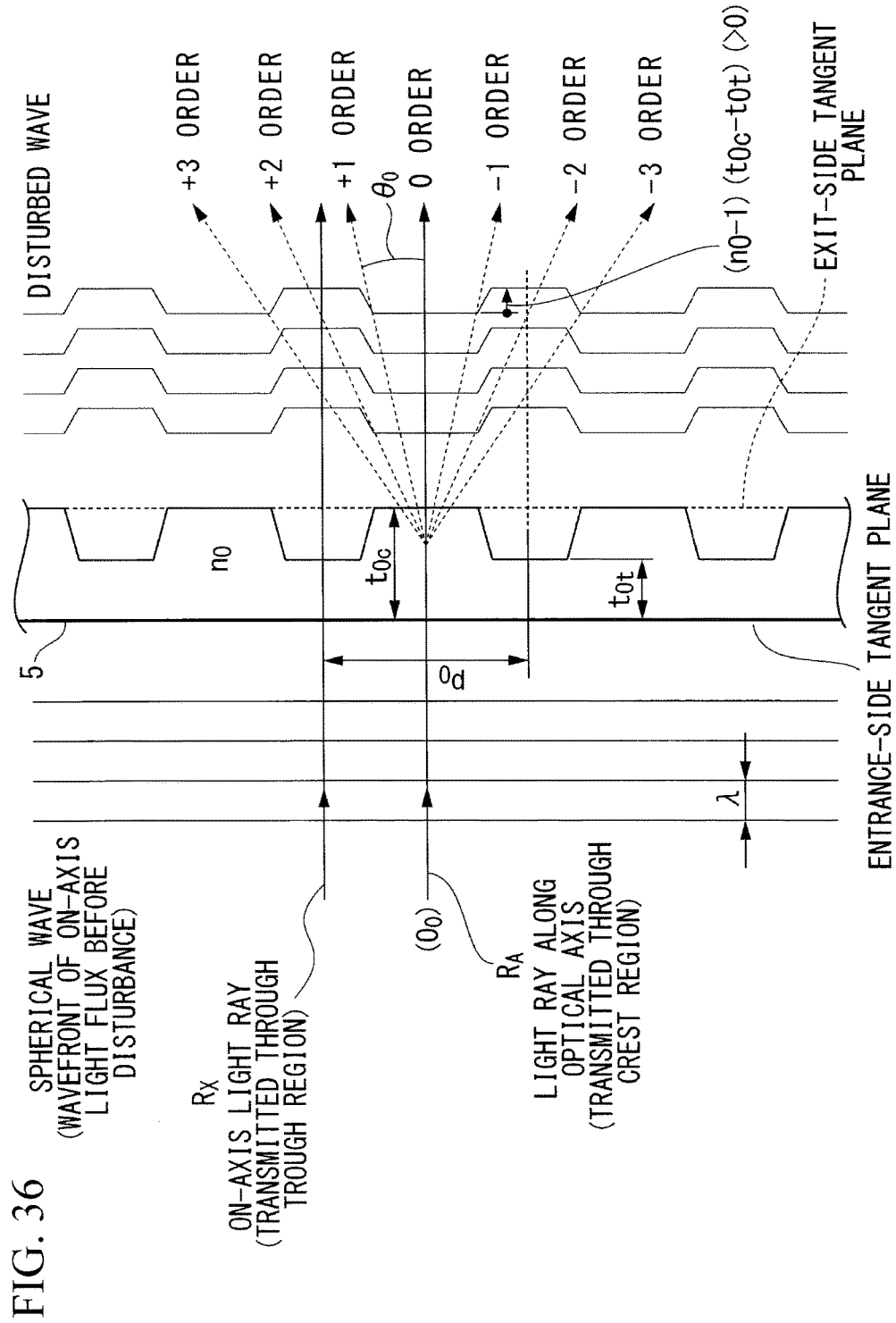
FIG. 36 is a central-area detailed view for explaining the operation of the diffraction grating that functions as a wavefront disturbing element.
Figure 37:
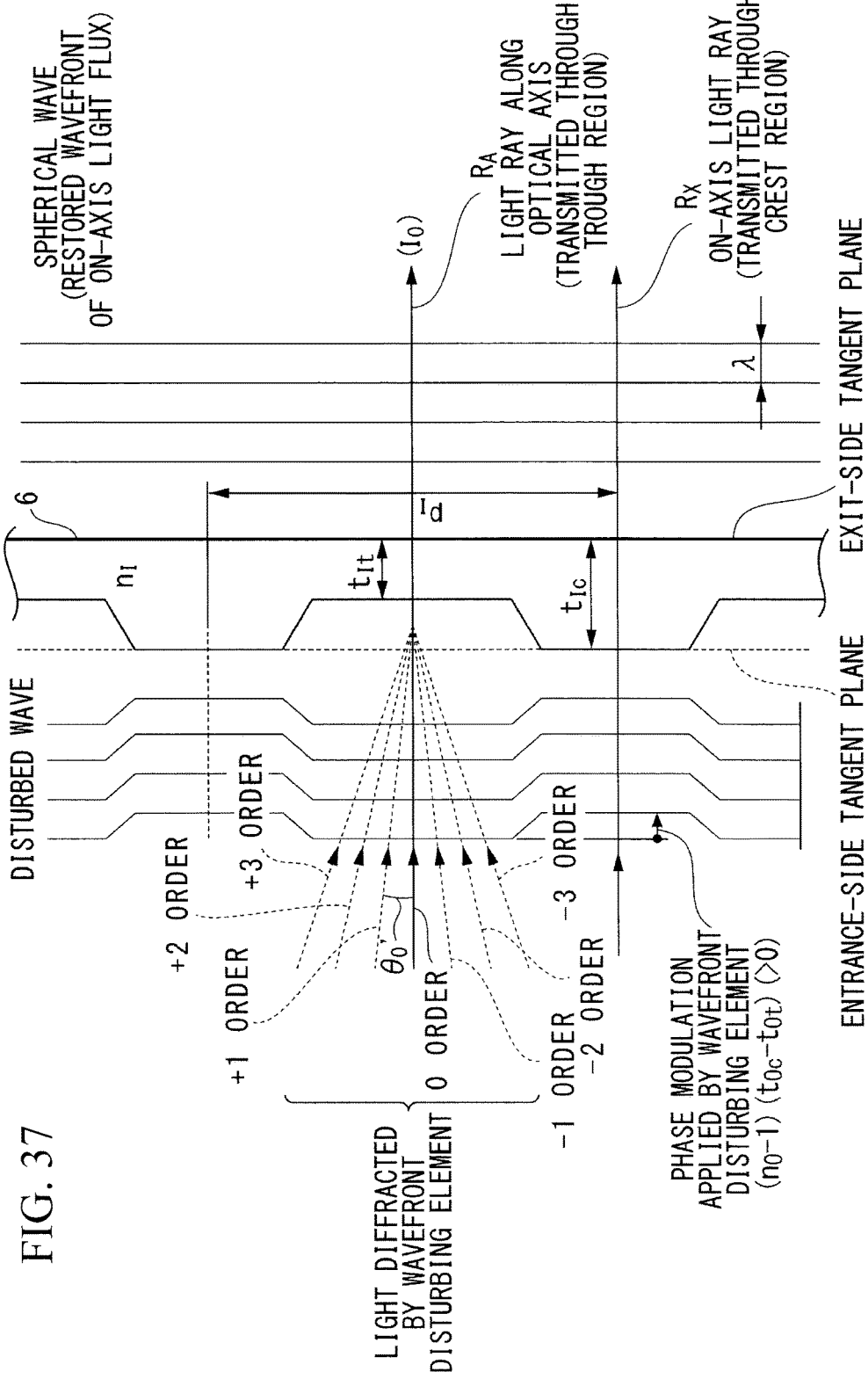
FIG. 37 is a central-area detailed view for explaining the operation of the diffraction grating that functions as a wavefront restoring element.

Then, a description will be given of central regions of the diffraction gratings 5 and 6, i.e., regions in the vicinity of the optical axis. FIG. 36 is a view showing details of the central region of the diffraction grating 5, and FIG. 37 is a view showing details of the central region of the diffraction grating 6.

Here, conditions under which the diffraction gratings 5 and 6 satisfy Expression (2) are as follows.

Specifically, a modulation period $p_I$ in the diffraction grating 6 needs to be equal to a modulation period $p_O$ of the diffraction grating 5 projected by the field lens 4, the phase of modulation of the diffraction grating 6 needs to be inverted with respect to the phase of modulation of the diffraction grating 5 projected by the field lens 4, and the magnitude of phase modulation of the diffraction grating 6 needs to be equal in absolute value to the magnitude of phase modulation of the diffraction grating 5.

First, the condition for making the period $p_I$ equal to the projected period $p_O$ is expressed by Expression (12).

$$p_I = |\beta_F| p_O \quad (12)$$

Next, in order to invert the phase of modulation of the diffraction grating 6 with respect to the projected phase of modulation of the diffraction grating 5, it is necessary to satisfy Expression (12), to dispose the diffraction grating 5 such that one of the centers of crest regions thereof coincides with the optical axis, for example, and to dispose the diffraction grating 6 such that one of the centers of trough regions thereof coincides with the optical axis. FIGS. 36 and 37 show just such an example.

Finally, the condition for making the magnitude of phase modulation of the diffraction grating 6 equal in absolute value to the magnitude of phase modulation of the diffraction grating 5 is obtained.

From optical parameters of the diffraction grating 5 (a crest-region thickness $t_{Oc}$, a trough-region thickness $t_{Ot}$, and a refractive index $n_O$), the phase lead $\Delta L_{Odt}$ that is given to the on-axis light ray $R_X$ transmitted through a trough region of the diffraction grating 5, with respect to the light ray $R_A$ (transmitted through a crest region) along the optical axis, is expressed by Expression (13).

$$\Delta L_{Odt} = n_O \cdot t_{Oc} - (n_O \cdot t_{Ot} + (t_{Oc} - t_{Ot})) = (n_O - 1)(t_{Oc} - t_{Ot}) \quad (13)$$

In the same way, from optical parameters of the diffraction grating 6 (a crest-region thickness $t_{Ic}$, a trough-region thickness $t_{It}$, and a refractive index $n_I$), the phase lead $\Delta L_{Idt}$ that is given to the on-axis light ray $R_X$ transmitted through a crest region of the diffraction grating 6, with respect to the light ray $R_A$ (transmitted through a trough region) along the optical axis, is expressed by Expression (14).

$$\Delta L_{Idt} = (n_I \cdot t_{It} + (t_{Ic} - t_{It})) - n_I \cdot t_{Ic} = -(n_I - 1)(t_{Ic} - t_{It}) \quad (14)$$

In this case, because the value of $\Delta L_{Odt}$ is positive, and the value of $\Delta L_{Idt}$ is negative, a condition for making the absolute values of them equal is expressed by Expression (15).

$$\Delta L_{Odt} + \Delta L_{Idt} = (n_O - 1)(t_{Oc} - t_{Ot}) - (n_I - 1)(t_{Ic} - t_{It}) = 0 \quad (15)$$

Note that although a description has been given here on the basis of the on-axis light ray, so long as the above-described conditions are satisfied, the diffraction grating 5 performs the function of wavefront disturbance, and the diffraction grating 6 performs the function of wavefront restoration, with respect to an off-axis light ray, as well.

Furthermore, although a description has been given here of an example case in which the diffraction gratings 5 and 6 are trapezoidal in cross section, it is needless to say that the same functions can be performed with another shape.

Figure 40:
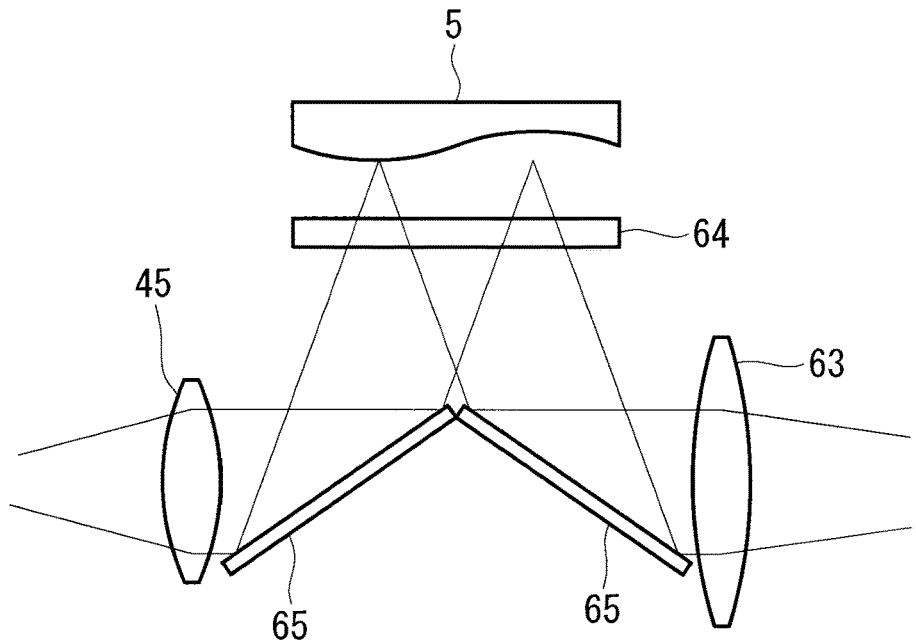
FIG. 40 is a schematic view showing a reflective phase modulation element as another example of the phase modulation element used in the imaging optical systems and the observation devices according to the present invention.
Figure 41:
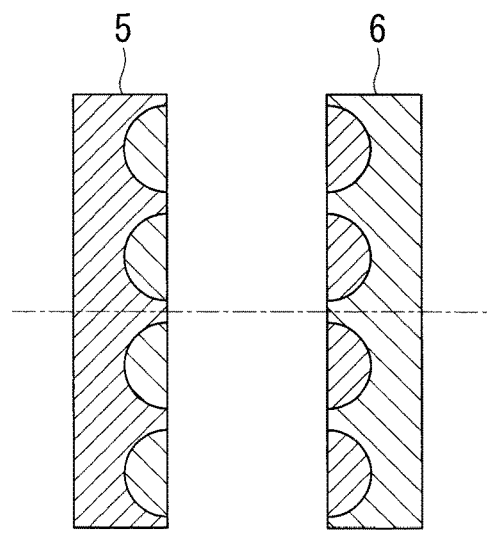
FIG. 41 is a longitudinal sectional view showing refractive-index distribution elements as other examples of the phase modulation elements used in the imaging optical systems and the observation devices according to the present invention.

Furthermore, as the phase modulation elements 5 and 6, it is possible to adopt spherical aberration elements, as shown in FIG. 38, irregular-shaped elements, as shown in FIG. 39, a reflective wavefront modulation element used in combination with the transmissive spatial light modulating element 64, as shown in FIG. 40, or refractive-index distribution elements, as shown in FIG. 41. Any type of the phase modulation elements 5 and 6 shown in FIGS. 38 to 41 needs to have a plurality of small lens units with different powers that are arranged in a direction intersecting the optical axis.

For example, in the case of the spherical aberration elements shown in FIG. 38, it is possible to mix a plurality of spherical aberration amounts in one phase element by making one ring zone causing one spherical aberration amount serve as one small lens. Furthermore, in the case of the irregular-shaped elements shown in FIG. 39, it is possible to mix small lenses having a plurality of powers in one phase modulation element by making one convex portion or one concave portion serve as one small lens. Furthermore, in the case of the refractive-index distribution elements shown in FIG. 41, it is possible to mix small lenses having a plurality of powers in one phase modulation element by making a portion forming one lens serve as one small lens.

Furthermore, as the phase modulation elements 5 and 6, it is also possible to adopt fly-eye lenses or microlens arrays in each of which a number of microlenses are arrayed, or microprism arrays in which a number of microprisms are arrayed.

Figure 42:
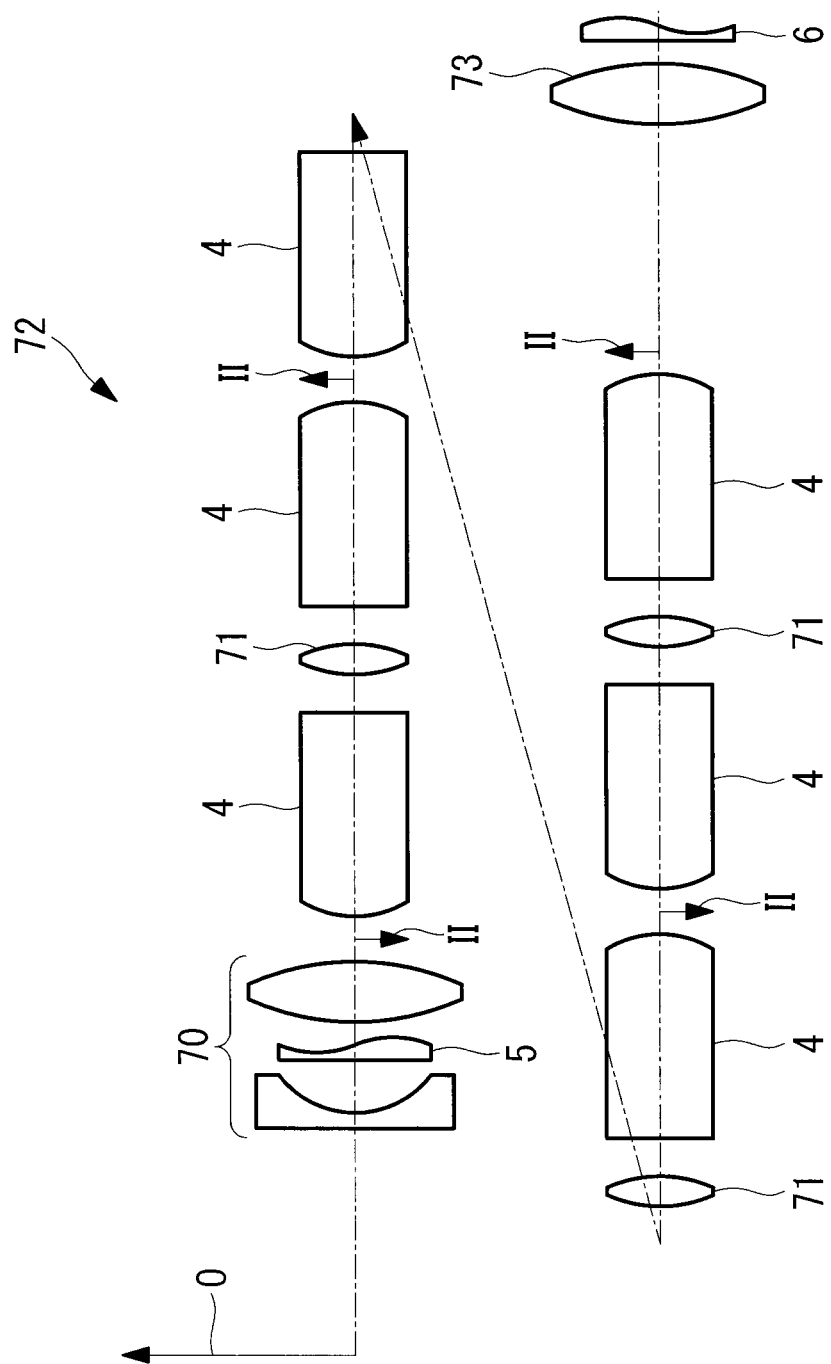
FIG. 42 is a view showing an example lens array when the imaging optical systems according to the present invention are applied to a device used for microscopic magnified observation for an endoscopic purpose.

Furthermore, when the imaging optical system 1 of the above-described embodiment is applied to an endoscope, as shown in FIG. 42, the phase modulation element 5 is disposed in an objective lens (imaging lens) 70, and the phase modulation element 6 is disposed in the vicinity of an eyepiece 73 that is disposed on the opposite side of a relay optical system 72 that includes a plurality of field lenses 4 and focusing lenses 71, from the objective lens 70. By doing so, it is possible to blur intermediate images formed in the vicinities of the surfaces of the field lenses 4 and to make a final image formed by the eyepiece 73 clear.

Figure 43:
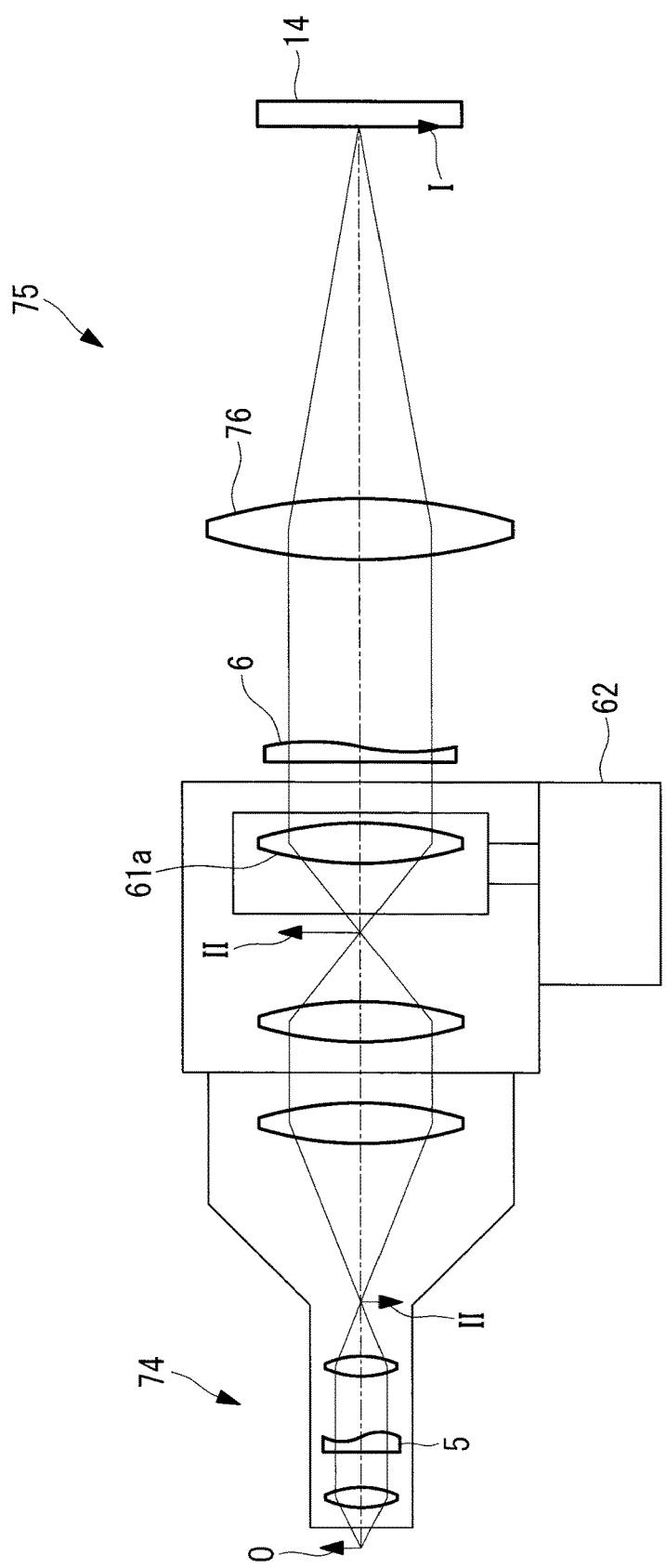
FIG. 43 is a view showing an example lens array when the imaging optical systems according to the present invention are applied to a microscope that is provided with an endoscope-type small-diameter objective lens having an inner focus function.

Furthermore, as shown in FIG. 43, it is also possible to provide the wavefront disturbing element 5 in an endoscope-type small-diameter objective lens 74 with an inner focus function, in which a lens 61a is driven by an actuator 62, and to dispose the wavefront restoring element 6 in the vicinity of the pupil position of a tube lens (imaging lens) 76 provided in a microscope body 75. In this way, the actuator itself may be a known lens driving means (for example, a piezoelectric element); however, in terms of movement of an intermediate image on the Z axis, it is important to realize an arrangement for allowing spatial modulation of an intermediate image at the same standpoint as in the above-described embodiments.

In the above-described embodiments, the case in which blurring of an intermediate image through spatial modulation is applied to the imaging optical system of an observation device has been discussed at the standpoint of movement of the intermediate image on the Z axis. Similarly, blurring of an intermediate image through spatial modulation can be applied to an observation device at another standpoint of movement of an intermediate image on XY axes (or in an XY plane).

The above-discussed phase modulation elements for an imaging optical system according to the present invention can be forms to be described below, and a person skilled in the art could consider the optimum embodiment on the basis of the scope to be described below. According to the following forms, provided are phase modulation elements for an imaging optical system that are characterized by having a configuration for adjusting or increasing the operation of giving a spatial disturbance and the operation of cancelling out of the disturbance in the above-described (pair of) phase modulation elements; therefore, it can be said that the function effects inherent to the phase modulation elements of the present invention can be evolved or can be made practically advantageous. In this case, in any type of the phase modulation elements, a plurality of small lens units having different powers need to be arrayed in a direction intersecting the optical axis.

(1) Concave-Convex-Periodic-Structure-Type Phase Modulation Element

For example, it is possible to provide an imaging optical system characterized in that, in a first phase modulation element that is used for blurring and a second phase modulation element that is used for restoration, the modulation distributions in phase lead regions with respect to the average value of phase modulation distributions and the modulation distributions in phase lag regions with respect to the same average value have symmetrical shapes with respect to the above-described average value, and a plurality of pairs of the phase lead regions and the phase lag regions are periodically formed. In this way, two phase modulation elements having the same shape are used and appropriately disposed in the optical system, thereby making it possible to perform complementary phase modulations, i.e., to blur an intermediate image through the first phase modulation element and to make a final image clear through the second phase modulation element; therefore, the intermediate image problem can be solved. Here, it is not necessary to prepare two different types of phase modulation elements in order to obtain complementation, and one type of them suffices, thus allowing easy apparatus manufacturing and a cost reduction.

Furthermore, the first and second phase modulation elements may each have a surface shape of an optical medium (for example, a shape in which shapes each formed of a concave portion and a convex portion are periodically arranged), thereby performing phase modulation. Accordingly, required phase modulation elements can be manufactured by using the same method of manufacturing general phase filters. Furthermore, the first and second phase modulation elements may perform phase modulations with interface shapes of a plurality of optical media. Accordingly, it is possible to perform more highly accurate phase modulation with respect to the same optical-medium shape accuracy. Or, with respect to the same phase modulation accuracy, a phase modulation element can be manufactured with lower optical-medium shape accuracy, i.e., with a lower cost. Furthermore, the first and second phase modulation elements may have one-dimensional phase distribution characteristics. Accordingly, an intermediate image can be effectively blurred. Furthermore, the first and second phase modulation elements may have two-dimensional phase distribution characteristics. Accordingly, an intermediate image can be effectively blurred.

(2) Liquid-Crystal Phase Modulation Element

Furthermore, an imaging optical system may be configured such that the first and second phase modulation elements have a liquid crystal sandwiched between a plurality of substrates. By doing so, with use of the birefringence of the liquid crystal, the first phase modulation element separates one light-focusing point at an intermediate image into a plurality of light-focusing points, thus making it possible to bur the intermediate image, and the second phase modulation element concentrates the separated light-focusing points on one light-focusing point again, thus making it possible to make a final image clear; therefore, the intermediate image problem can be solved. In this case, the liquid crystal serving as a birefringent material has an advantage that the degree of freedom in design is high because it comes in a variety of types, compared with other birefringent materials, for example, a crystal that is an inorganic material, such as quartz, and has an advantage that the effect of blurring an intermediate image is high because of the strong birefringence properties.

Furthermore, when the contact surfaces of the substrates with the liquid crystal are plane surfaces, the liquid crystal sandwiched between the plane surfaces serves as a birefringent prism, thus producing the above-described blurring effect. In this case, the surfaces of the substrates, which sandwich the liquid crystal, are plane surfaces, thus providing an advantage that processing of the substrates is easy. Furthermore, the first and second phase modulation elements may each be composed of a plurality of prisms formed of liquid crystals.

In this case, as the number of prisms is increased by one, the number of light-focusing points at an intermediate image is doubled, thus causing light to be separated at more light-focusing points and thus increasing the intermediate-image blurring effect. Furthermore, the first and second phase modulation elements may each have at least one quarter wavelength plate. In this case, by using the quarter wavelength plate, the degree of freedom in arrangement of separated light-focusing points at an intermediate image is increased. For example, four or eight light-focusing points separated by a plurality of prisms can be disposed in one straight line, which is preferable.

Furthermore, by configuring the imaging optical system such that intermediate image points separated by the above-described birefringence are two-dimensionally disposed, the intermediate images can be effectively blurred, which is preferable.

Furthermore, the phase modulation element can be configured such that the contact surfaces of the substrates with the liquid crystal each have a concavo-convex shape (a concave surface, a convex surface, a surface having both concave and convex, or a non-planar surface). With this configuration, the intermediate-image blurring effect originally possessed by a concavo-convex shape (a cylindrical surface, a toric surface, a lenticular surface, a microlens array shape, a random surface, etc.) can be further increased by the birefringence of a liquid crystal. Furthermore, the first and second phase modulation elements may be designed such that the concavo-convex shapes of the substrates therein are complementary and such that the orientation directions of the liquid crystals therein are parallel. According to this design, it is possible to make the phase modulations in the two phase modulation elements have complementarity, i.e., to restore the final image. Furthermore, it is also possible to make the substrates in the first and second phase modulation elements have the same concavo-convex shape, to make the refractive index of a glass material forming the substrates equal to the average value of two principal refractive indices of the liquid crystals, and to make the orientation directions of the liquid crystals in the first and second phase modulation elements perpendicular to each other. By doing so, it is possible to make the phase modulations in the two phase modulation elements have complementarity, i.e., to restore the final image.

(3) Multiple-Different-Media Phase Modulation Element

The imaging optical system may be configured such that the shape of the interface between multiple types of optical media is made to serve as a phase modulation means. In this case, the dimensional error tolerance is increased compared with an ordinary phase element (the shape of the interface with air is made to serve as a phase modulation means). Accordingly, manufacturing thereof becomes easy, and phase modulation can be performed in a more highly accurate manner even with an identical dimensional error. In this case, the first phase modulation element and the second phase modulation element may be configured so as to be brought into contact with each other, as multiple types of optical media having different refractive indices from each other. The two phase modulation elements are each formed of multiple media, thus allowing easy manufacturing and even more highly accurate phase modulation.

Furthermore, it is also possible to provide a configuration in which a portion of a first optical medium that forms the first phase modulation element and a portion of a second optical medium that forms the second phase modulation element have the same shape, the second optical medium and a third optical medium that is brought into contact with the first optical medium have the same refractive index, and the first optical medium and a fourth optical medium that is brought into contact with the second optical medium have the same refractive index. By doing so, a pair of optical media having a common refractive index is used for each of the first and second phase modulation elements, and only the shape relationships among them are switched, thereby making it possible to provide complementary phase modulation characteristics. In this case, because the interface shapes between the optical media in the respective phase modulation elements are the same, the two phase modulation elements can be disposed, in an optical system, at optically conjugate positions, including a standpoint of a three-dimensional interface shape; therefore, the operation of cancelling out a wavefront disturbance (sharpening) performed by the second phase modulation element is more accurately performed. Furthermore, when not only the refractive indices are made to be common but also the optical media themselves are made to be common, even if the refractive indices of the optical media have fluctuations due to production lots or the like, are affected by environment, or change over time, a thus-caused shift in phase modulation is naturally offset between the two phase modulation elements; therefore, the sharpening operation performed by the second phase modulation element is more accurately performed.

Furthermore, it is also possible to configure an imaging optical system in which the portion of the first optical medium, which forms the first phase modulation element, and the portion of the second optical medium, which forms the second phase modulation element, have the same shape and the same refractive index, and the difference $\Delta n1$ in refractive index between the first optical medium and the third optical medium, which is brought into contact with the first optical medium, and the difference $\Delta n2$ in refractive index between the second optical medium and the fourth optical medium, which is brought into contact with the second optical medium, are equal to each other in absolute value, and they have opposite signs. Specifically, phase elements that are the same in shape and refractive index are used in common for one of the plurality of optical medium portions that form the first phase modulation element and for one of the plurality of optical medium portions that form the second phase modulation element, an optical medium having a higher refractive index than the common refractive index is used to form a pair in one of the phase modulation elements, and an optical medium having a lower refractive index than the common refractive index is used to form a pair in the other one of the phase modulation elements, thus making the absolute values of the refractive index differences of the pairs equal to each other, thereby providing complementary phase modulation characteristics. In this case, because the interface shapes in the respective phase modulation elements are the same, as in the above-described case, when the two phase modulation elements are disposed in a conjugated manner, the sharpening performed by the second phase modulation element is more accurately performed. Furthermore, in the above-described common portions, when not only the shapes and the refractive indices are made to be common but also the optical elements themselves are made to be common, it is possible to reduce the cost of the phase modulation elements, which have complicated shapes and have a high level of difficulty in manufacturing. Furthermore, for example, if the optical elements are manufactured through molding by using a mold, even if an unexpected shape error occurs due to a defect in the mold, because the respective optical elements have this shape error in common, an error in phase modulation caused by an error portion thereof in the first phase modulation element is naturally cancelled out by an error portion that exists in common in the second phase modulation element, which is disposed in a conjugated manner with the first phase modulation element. Specifically, the operation of cancelling out a wavefront disturbance (sharpening) performed by the second phase modulation element is more accurately performed.

(4) Birefringent Phase Modulation Element

Furthermore, the above-described imaging optical system may be configured such that the first and second phase modulation elements are prisms formed of birefringent media. With this configuration, when a pair of birefringent prisms that is made of the same material and have the same shape is appropriately disposed in the optical system, a first prism, i.e., the first phase modulation element, separates one light-focusing point at an intermediate image into a plurality of light-focusing points, thereby blurring the intermediate image, and a second prism, i.e., the second phase modulation element, concentrates the separated light-focusing points on one light-focusing point again, thereby making it possible to make a final image clear; therefore, the intermediate image problem can be solved. Here, for the phase modulation elements, materials can be formed of a combination of parts whose plane surfaces have been polished; thus, for example, a complicated surface shape as in a microlens array or lenticular is not required, thus making it possible to facilitate the manufacturing of an apparatus and to reduce the cost.

Furthermore, the first and second phase modulation elements may each be composed of a plurality of prisms that are formed of birefringent media. In this case, as the number of prisms is increased by one, the number of light-focusing points at an intermediate image is doubled, thus causing light to be separated at more light-focusing points and thus increasing the intermediate-image blurring effect.

Furthermore, the first and second phase modulation elements may each have at least one quarter wavelength plate.

By using the quarter wavelength plate, the degree of freedom in arrangement of separated light-focusing points at an intermediate image is increased. For example, four or eight light-focusing points separated by a plurality of prisms can be disposed in one straight line. Furthermore, it is also possible to two-dimensionally dispose the intermediate image points separated by the birefringence, thereby making it possible to effectively blur the intermediate images.

The embodiments of the present invention have been described above in detail with reference to the drawings; however, the specific configurations are not limited to these embodiments, and design changes etc. that do not depart from the gist of the present invention are also encompassed. For example, the present invention is not limited those applied to the above-described embodiments and modifications, can be applied to an embodiment obtained by appropriately combining the embodiments and modifications, and is not particularly limited.

In this specification, two concepts, i.e., "clear image" and "unclear image" (or "blurred image"), are used to describe images.

First, a "clear image" means an image that is formed, via an imaging lens, in a state in which a spatial disturbance is not given to the wavefront of light produced in an object or in a state in which a disturbance once given thereto is cancelled out, thus being resolved, and that has a spatial frequency band determined on the basis of the wavelength of light and the numerical aperture of the imaging lens, a spatial frequency band corresponding thereto, or a desired spatial frequency band according to the purpose.

Next, an "unclear image" (or "blurred image") means an image that is formed, via an imaging lens, in a state in which a spatial disturbance is given to the wavefront of light produced in an object and that has such characteristics that a scratch, a foreign object, a defect, or the like that exists on the surface of or in an optical element disposed in the vicinity of that image is not substantially formed as a final image.

In contrast to an image that is merely out of focus, the "unclear image" (or "blurred image") formed in this way, including an image at a position where it should have been formed (i.e., a position where it should have been formed if a spatial wavefront disturbance would not have been given), does not have a clear image-contrast peak in a wide region in the optical axis direction, and the spatial frequency band thereof is always narrower than the spatial frequency band of a "clear image".

A "clear image" and an "unclear image" (or "blurred image") in this specification are based on the above-described concepts, and movement of an intermediate image on the Z axis means that movement of an intermediate image in a blurred state, in the present invention. Furthermore, Z-axis scanning is not limited to only movement of light on the Z axis but may be accompanied with movement of light on the XY axes, to be described later.

The above-described embodiments lead to the following invention.

According to one aspect, the present invention provides a pair of phase modulation elements that are disposed close to an object and close to a final image so as to sandwich any of at least one intermediate image formed by a plurality of imaging lenses forming a final image and the at least one intermediate image, in each of which a plurality of small lens units having different powers are arrayed in a direction intersecting the optical axis, one of which gives a spatial disturbance to the wavefront of light from the object, and the other of which cancels out the spatial disturbance given to the wavefront of the light from the object by the one phase modulation element.

According to this aspect, the respective phase modulation elements are disposed close to the object and close to the final image so as to sandwich any of the at least one intermediate image formed by the plurality of imaging lenses; thus, when light from the object passes through one phase modulation element, a spatial disturbance is given to the wavefront of the light, thus forming blurred intermediate images, and, when the light formed into the intermediate images passes through the other phase modulation element, the spatial disturbance given to the wavefront by the one phase modulation element is cancelled out, thus forming a clear final image.

In this case, the respective phase modulation elements are each formed of a plurality of small lens units that are arrayed in a direction intersecting the optical axis and that have different powers; thus, intermediate images are formed for the respective small lens units, and the respective intermediate images are distributed at different positions in the optical axis direction according to the magnitudes of the powers of the small lens units. Therefore, it is possible to prevent the intermediate images from overlapping with the same lens or the like and to avoid a situation in which a scratch or dust on the lens is included in an acquired image.

In the above-described aspect, the small lens unit that has a positive power and the small lens unit that has a negative power may be mixed in each of the phase modulation elements.

With this configuration, light passing through the small lens unit that has a positive power and light passing through the small lens unit that has a negative power are formed into intermediate images at opposite sides from each other in the axial direction. Therefore, the imaging range of the plurality of intermediate images formed for the small lens units of the phase modulation element is more widely distributed in the optical axis direction, thus making it possible to improve the intermediate-image blurring effect.

In the above-described aspect, the plurality of small lens units may be arrayed in irregular order of the magnitudes of the powers.

With this configuration, it is possible to suppress concentration of intermediate images that are adjacent in the array direction of the small lens units of the phase modulation element, in a relatively narrow area in the optical axis direction. Accordingly, inclusion of a scratch or dust on the lens in an acquired image can be made difficult.

According to another aspect, it is possible to include: a plurality of imaging lenses that form a final image and at least one intermediate image; and the above described pair of phase modulation elements, wherein the pair of phase modulation elements are a first phase modulation element that is disposed closer to an object than any of the at least one intermediate image formed by the imaging lenses is and a second phase modulation element that is disposed at a position for allowing the at least one intermediate image to be sandwiched with the first phase modulation element.

According to the other aspect of the present invention, when light from the object passes through the first phase modulation element and is formed into images by the imaging lens, a spatial disturbance is given to the wavefront thereof, and blurred intermediate images are formed, and, when the light from the first phase modulation element passes through the second phase modulation element and passes through the other imaging lens, the spatial disturbance given to the wavefront is cancelled out, and a clear final image is formed.

In this case, the intermediate images are formed, for the plurality of small lens units of the phase modulation element, at different positions in the optical axis direction, according to the magnitudes of powers of the small lens units, and it is possible to prevent the intermediate images from overlapping with the same lens and to suppress inclusion of a scratch or dust on the lens in an acquired image.

According to still another aspect, the present invention provides an imaging optical system including: a plurality of imaging lenses that form a final image and at least one intermediate image; a first phase modulation element that is disposed closer to an object than any of the at least one intermediate image formed by the imaging lenses is and that gives a spatial disturbance to the wavefront of light from the object; and a second phase modulation element that is disposed at a position for allowing the at least one intermediate image to be sandwiched with the first phase modulation element and that cancels out the spatial disturbance given to the wavefront of the light from the object by the first phase modulation element, wherein the imaging optical system has a configuration for adjusting or increasing an operation of giving the spatial disturbance and an operation of cancelling out of the disturbance in the phase modulation elements.

According to this aspect, light entering the imaging lenses from object sides thereof is focused by the imaging lenses, thus being formed into a final image. In this case, when the light passes through the first phase modulation element, which is disposed closer to the object than one of the at least one intermediate image is, a spatial disturbance is given to the wavefront of the light, and thus, the formed intermediate image is blurred. Furthermore, when the light formed into the intermediate image passes through the second phase modulation element, the spatial wavefront disturbance given by the first phase modulation element is cancelled out. Accordingly, a clear image can be acquired when a final image is formed at a stage subsequent to the second phase modulation element.

Specifically, by blurring the intermediate image, even when any optical element is disposed at the position of the intermediate image, and a scratch, a foreign object, or a defect etc. exists on the surface of or in that optical element, it is possible to prevent a disadvantageous situation in which the scratch or the like is overlaid on the intermediate image and is eventually formed as part of the final image. Furthermore, in a case in which the present invention is applied to a microscope optical system, even when the intermediate image moved on the Z axis through focusing or the like overlaps with a lens that is located nearby, a noise image that eventually includes a scratch or a foreign object on the surface of a lens or a defect etc. in the lens is not formed.

In the above-described aspect, the first phase modulation element and the second phase modulation element may be disposed at optically conjugate positions.

By doing so, the spatial disturbance given to the wavefront of light from the object by the first phase modulation element is accurately cancelled out by the second phase modulation element, thereby making it possible to form a clear final image.

In the above-described aspect, the first phase modulation element and the second phase modulation element may be disposed in the vicinities of pupil positions of the imaging lenses.

By doing so, it is possible to reduce the sizes of the first phase modulation element and the second phase modulation element by disposing them in the vicinities of the pupil positions, where the light flux is not fluctuated.

Furthermore, in the above-described aspect, it is possible to further include an optical-path-length varying means that can change an optical path length between the two imaging lenses, which are disposed at positions so as to sandwich any of the at least one intermediate image therebetween.

By doing so, the optical path length between the two imaging lenses is changed through actuation of the optical-path-length varying means, thereby making it possible to easily change the imaging position of the final image in the optical axis direction.

Furthermore, in the above-described aspect, the optical-path-length varying means may be provided with: a plane mirror that is disposed perpendicular to the optical axis and that reflects, so as to turn around, light formed into the intermediate image; an actuator that moves the plane mirror in the optical axis direction; and a beam splitter that splits off the light reflected at the plane mirror in two directions.

By doing so, light from the object focused by the imaging lens on the object side is reflected, thus turning around, at the plane mirror, is then split off by the beam splitter, and enters the imaging lens on the image side. In this case, the actuator is actuated to move the plane mirror in the optical axis direction, thereby making it possible to easily change the optical path length between the two imaging lenses and to easily change the imaging position of the final image in the optical axis direction.

Furthermore, in the above-described aspect, it is possible to further include, in the vicinity of the pupil position of one of the imaging lenses, a variable spatial phase modulation element that changes spatial phase modulation to be applied to the wavefront of light, thereby changing the position of the final image in the optical axis direction.

By doing so, with the variable spatial phase modulation element, it is possible to apply, to the wavefront of light, a spatial phase modulation that changes a final image position in the optical axis direction and to easily change the final image forming position in the optical axis direction by adjusting the phase modulation to be applied.

Furthermore, in the above-described aspect, the function of at least one of the first phase modulation element and the second phase modulation element may be performed by the variable spatial phase modulation element.

By doing so, the variable spatial phase modulation element can be made to perform both: a spatial phase modulation that changes the final image position in the optical axis direction; and a phase modulation that blurs the intermediate image or a phase modulation that cancels out the blurring of the intermediate image. Accordingly, it is possible to reduce the number of components to configure a simple imaging optical system.

Furthermore, in the above-described aspect, the first phase modulation element and the second phase modulation element may apply, to the wavefront of a light flux, phase modulations that change in a one-dimensional direction perpendicular to the optical axis.

By doing so, the first phase modulation element applies, to the wavefront of light, a phase modulation that changes in a one-dimensional direction perpendicular to the optical axis, thus making it possible to blur the intermediate image, and, even when any optical element is disposed at the intermediate image position, and a scratch, a foreign object, or a defect, etc. exists on the surface of or in that optical element, it is possible to prevent a disadvantageous situation in which the scratch or the like is overlaid on the intermediate image and is eventually formed as part of the final image. Furthermore, the second phase modulation element applies, to the wavefront of the light, a phase modulation that cancels out the phase modulation that has changed in the one-dimensional direction, thus making it possible to form a clear, unblurred final image.

Furthermore, in the above-described aspect, the first phase modulation element and the second phase modulation element may apply, to the wavefront of a light flux, phase modulations that change in two-dimensional directions perpendicular to the optical axis.

By doing so, the first phase modulation element applies, to the wavefront of light, a phase modulation that changes in two-dimensional directions perpendicular to the optical axis, thus making it possible to more reliably blur the intermediate image. Furthermore, the second phase modulation element applies, to the wavefront of the light, a phase modulation that cancels out the phase modulation that has changed in the two-dimensional directions, thus making it possible to form a clearer final image.

Furthermore, in the above-described aspect, the first phase modulation element and the second phase modulation element may be transmissive elements that apply phase modulations to the wavefront of light when the light is transmitted therethrough.

Furthermore, in the above-described aspect, the first phase modulation element and the second phase modulation element may be reflective elements that apply phase modulations to the wavefront of light when the light is reflected thereat.

Furthermore, in the above-described aspect, the first phase modulation element and the second phase modulation element may have complementary shapes.

By doing so, it is possible to simply configure the first phase modulation element, which gives a spatial disturbance for blurring an intermediate image to the wavefront, and the second phase modulation element, which applies a phase modulation for canceling out the spatial disturbance given to the wavefront.

Furthermore, in the above-described aspect, the first phase modulation element and the second phase modulation element may apply, to the wavefront, phase modulations through refractive-index distributions of transparent materials.

By doing so, it is possible to make the first phase modulation element cause a wavefront disturbance according to the refractive-index distribution when light is transmitted therethrough and to make the second phase modulation element apply, to the wavefront of the light, a phase modulation that cancels out the wavefront disturbance due to the refractive-index distribution when the light is transmitted therethrough.

Furthermore, according to still another aspect, the present invention provides an illuminating device including: one of the above-described imaging optical systems; and a light source that is disposed on the object side of the imaging optical system and that produces illumination light to be made to enter the imaging optical system.

According to this aspect, illumination light produced in the light source, which is disposed on the object side, enters the imaging optical system, thereby making it possible to radiate the illumination light onto an illumination object that is disposed on the final image side. In this case, the first phase modulation element blurs an intermediate image formed by the imaging optical system; therefore, even when any optical element is disposed at the intermediate image position, and a scratch, a foreign object, or a defect, etc. exists on the surface of or in that optical element, it is possible to prevent a disadvantageous situation in which the scratch or the like is overlaid on the intermediate image and is eventually formed as part of the final image.

Furthermore, according to still another aspect, the present invention provides a microscope apparatus including: one of the above-described imaging optical systems; and a photodetector that is disposed on the final image side of the imaging optical system and that detects light produced in an observation object.

According to this aspect, it is possible to detect, with the photodetector, a clear final image that is formed, by the imaging optical system, by preventing the image of a scratch or a foreign object on the surface of the optical element or a defect therein from being overlaid on an intermediate image.

In the above-described aspect, the photodetector may be an image acquisition device that is disposed at a position of a final image of the imaging optical system and that acquires the final image.

By doing so, the image acquisition device, which is disposed at the final image position of the imaging optical system, can acquire a clear final image, thus making it possible to perform highly accurate observation.

Furthermore, according to still another aspect, the present invention provides a microscope apparatus including: one of the above-described imaging optical systems; a light source that is disposed on the object side of the imaging optical system and that produces illumination light to be made to enter the imaging optical system; and a photodetector that is disposed on the final image side of the imaging optical system and that detects light produced in an observation object.

According to this aspect, light from the light source is focused by the imaging optical system and is radiated onto an observation object, and light produced in the observation object is detected by the photodetector, which is disposed on the final image side. Accordingly, it is possible to detect, with the photodetector, a clear final image that is formed by preventing an image of a scratch or a foreign object on the surface of an intermediate optical element or a defect therein from being overlaid on an intermediate image.

In the above-described aspect, it is possible to further include a Nipokow-disk confocal optical system that is disposed among the light source, the photodetector, and the imaging optical system.

By doing so, it is possible to scan multiple spots of light on the observation object and to rapidly acquire a clear image of the observation object.

Furthermore, in the above-described aspect, the light source may be a laser light source; and the photodetector may be provided with a confocal pinhole and a photoelectric conversion element.

By doing so, it is possible to perform observation of an observation object using a clear confocal image that does not includes a scratch, a foreign object, or a defect existing at the intermediate image position.

Furthermore, according to still another aspect, the present invention provides a microscope apparatus including: the above-described illuminating device; and a photodetector that detects light produced in an observation object irradiated by the illuminating device, wherein the light source is a pulse laser light source.

By doing so, it is possible to perform observation of an observation object using a clear multiphoton excitation image that does not includes a scratch, a foreign object, or a defect existing at the intermediate image position.

In the above-described aspect, it is possible to further include a scanning unit that scans a focal position with respect to the observation object, in the optical axis direction.

With this configuration, through scanning of the focal position of the laser light in the optical axis direction performed by the scanning unit, it is possible to observe different positions in the observation object in the depth direction of the laser light. In this case, through scanning of the focal position of the laser light in the optical axis direction, even when any of intermediate images formed from laser light that has passed through the plurality of small lens units of the first phase modulation element overlaps with a nearby lens, it is possible to prevent the other intermediate images from overlapping with the same lens and to suppress inclusion of a scratch or dust on the lens in an acquired image.

REFERENCE SIGNS LIST

I final image
II intermediate image
O object
$PP_O$, $PP_I$ pupil position
1, 13, 32, 42 imaging optical system
2, 3 imaging lens
5 wavefront disturbing element (first phase modulation element)
6 wavefront restoring element (second phase modulation element)
10, 30, 40, 50, 60 observation device
11, 31, 41 light source
14, 33 image acquisition device (photodetector)
17, 23 phase modulation element
20, 36 beam splitter
22 optical-path-length varying means
22a plane mirror
22b actuator
34 Nipkow-disk confocal optical system
43 confocal pinhole
44 photodetector (photoelectric conversion element)
61a lens (optical-path-length varying means)
62 actuator (optical-path-length varying means, scanning unit)
64 spatial light modulating element (variable spatial phase modulation element)

The invention claimed is:

1. A pair of phase modulation elements that are disposed close to an object and close to a final image so as to sandwich any of at least one intermediate image formed by a plurality of imaging lenses forming a final image and the at least one intermediate image, in each of which a plurality of small lens units having different powers are arrayed in a direction intersecting an optical axis, one of which gives a spatial disturbance to a wavefront of light from the object, and the other of which cancels out the spatial disturbance given to the wavefront of the light from the object by the one phase modulation element.

2. A pair of phase modulation elements according to claim 1, wherein the small lens unit that has a positive power and the small lens unit that has a negative power are mixed in each of the phase modulation elements.

3. A pair of phase modulation elements according to claim 1, wherein the plurality of small lens units are arrayed in irregular order of the magnitudes of the powers.

4. An imaging optical system comprising:
a plurality of imaging lenses that form a final image and at least one intermediate image;
a first phase modulation element that is disposed closer to an object than any of the at least one intermediate image formed by the imaging lenses is and that gives a spatial disturbance to a wavefront of light from the object; and
a second phase modulation element that is disposed at a position for allowing the at least one intermediate image to be sandwiched with the first phase modulation element and that cancels out the spatial disturbance given to the wavefront of the light from the object by the first phase modulation element,
wherein the imaging optical system has a configuration for adjusting or increasing an operation of giving the spatial disturbance and an operation of cancelling out of the disturbance in the phase modulation elements,
wherein the imaging optical system further comprises an optical-path-length varying portion that can change an optical path length between the two imaging lenses, which are disposed at positions so as to sandwich any of the at least one intermediate image therebetween,
wherein the optical-path-length varying portion is provided with: a plane mirror that is disposed perpendicular to an optical axis and that reflects, so as to turn around, light formed into the intermediate image; an actuator that moves the plane mirror in the optical axis direction; and a beam splitter that splits off the light reflected at the plane mirror in two directions.

5. An imaging optical system comprising:
a plurality of imaging lenses that form a final image and at least one intermediate image; and
a pair of phase modulation elements according to claim 1,
wherein the pair of phase modulation elements are a first phase modulation element that is disposed closer to an object than any of the at least one intermediate image formed by the imaging lenses is and a second phase modulation element that is disposed at a position for allowing the at least one intermediate image to be sandwiched with the first phase modulation element.

6. An imaging optical system according to claim 4, wherein the first phase modulation element and the second phase modulation element are disposed at optically conjugate positions.

7. An imaging optical system according to claim 4, wherein the first phase modulation element and the second phase modulation element are disposed in the vicinities of pupil positions of the imaging lenses.

8. An imaging optical system according to claim 4, further comprising, in the vicinity of a pupil position of one of the imaging lenses, a variable spatial phase modulation element that changes spatial phase modulation to be applied to the wavefront of light, thereby changing a position of the final image in the optical axis direction.

9. An imaging optical system according to claim 8, wherein function of at least one of the first phase modulation element and the second phase modulation element is performed by the variable spatial phase modulation element.

10. An imaging optical system according to claim 4, wherein the first phase modulation element and the second phase modulation element apply, to the wavefront of a light flux, phase modulations that change in a one-dimensional direction perpendicular to the optical axis.

11. An imaging optical system according to claim 4, wherein the first phase modulation element and the second phase modulation element apply, to the wavefront of a light flux, phase modulations that change in two-dimensional directions perpendicular to the optical axis.

12. An imaging optical system according to claim 4, wherein the first phase modulation element and the second phase modulation element are transmissive elements that apply phase modulations to the wavefront of light when the light is transmitted therethrough.

13. An imaging optical system according to claim 4, wherein the first phase modulation element and the second phase modulation element are reflective elements that apply phase modulations to the wavefront of light when the light is reflected thereat.

14. An imaging optical system according to claim 4, wherein the first phase modulation element and the second phase modulation element have complementary shapes.

15. An imaging optical system according to claim 12, wherein the first phase modulation element and the second phase modulation element apply, to the wavefront, phase modulations through refractive-index distributions of transparent materials.

16. An illuminating device comprising:
an imaging optical system according to claim 4; and
a light source that is disposed on the object side of the imaging optical system and that produces illumination light to be made to enter the imaging optical system.

17. A microscope apparatus comprising:
an imaging optical system according to claim 4; and
a photodetector that is disposed on the final image side of the imaging optical system and that detects light produced in an observation object.

18. A microscope apparatus according to claim 17, wherein the photodetector is an image acquisition device that is disposed at a position of the final image of the imaging optical system and that acquires the final image.

19. A microscope apparatus comprising:
an imaging optical system according to claim 4;
a light source that is disposed on the object side of the imaging optical system and that produces illumination light to be made to enter the imaging optical system; and
a photodetector that is disposed on the final image side of the imaging optical system and that detects light produced in an observation object.

20. A microscope apparatus according to claim 19, further comprising a Nipokow-disk confocal optical system that is disposed among the light source, the photodetector, and the imaging optical system.

21. A microscope apparatus according to claim 19,
wherein the light source is a laser light source; and
the photodetector is provided with a confocal pinhole and a photoelectric conversion element.

22. A microscope apparatus comprising:
an illuminating device according to claim 16; and
a photodetector that detects light produced in an observation object irradiated by the illuminating device,
wherein the light source is a pulse laser light source.

23. A microscope apparatus according to claim 16, further comprising a scanning unit that scans a focal position with respect to the observation object, in the optical axis direction.

24. A microscope apparatus according to claim 17, further comprising a scanning unit that scans a focal position with respect to the observation object, in the optical axis direction.

25. A microscope apparatus according to claim 19, further comprising a scanning unit that scans a focal position with respect to the observation object, in the optical axis direction.

* * * * *